US012366435B2

(12) United States Patent
Hong

(10) Patent No.: US 12,366,435 B2
(45) Date of Patent: *Jul. 22, 2025

(54) DART GAME APPARATUS AND DART GAME SYSTEM COMPRISING ILLUMINATION UNIT

(71) Applicant: HONG INTERNATIONAL CORP., Seoul (KR)

(72) Inventor: Sang Uk Hong, Seoul (KR)

(73) Assignee: PHOENIXDARTS CO., LTD, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/740,056

(22) PCT Filed: Oct. 27, 2017

(86) PCT No.: PCT/KR2017/012001
§ 371 (c)(1),
(2) Date: Dec. 27, 2017

(87) PCT Pub. No.: WO2019/078390
PCT Pub. Date: Apr. 25, 2019

(65) Prior Publication Data
US 2020/0033099 A1    Jan. 30, 2020

(30) Foreign Application Priority Data

Oct. 17, 2017  (KR) .......................... 10-2017-0134894

(51) Int. Cl.
*F41J 3/02*    (2006.01)
*F41J 3/00*    (2006.01)
*G09B 19/00*   (2006.01)

(52) U.S. Cl.
CPC .............. *F41J 3/02* (2013.01); *F41J 3/0014* (2013.01); *G09B 19/0038* (2013.01)

(58) Field of Classification Search
CPC .......................... F41J 3/00–02; F41J 5/14–26
(Continued)

(56) References Cited

U.S. PATENT DOCUMENTS 3,697,073 A  10/1972  Dooley
4,789,932 A  12/1988  Cutler
(Continued)

FOREIGN PATENT DOCUMENTS

CN   104797305 A   7/2015
CN   104936664 A   9/2015
(Continued)

OTHER PUBLICATIONS

English machine translation of WO 2009/057803 A1 (Year: 2009).*
(Continued)

*Primary Examiner* — Jeffrey S Vanderveen
(74) *Attorney, Agent, or Firm* — Martin & Ferraro, LLP

(57) ABSTRACT

Disclosed are a dart game apparatus and a dart game system with an illumination unit. The dart game apparatus includes: a dart target having a plurality of score areas; a sensing unit sensing a hit location of a dart pin in the dart target; a display area formed to surround an exterior of the dart target, provided in a body structure of the dart game apparatus, and disposed to output a variable screen to a location adjacent to at least a part of an outline of the dart target; a target illumination unit irradiating light to the dart target or a periphery of the dart target; and a controller controlling the target illumination unit.

15 Claims, 25 Drawing Sheets

(58) Field of Classification Search
USPC .......................................................... 273/371
See application file for complete search history.

(56) References Cited

U.S. PATENT DOCUMENTS

| | | | |
|---|---|---|---|
| 5,009,419 A | 4/1991 | Streeter | |
| 5,156,643 A * | 10/1992 | Grubek | F41J 5/04 463/36 |
| 5,358,253 A * | 10/1994 | Chen | F41J 3/0038 D21/387 |
| 5,390,937 A | 2/1995 | Sakaguchi | |
| 5,577,733 A | 11/1996 | Downing | |
| 5,743,534 A * | 4/1998 | Pan | F41J 3/00 273/378 |
| 5,951,015 A | 9/1999 | Smith | |
| 6,328,651 B1 | 12/2001 | Lebensfeld | |
| 6,462,720 B1 | 10/2002 | Yamashita | |
| 6,712,698 B2 | 3/2004 | Paulsen | |
| 7,545,563 B2 | 6/2009 | Chen | |
| 7,905,645 B2 | 3/2011 | Batti | |
| 9,478,097 B2 | 10/2016 | Hennessy | |
| 2005/0075153 A1 | 4/2005 | Valero Moreno | |
| 2006/0066053 A1 | 3/2006 | Skala | |
| 2008/0090679 A1 | 4/2008 | Browne | |
| 2008/0186415 A1 | 8/2008 | Boud | |
| 2008/0242437 A1 | 10/2008 | Taylor | |
| 2009/0218769 A1 * | 9/2009 | Krzewicki | F41J 5/14 273/374 |
| 2010/0032904 A1 | 2/2010 | Yasuoka | |
| 2010/0038854 A1 | 2/2010 | Mraz | |
| 2010/0103093 A1 | 4/2010 | Izumi | |
| 2011/0230985 A1 | 9/2011 | Niegowski | |
| 2012/0115577 A1 | 5/2012 | Kaneko | |
| 2013/0184095 A1 | 7/2013 | Rauchholz | |
| 2014/0035888 A1 | 2/2014 | Levasseur | |
| 2014/0265130 A1 | 9/2014 | Layne et al. | |
| 2014/0265132 A1 | 9/2014 | Layne et al. | |
| 2015/0145211 A1 | 5/2015 | Hong | |
| 2015/0145212 A1 | 5/2015 | Hong | |
| 2015/0233684 A1 | 8/2015 | Narita | |
| 2015/0308793 A1 | 10/2015 | Hong | |
| 2016/0055703 A1 | 2/2016 | Woels | |
| 2016/0084618 A1 | 3/2016 | Hong | |
| 2016/0199693 A1 | 7/2016 | Vermilyea | |
| 2016/0290772 A1 | 10/2016 | Hong | |
| 2016/0346693 A1 | 12/2016 | Minato | |
| 2016/0364953 A1 | 12/2016 | Hong | |
| 2017/0178452 A1 | 6/2017 | Hong | |
| 2017/0189810 A1 | 7/2017 | Hong | |
| 2017/0307341 A1 | 10/2017 | Hollinger | |
| 2017/0326444 A1 | 11/2017 | Hong | |
| 2018/0238662 A1 * | 8/2018 | Oh | F41J 3/0066 |
| 2018/0266794 A1 | 9/2018 | Hong | |

FOREIGN PATENT DOCUMENTS

| | | |
|---|---|---|
| CN | 105107168 A | 12/2015 |
| CN | 105188862 A | 12/2015 |
| CN | 106663298 A | 5/2017 |
| CN | 106714918 A | 5/2017 |
| CN | 106999762 A | 8/2017 |
| CN | 106999763 A | 8/2017 |
| CN | 107208991 A | 9/2017 |
| EP | 2918315 A1 | 9/2015 |
| EP | 2919183 A1 | 9/2015 |
| EP | 3156755 A1 | 4/2017 |
| EP | 3228369 A1 | 10/2017 |
| GB | 2314513 A | 1/1998 |
| JP | 2006212224 A * | 8/2006 |
| JP | 2009-225879 A | 10/2009 |
| JP | 5312862 B2 | 7/2013 |
| JP | 2014-095508 A | 5/2014 |
| JP | 2014-512219 A | 5/2014 |
| JP | 2016-504063 A | 2/2016 |
| KR | 100824354 B1 | 4/2008 |
| KR | 2010072557 A | 7/2010 |
| KR | 20110035419 A | 4/2011 |
| KR | 10-1032367 B1 | 5/2011 |
| KR | 10-1032368 B1 | 5/2011 |
| KR | 10-113535 B1 | 4/2012 |
| KR | 10-2013-0123984 A | 11/2013 |
| KR | 10-1374827 B1 | 3/2014 |
| KR | 10-2014-0060127 | 5/2014 |
| KR | 10-2014-0062611 A | 5/2014 |
| KR | 10-2014-0131081 A | 11/2014 |
| KR | 10-2014-0056405 A | 11/2015 |
| KR | 10-2015-0137672 A | 12/2015 |
| KR | 10-1596772 B1 | 2/2016 |
| KR | 10-2016-0066904 A | 6/2016 |
| KR | 10-1627261 B1 | 6/2016 |
| KR | 2016-0084713 A | 7/2016 |
| KR | 10-1693626 B1 | 1/2017 |
| KR | 10-2017-0021279 A | 2/2017 |
| KR | 10-2017-030017 A | 3/2017 |
| KR | 10-1715890 B1 | 3/2017 |
| KR | 10-1722486 B1 | 4/2017 |
| KR | 10-1733106 B1 | 5/2017 |
| KR | 10-1749696 B1 | 6/2017 |
| KR | 10-2017-0105787 A | 2/2018 |
| TW | 201707761 A | 3/2017 |
| TW | 201735974 A | 10/2017 |
| WO | WO 2009/057803 | 5/2009 |
| WO | WO-2009057803 A1 * | 5/2009 ............... F41J 3/00 |
| WO | WO 2009/057803 A4 | 2/2010 |
| WO | WO 2014/178573 A1 | 11/2014 |
| WO | WO2017/034193 A1 | 3/2017 |
| WO | WO 2017/039351 A1 | 3/2017 |
| WO | WO2017/043724 A1 | 3/2017 |
| WO | WO2017/079706 A1 | 5/2017 |

OTHER PUBLICATIONS

English machine translation of JP 2006-212224 A (Year: 2006).*
International Search Report issued on Jul. 5, 2018 for application No. PCT/KR2017/012001.
European Search Report issued on Jul. 9, 2018 for application No. EP17211067.8.
Walsh et ai.,A Multi-technology Approach to Identifying the Reasons for Lateral Drift in Professional and Recreational Darts, 2011 International Conference on Body Sensor Networks (pp. 47-52) (Year: 2011).
Vasiljev et al., Transfer of under-foot load and mechanisms of control in dart sports, pp. S49-S50, Published online: May 10, 2017 (Year: 2017).
Japan Office Action mailed Jun. 16, 2020 for JP Application No. 2018-508175; with English translation.
1st Office Action for CN Application No. 201780002756.1 mailed Mar. 3, 2021. (with English translation).
1st Office Action for CN Application No. 201780002757.6 mailed Mar. 19, 2021. (with English translation).
1st Office Action for CN Application No. 201780002768.4 mailed Mar. 17, 2021. (with English translation).
2nd Office Action for EP Application No. 17211067.8 mailed Feb. 12, 2021. (original in English).
2nd Office Action for EP Application No. 17211078.5 mailed Nov. 23, 2020. (original in English).

* cited by examiner

DART GAME APPARATUS AND DART GAME SYSTEM COMPRISING ILLUMINATION UNIT

This is a National Phase Application under 35 USC 371 of PCT/KR2017/012001 filed Oct. 27, 2017; which claims priority to Korean Application No. 10-2017-0134894 filed Oct. 17, 2017; all of which are incorporated by reference herein in their entirety.

TECHNICAL FIELD

The present disclosure relates to a dart game apparatus, and more particularly, to a dart game system for enhancing a user's entertainment element.

BACKGROUND ART

In general, a dart refers to a 'small arrow' and is a game that makes marks by throwing an arrow-shaped dart to a centrifugal target marked with figures. The dart game has an advantage in that anybody can enjoy the dart game anytime and anywhere if there are only an arrow-headed dart and the dart target. In recent years, as various game methods have been developed and scoring methods have been organized, the dart game has been developed as worldwide leisure, and therefore, men and women of all ages have conveniently enjoyed the dart game.

It is inconvenient for to use a dart game apparatus and a dart game system in the related art and there are a lot of deficiencies in raising interest of users.

Accordingly, research into the dart game apparatus and the dart game system is continued.

As prior documents, Korean Patent KR1032367 discloses a structure for the dart game apparatus and Korean Patent KR1032368 discloses a dart game apparatus equipped with a photographing device.

SUMMARY OF THE INVENTION

The present disclosure has been made in an effort to provide a new-concept dart game apparatus.

An exemplary embodiment of the present disclosure provides a dart game apparatus. The dart game apparatus includes: a dart target having a plurality of score areas; a sensing unit sensing a hit location of a dart pin in the dart target; a display area formed to surround an exterior of the dart target, provided in a body structure of the dart game apparatus, and disposed to output a variable screen to a location adjacent to at least a part of an outline of the dart target; a target illumination unit irradiating light to the dart target or a periphery of the dart target; and a controller controlling the target illumination unit.

The dart game apparatus may further include a cover protecting the display area and the target illumination unit may at least partially contact one surface of the cover.

The target illumination unit may be attached to the cover.

The controller may determine an area to which the target illumination unit irradiates the light at least partially based on a hit location of a dart pin in the dart target.

The controller may determine an area hit by the dart pin in the dart target as the area which the target illumination unit irradiates the light.

The controller may determine a portion adjacent to a point where a line extending from a center of the dart target to the hit location of the dart pin meets the outline of the dart target as the area to which the target illumination unit irradiates the light.

Each of a plurality of score areas of the dart target may have a fan shape, and the controller may determine a portion adjacent to an arc of a fan-shaped score area hit by the dart pin among the plurality of fan-shaped score areas as a location e an event effect is displayed.

The controller may determine at least one of a pattern in which the target illumination unit irradiates the light and duration of the light at least partially based on the hit location of the dart pin in the dart target.

The controller may determine whether a predetermined event occurs at least partially based on progress information of a dart game which is currently in progress before the dart pin is thrown, and determine the area to which the target illumination unit irradiates the light based on an event which occurs when the predetermined event occurs.

The predetermined event may include a dart pin throwing opportunity to determine a win or loss of a dart game player, and the controller may determine the area to which the target illumination unit irradiates the light based on a score area to determine a win or loss of the dart game player in the dart target.

The predetermined event may include the dart pin throwing opportunity when a reversal is available at the time of throwing the dart pin, and the controller may determine the area to which the target illumination unit irradiates the light based on the score area of the dart target in which a reversal is available when the dart target is hit by the dart pin.

The controller may determine a location where the event effect is displayed in the display area at least partially based on the hit location of the dart pin in the dart target, and the dart game apparatus may further include an image projector projecting the event effect to a determined location of the display area under the control of the controller.

The display area of the body structure may have a shape in which a distance from a virtual surface extending upward from a throw line decreases from a center to a distal portion.

The body structure may further include a lower support extending in a direction of the throw line from an end contacting a ground of the display area along the ground and a cover extending from an upper end of the display area in an opposite direction to the dart target.

The image projector may include a first image projection unit disposed toward the display area on the lower support and a second image projection unit disposed toward the display area on the cover, and the controller may combine a first image projected from the first image projection unit and a second image projected from the second image projection unit and control the combined image to be output through association of the first and second images.

The controller may determine a portion adjacent to a point where a line extending from a center of the dart target to the hit location of the dart pin meets the outline of the dart target as a location where the event effect is displayed.

The controller may determine the location where the event effect is displayed based on the location of the score area hit by the dart pin among the plurality of score areas.

Each of the plurality of score areas may have a fan shape, and the controller may determine a portion adjacent to an arc of a fan-shaped score area hit by the dart pin among the plurality of fan-shaped score areas as the location where the event effect is displayed.

The controller may determine at least a part between extension lines of radii of the fan-shaped score area hit by the dart pin as the location where the event effect is displayed.

One or more dart target illumination units may be arranged on the back of the dart target in a direction facing the outside of the dart game apparatus to transfer a visual output through a gap between the segments constituting the dart target.

The controller may additionally determine score information of two or more users and compare the score information of the two or more users with each other, based on the hit location of the dart pin, and allow the event effect determined based on a mutual comparison result to be output to the display area.

The user may include a first user and a second user, and the controller may determine a first user area in which the score information depending on dart pin throwing of the first user is to be displayed and a second user area in which the score information depending on the dart pin throwing of the second user is to be displayed in the display area, and compare the score information of the first user and the score information of the second user with each other and when the superiority between the score information of the first user and the score information of the second user is changed, allow a reversal event effect to be output to at least one area of the first user area and the second user area.

The display area may include a display unit.

According to exemplary embodiments of the present disclosure, a new-concept dart game apparatus is provided to enhance interest of dart game users, improve convenience of the dart game users, and allow various persons to enjoy a dart game.

BRIEF DESCRIPTION OF THE DRAWINGS

Various aspects are now described with reference to the drawings and like reference numerals are generally used to designate like elements. In the following exemplary embodiments, for a description purpose, multiple specific detailed matters are presented to provide general understanding of one or more aspects. However, it will be apparent that the aspect(s) can be executed without the detailed matters. In other examples, known structures and apparatuses are illustrated in a block diagram form in order to facilitate description of the one or more aspects.

DETAILED DESCRIPTION

Figure 1:
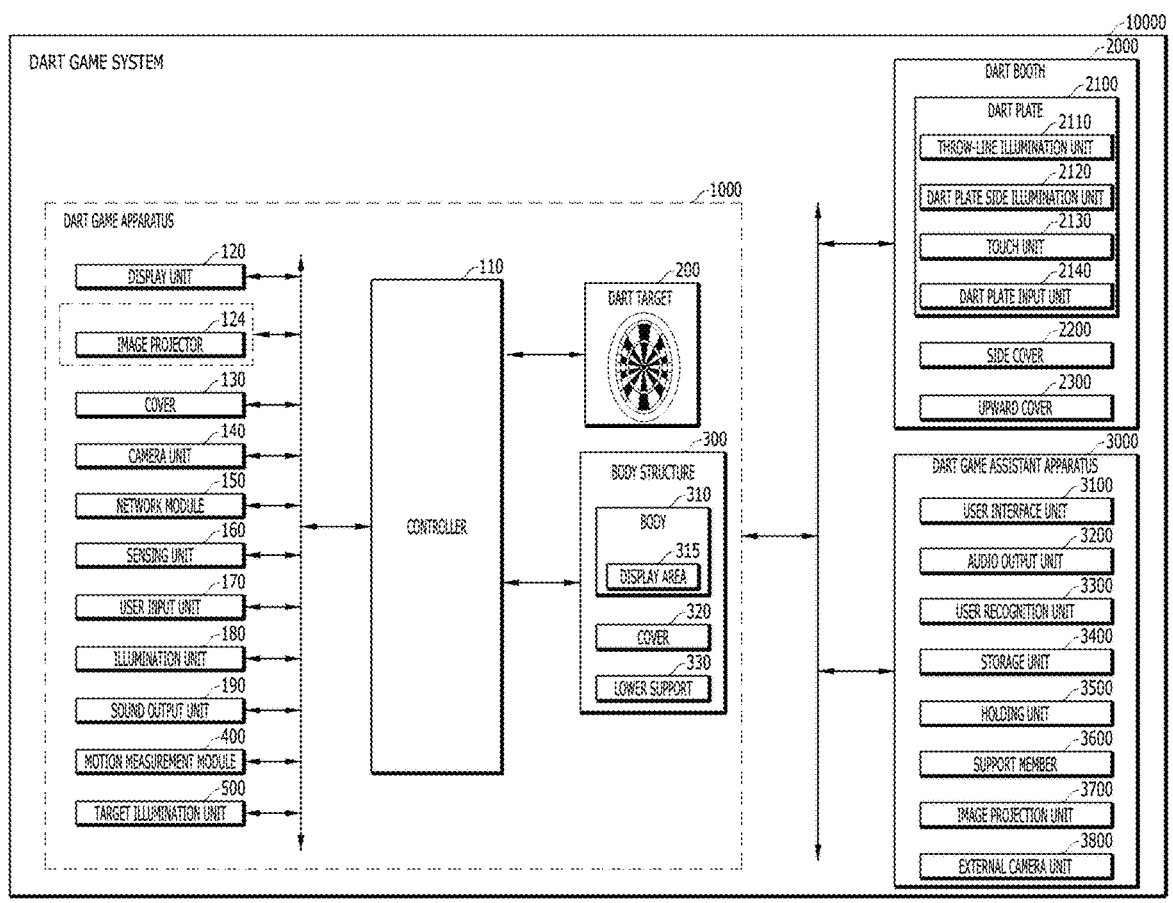
FIG. 1 is a diagram for describing components of a dart game system according to an exemplary embodiment of the present disclosure.

Various exemplary embodiments will now be described with reference to drawings and like reference numerals are used to refer to like elements throughout all drawings. In the specification, various descriptions are presented to provide appreciation of the present disclosure. However, it is apparent that the embodiments can be executed without the specific description. In other examples, known structures and apparatuses are presented in a block diagram form in order to facilitate description of the embodiments.

Various exemplary embodiments will now be described with reference to drawings. In the following description, for the purpose of a description, multiple detailed matters will be disclosed in order to help comprehensive appreciation of one or more exemplary embodiments. However, those skilled in the art will recognize even that the exemplary embodiment(s) can be executed without the detailed matters. In the following disclosure and the accompanying drawings, specific exemplary embodiments of one or more exemplary embodiments will be described in detail. However, the exemplary embodiments are exemplary and some of various methods in principles of various exemplary embodiments may be used and the descriptions are intended to include all of the exemplary embodiments and equivalents thereof.

Various exemplary embodiments and features will be presented by a system which may include multiple devices, components, and/or modules. It should also be appreciated and recognized that various systems may include additional apparatuses, components, and/or modules and/or that the various systems may not include all of apparatuses, components, modules, and the like discussed in association with the drawings.

In "exemplary embodiment", "example", "illustration", and the like used in the specification, it may not be construed that a predetermined embodiment or design which is described is more excellent or advantageous than other exemplary embodiments or designs. 'Component', 'module', 'system', 'interface', and the like which are terms used below generally mean computer-related entities and mean, for example, hardware, a combination of the hardware and software, and the software.

The term "or" is intended to mean not exclusive "or" but inclusive "or". That is, when not separately specified or not clear in terms of a context, a sentence "X uses A or B" is intended to mean one of the natural inclusive substitutions. That is, the sentence "X uses A or B" may be applied to all of the case where X uses A, the case where X uses B, and the case where X uses both A and B. Further, it should be understood that the term "and/or" used in the specification designates and includes all available combinations of one or more items among enumerated related items.

The term "comprises" and/or "comprising" means that the corresponding feature and/or component is present, but it should be appreciated that presence or addition of one or more other features, components, and/or a group thereof is not excluded. Further, when not separately specified or not clear in terms of the context that a singular form is indicated, it should be construed that a singular form generally means "one or more" in the present specification and the claims.

In the specification, the term "adjacent" may include two objects contacting each other. Further, the term "adjacent" does not include a case where two objects do not contact each other, but may include a case where two objects are close to each other and is not limited thereto.

The description of the presented exemplary embodiments is provided so that those skilled in the art of the present disclosure use or implement the present disclosure. Various modifications of the exemplary embodiments will be apparent to those skilled in the art and general principles defined herein can be applied to other exemplary embodiments without departing from the scope of the present disclosure. Therefore, the present disclosure is not limited to the exemplary embodiments presented herein, but should be analyzed within the widest range which is coherent with the principles and new features presented herein.

Throughout the specification, a variable screen may mean a changeable image. For example, the variable screen may include a motion picture and a still image. Alternatively, the variable screen may include a screen that changes from a first screen to a second screen, but is not limited thereto.

For example, the variable screen may include at least one of an image acquired by photographing a dart game operation of a dart game player, an image acquired by photographing a dart target, a background image, an image received from another dart game device, an image received from an external device, an information image regarding a dart game which is currently progressed, an information image acquired based on a current dart hit location, an event effect image of the dart game, an image showing a score of the dart target, and a lesson image for the dart game, but is not limited thereto.

Throughout the specification, the background image means an image output as a background of at least one other variable screen. For example, in a display area 315, another variable screen may be displayed together with the background image.

Hereinafter, exemplary embodiments according to the present disclosure will be described in detail with reference to the accompanying drawings.

FIG. 1 is a diagram for describing components of a dart game system according to an exemplary embodiment of the present disclosure.

According to the exemplary embodiment of the present disclosure, the dart game system 10000 may include a dart game apparatus 1000, a dart booth 2000, and a dart game assistant apparatus 3000.

The dart game apparatus 1000 may include at least one of a display unit 120, an image projector 124, a cover unit 130, a camera unit 140, a network module 150, a sensing unit 160, a user input unit 170, an illumination unit 180, a controller 110, a dart target 200, and a body structure 300, but is not limited thereto.

According to the exemplary embodiment of the present disclosure, the dart game apparatus 1000 may further include a memory (not illustrated).

The memory (not illustrated) may store a program for a motion of the controller 110 therein and temporarily store input/output data (e.g., a phone book, a message, a still image, a moving picture, or the like) therein. The memory (not illustrated) may store data regarding various patterns of vibrations and sounds output in the touch input on the touch screen.

The memory (not illustrated) may include at least one type of storage medium of a flash memory type storage medium, a hard disk type storage medium, a multimedia card micro type storage medium, a card type memory (for example, an SD or XD memory, or the like), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk. The dart game apparatus 1000 may operate in connection with a web storage performing a storing function of the memory (not illustrated) on the Internet.

The controller 110 generally controls all motions of the dart game apparatus 1000. For example, in the case of a dart game, the score sensed through the sensing unit 160 is aggregated for each game participant, and the aggregated score is transmitted to and received from another dart game apparatus connected through a network, and a game winning/losing record, the score, and the like depending on the aggregation result are recorded.

The controller 110 determines whether a throwing operation of a dart game user corresponds to an illegal act based on the image photographed by the camera unit 140, and when it is determined that the throwing operation corresponds to the illegal act, the controller 110 may allow an image showing that the throwing operation of the user corresponds to the illegal act to be output to the display area 315. For example, the controller 110 may control the display unit 120 to output an image indicating that the throwing operation of the user corresponds to the illegal act and control at least one of the image projector 124 and an image projection unit 3700 so as to allow at least one of the image projector 124 and the image projection unit 3700 to project the image indicating that the throwing operation of the user corresponds to the illegal act to the display area 315. According to another exemplary embodiment, the controller 110 may control at least one of the image projector 124 and the image projection unit 3700 so that at least one of the image projector 124 and the image projection unit 3700 projects the image indicating that the throwing operation of the user corresponds to the illegal act to a dart plate 2100.

The body structure 300 may include a body 310 provided in a vertical direction to a ground and supporting the dart game apparatus 1000, a cover 320 which extends in an opposite direction to a dart target from an upper end of the body 310 or a screen area, and a lower support 330 which extends in a throw line direction along the ground from an end contacting the body 310 or the ground of the screen area. The body structure 300 may further include a body structure illumination unit (not illustrated) disposed along at least one side of the body structure and having a line emission or plane emission type for displaying the body structure or a boundary of the screen area.

According to the exemplary embodiment of the present disclosure, a screen area 315 may be formed on a front surface of the body 310. The display area 315 means an area that may be formed to surround an outline of the dart target 200 to output the variable screen at a position adjacent to at least a part of the dart target 200.

According to the exemplary embodiment of the present disclosure, the display area 315 may be implemented by the display unit 120. For example, the display area 315 may include the display unit 120, and the display unit 120 may output the variable screen. In addition, the display area 315 may output the variable screen by accepting the image projected by the image projector 124.

According to the exemplary embodiment of the present disclosure, the display area 315 may occupy the periphery of the dart target 200. For example, the display area 315 may be formed so as to output the variable screen in an area adjacent to the outline of the dart target 200.

In one aspect, when the display area 315 is configured to include the display unit 120, the display unit 120 may be positioned on the bottom of the dart target 200. For example, when the display unit 120 is constituted by a display panel (an LCD panel, an LED panel, a PDP panel, or the like), the dart target 200 may be positioned on the front surface (a direction close to the throw line) of the display panel. In another exemplary embodiment, a receiving groove may be formed in the display panel, and the dart target 200 may be seated and placed in the receiving groove.

In another aspect, when the display area 315 is configured to include the image projector 125, the image projector 125 may be disposed to project the image to the periphery of the dart target 200. The display area 315 may be configured in a screen form in order to enhance a visual appearance of the image projected from the image projector 125. Specifically, the display area 315 may be formed by a plane or a curved surface colored with a color with high reflectivity.

The structure of the display area 315 described above is exemplary and the display area 315 according to the exemplary embodiment of the present disclosure is not constituted by any one component of the display unit 120 and the image projector 125. For example, the display area 315 may be configured by a combination of the display unit 120 and the image projector 125. For example, the display area positioned at the periphery of the dart target 200 may be constituted by the display unit 120 and the other part may be constituted by the screen to which the image is projected by the image projector 125 and vice versa.

Figure 2:
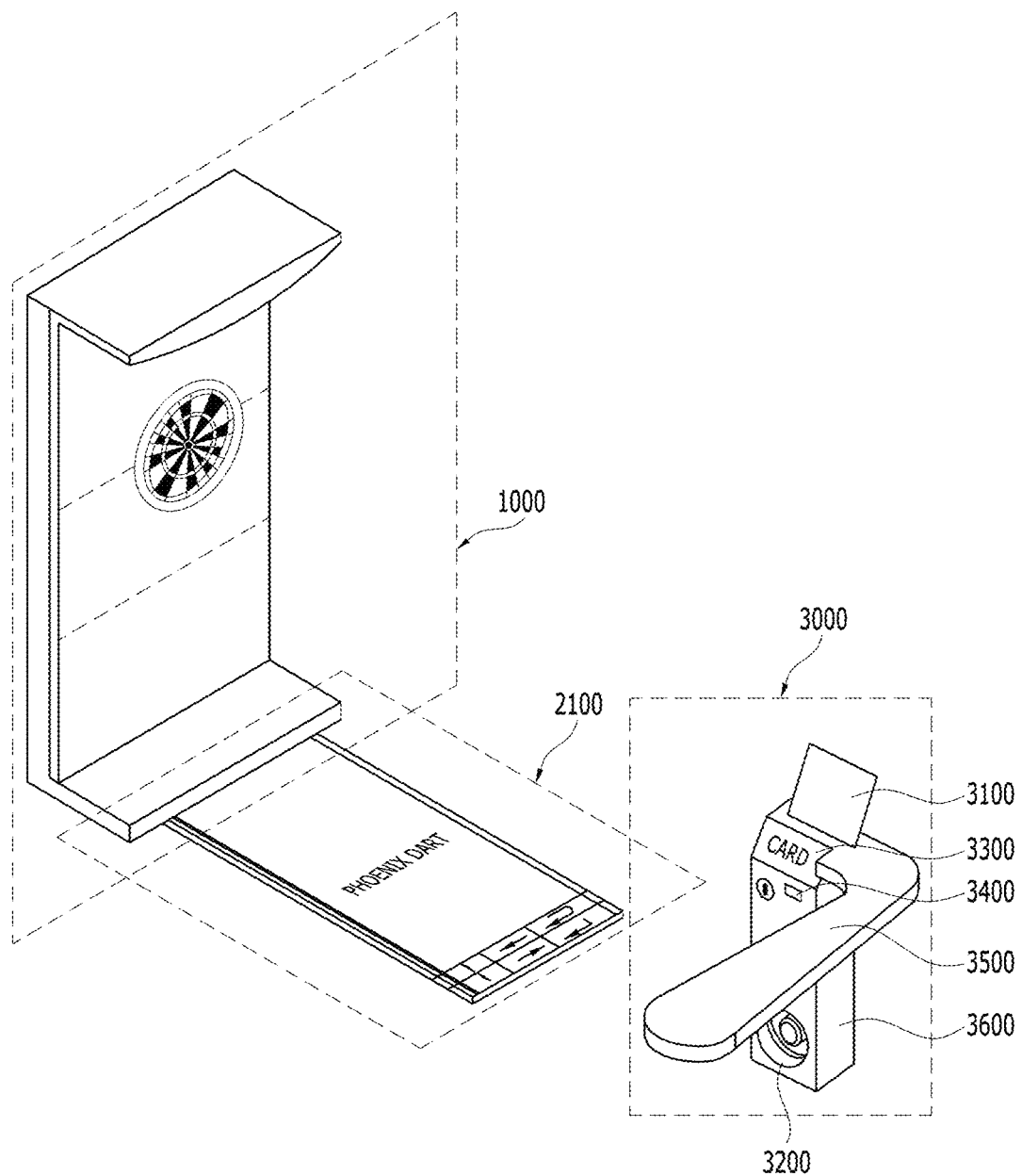
FIG. 2 is a diagram for describing the dart game system according to the exemplary embodiment of the present disclosure.
Figure 3:
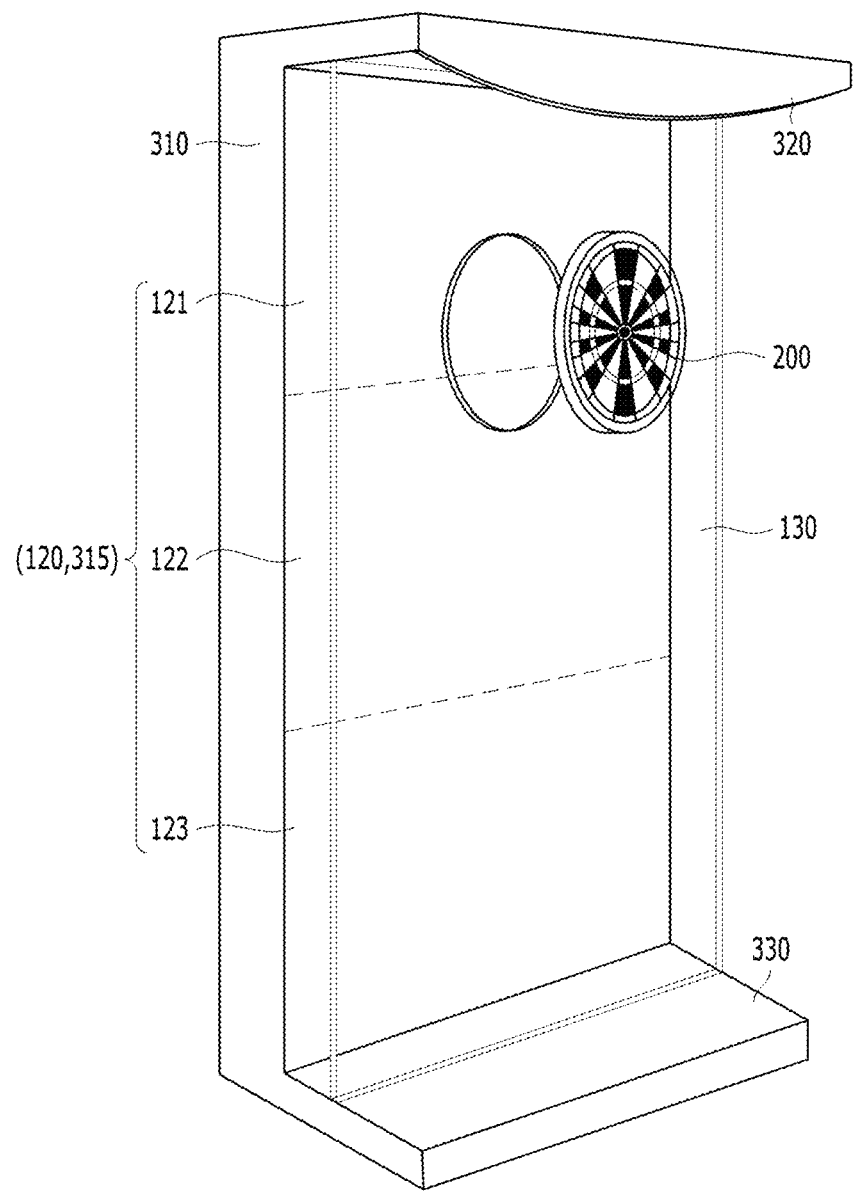
FIG. 3 is a diagram for describing the dart game apparatus equipped with a display unit according to the exemplary embodiment of the present disclosure.

In the dart game apparatus 1000 according to the exemplary embodiment of the present disclosure, the display area 315 may be formed over most of a front portion of the dart game apparatus 1000. As illustrated in FIGS. 2 and 3, or additional accompanying drawings, the front portion of the dart game apparatus 1000 may be constituted by the display area 315 except for a portion where the dart target 200 is exposed. The front portion of the dart game apparatus 1000 may mean a shape that is visually exposed when a user looks at the dart game apparatus 1000 beyond a throw line.

By configuring most of the front portion of the dart game apparatus 1000 as the display area 315, it is possible to express a visual effect that is differentiated from the dart game apparatus in the related art.

In another exemplary embodiment, the area corresponding to the periphery of the dart target 200 in the front portion of the dart game apparatus 1000 may be at least configured by the display area 315. Due to characteristics of the dart game, main plays in the game take place mainly on the dart target 200 and visual concentration of the player is relatively high in the dart target 200 and the periphery of the dart target 200. By configuring the periphery of the dart target 200 by the display area 315 capable of outputting the variable screen, various visual effects are output to an area where the visual concentration of the user is high to enhance satisfaction or immersion of the user. The dart target 200 may include a score board in which a bullseye is positioned at the center and there are areas segmented by a concentric circle centering the bullseye and straight lines extended radially from the bullseye and granted with individual scores, respectively. Multiple receiving grooves into which a tip of a dart may be inserted may be formed on the score board. In this case, shapes of areas at which the scores are arranged and to which the scores are granted in the dart target 200 may be variably changed. Further, the dart target 200 may be implemented in the form of a touch screen.

The sensing unit 160 may sense the play of a dart game player a real player) performed with respect to the dart target 200. For example, the sensing unit 160 may sense the hit location of the dart pin. The sensing unit 160 may electrically convert a score corresponding to the area which the dart hits to transmit the converted score to the controller 110. The sensing unit 160 may transmit information on the area where the dart hits to the controller 110 and the controller 110 may acquire the score based on the information on the hit location of the dart acquired from the sensing unit 160. In an additional exemplary embodiment, the sensing unit 160 may include piezoelectric elements. The piezoelectric elements may mean any type of element that generates an electrical signal in response to a change or change rate of pressure applied to the element. When the dart pin 200 hits the dart target 200, the electrical signal may be generated by the piezoelectric element in accordance with the pressure applied to the corresponding segment. At least partially based on the electrical signal, the controller 110 may determine a speed of the dart pin.

For example, the dart pin is thrown and flies, and reaches the dart target and stops. When the dart pin is completely stopped and there is no change in the shape of the piezoelectric element due to the dart pin, the electrical signal of the piezoelectric element also disappears. Therefore, an interval between the time when voltage starts to be generated by the piezoelectric element and the time when the generation of the electrical signal by the piezoelectric element disappears may be measured. When the measured time and acceleration are known, a throwing speed of the dart pin may be calculated.

When the dart target retreats by the dart pin and the dart target retreats to its original position, the voltage in an opposite direction to the retreating of the dart target at the piezoelectric element is generated. Therefore, the interval between the time when the voltage starts to be generated by the piezoelectric element and the time when the voltage by the piezoelectric element starts to be in the opposite direction to the time when the dart target retreats may be measured. When the measured time and acceleration are known, the throwing speed of the dart pin may be calculated.

The user input unit 170 receives an input of the user for controlling the dart game apparatus 1000. The user t unit 170 may be implemented by at least e of a keypad, a dome switch, a touch pad (resistive/capacitive), a jog wheel, and a jog switch and is not limited thereto.

The user input unit 170 may include a short-range communication unit (not illustrated). When the user input unit 170 includes the short-range communication unit of the network module ISO, the user input unit 170 may be configured to receive the user input which is input by an external console device. As short range communication technology, Bluetooth, radio frequency identification (RFID), infrared data association (IrDA), ultra wideband (UWB), ZigBee, or the like may be used.

For example, when the user input unit 170 performs the short range communication using infrared communication, the external console device may be an infrared remote controller. Alternatively, when the user input unit 170 performs the short range communication using a Bluetooth function, the external console device may be a mobile device including a Bluetooth module. The mobile device including the Bluetooth module may be, for example, a smart phone including the Bluetooth module.

In an additional exemplary embodiment of the present disclosure, the user input unit 170 may receive information from the dart pin. For example, the dart game apparatus 1000 may receive information included in a dart pin identification module such as an NFC chip or an RFID chip embedded in the dart pin through the user input unit 170. As an example, the information of the dart pin may include mass information, weight information, manufacturer information, length information, shape information, and/or predetermined identification information for identifying the dart pin. Further, according to another exemplary embodiment of the present disclosure, the dart game apparatus 1000 may not include the user input unit 170. In addition, according to another exemplary embodiment of the present disclosure, the operations and functions of the user input unit 170 of the dart game apparatus 1000 may be performed by being substituted or combined with at least one of a user interface unit 3100, a user recognition unit 3300, and/or a storage unit 3400 of the dart game assistant apparatus 3000.

A sound output unit 190 may output audio data received from the network module 150 or stored in the memory 180 in a sound effect of the game, a game motion guide, a game method description, and the like. The sound output unit 190 may also output a sound signal related with a function (e.g., the game sound effect) performed by the dart game apparatus 1000. The sound output unit 190 may also output a speech of a game player or a third person using another dart game apparatus, which is received through the network module 150. The sound output unit 190 may include a receiver, a speaker, a buzzer, and the like. Additionally, the sound output unit 190 may vary and output a volume/a type of music according to the location where the dart pin reaches the dart target. Additionally, the sound output unit 190 may vary and output the volume/the type of music so as to correspond to the speed of the dart pin.

The display unit 120 displays (outputs) information processed in the dart game apparatus 1000. For example, when the dart game apparatus 1000 is in a game play method guidance mode, the display unit 120 may output a selectable game play method. When the dart game apparatus 1000 is playing a game, the display unit 120 may output an image acquired by photographing the game player or a third person using another dart game apparatus received through the network module 150.

The display unit 120 may display a dart game image. According to the exemplary embodiment of the present disclosure, the dart game image may include a dart game play image of a real person, a dart game play animation image of a character of the real person, a dart game play animation image of a virtual character, and an image displaying an image in which the dart pin hits the dart target for each team.

The display unit 120 may be implemented by at least one of a liquid crystal display (LCD), a thin film transistor-liquid crystal display (TFT LCD), an organic light-emitting diode (OLED), a flexible display, and a 3D display and is not limited thereto.

Some displays among them may be configured as a transparent or light transmissive type to view the outside through the displays. This may be called a transparent display. The transparent display may include, for example, a transparent OILED (TOILED), and the like. In another exemplary embodiment, the transparent display may be implemented by alternatively arranging a transparent or light transmissive module and a display module.

According to the exemplary embodiment of the present disclosure, the display unit 120 may include a touch sensor. The touch sensor may be configured to convert a change in pressure applied to a specific portion of the display unit 120 or capacitance generated at the specific portion of the display unit 120 into an electrical input signal. The touch sensor may be configured to detect touch pressure as well as a touched position and area.

When there is a touch input for the touch sensor, a signal(s) corresponding to the touch input is(are) sent to a touch controller. The touch controller processes the signal(s) and thereafter, transmits data corresponding thereto to the controller 110. As a result, the controller 110 may know which region of the display unit 120 is touched.

According to another exemplary embodiment of the present disclosure, the image projector 124 may replace or combine the function of the display unit 120. For example, the image projector 124 may project the variable screen to the display area 315 and the display area 315 may receive the image projected from the image projector 124 to output the image so as to allow the user to view the image.

For easy description of the disclosure, the present disclosure will be described below based on the dart game apparatus 1000 including the display unit 120. However, according to another exemplary embodiment of the present disclosure, the operations of the dart game apparatus 1000 implemented by the display unit 120 may be implemented or partially replaced by the image projector 124.

The illumination unit 180 outputs a signal for notifying occurrence of an event of the dart game apparatus 1000. Examples of the event which occurs from the dart game apparatus 1000 include identification of the dart game player, hitting of the dart, a change of the dart game player, game over, and the like. The illumination unit 180 may include a light emission diode (LED) and notify the occurrence of the event to the user by flickering the LED. Additionally, the illumination unit 180 may vary and output vary the type of light emission, the intensity of light emission, and/or the flicker cycle depending on the position at which the dart pin reaches the dart target. Additionally, the sound output unit 190 may vary and output the volume/the type of music so as to correspond to the speed of the dart pin.

The LEDs are disposed on the bottom of the dart target 200 to be flickered according to a flickering pattern which is pre-stored according to the occurrence of the event. For example, one or more LEDs may be allocated to respective parts of the dart target 200. The allocated LEDs are disposed on the bottom of the dart target 200 and may be disposed in a direction orienting the outside of the dart game apparatus 1000. When the LEDs irradiate light, the light irradiated by the LEDs may pass through the dart target 200 made of a transparent or translucent material to transfer a visual output to the user. Alternatively, the light irradiated by the LEDs may transfer the visual output to the user through a gap existing in the dart target 200. The LEDs may be arranged linearly along both sides of the dart game apparatus 1000. The LEDs may extend along both sides of the dart game apparatus 1000 and additionally extend along the side of the dart plate 2000.

The camera unit 140 may include one or more cameras. An image frame processed by the camera unit 140 may be stored in the memory (not illustrated) or transmitted to the outside through the network module 150. Two or more camera units 140 may be provided according to a use environment. For example, at least a part of the camera unit 140 may be disposed on the lower support and at least another part of the camera unit 140 may be disposed on the cover 320.

At least some cameras of the camera unit 140 may be disposed to photograph the image frame including the dart target 200 and other cameras may be disposed to photograph the image frame directly related with a game rule in the dart game play.

For example, the camera may be disposed to photograph a throw-line on which the dart is thrown in order to photograph the image frame directly related with the dart game rule. Further, the camera may be arranged to photograph a user that throws the dart pin. Multiple cameras included in the camera unit 140 may be disposed to photograph at least some image frames to overlap with each other.

When the camera unit 140 is implemented by one camera, the camera may be a panoramic camera disposed to photograph both at least a part of the dart target 200 and the image frame (e.g., the throw-line in the dart game) directly related with the game rule.

The image photographed by the camera unit 140 may be output to the display area. 315 under the control of the controller 110. For example, the display unit 120 may output the image photographed by the camera unit 140 and the image projector 124 may project the image photographed by the camera unit 140 to the display area 315.

In this case, the image photographed by the camera unit 140 may be output to different areas within the display area 315. For example, an area in which the image photographed by a first camera included in the camera unit 140 is displayed may be different from an area in which the image photographed by a second camera included in the camera unit 140 is displayed. In this case, the age photographed by the first camera may include the image of the dart game user. In addition, the image photographed by the second camera may include the image of the dart target, but is not limited thereto.

A location at which the image photographed by the camera unit 140 is output may vary depending on the dart game user. For example, a location where the photographed image is displayed when the camera unit 140 photographs an image related to the dart game of a first user and a location where the photographed image is displayed when an image related to the dart game of a second user is photographed by the camera unit 140 may be different from each other.

In an additional exemplary embodiment of the present disclosure, the camera unit 140 photographs the dart pin to input information on the dart pin in the dart game apparatus 1000. For example, the camera unit 140 recognizes a QR code of the dart pin and the dart game apparatus 1000 may thus recognize identification information of the dart pin.

In another exemplary embodiment of the present disclosure, at least one of the cameras constituting the camera unit 140 may be arranged to photograph a part of a body of the player. In an exemplary embodiment, data regarding a part of the body of the player photographed by the camera unit 140 may be biometric data for identification of the player. The biometric data may include fingerprint data, face recognition data, iris recognition data, and the like. In an exemplary embodiment the biometric data may be transmitted to the controller 110 of the dart game apparatus 1000 and used for player identification. In another exemplary embodiment, the biometric data may be transmitted to an external server that stores player identification information via the network module 150 and used for player identification.

In yet another exemplary embodiment of the present disclosure, at least one of the cameras constituting the camera unit 140 may be used to measure the throwing speed of the dart pin. For example, one camera 140 photographs two or more dart pin images at a predetermined time interval to measure a movement speed of the dart pin. As another exemplary embodiment, the movement speed of the dart pin may be measured using the images of the dart pins photographed by the two or more cameras 140 and positional relationship information of the two or more cameras 140, which is preset.

The network module 150 may include one or more modules that enable wireless communication between the dart game apparatus 1000 and a wired/wireless communication system or between the dart game apparatus 1000 and a network on which the dart game apparatus 1000 is positioned. Further, the network module 150 may include one or more modules that enable wireless and/or wired communication between the dart game apparatus 1000, the dart game assistant apparatus 3000, and the dart booths 2000.

The network module 150 may include a wired/wireless Internet module for network access. As the wireless Internet technology, wireless LAN (WLAN) (Wi-Fi), wireless broadband (Wibro), world interoperability for microwave access (Wimax), high speed downlink packet access (HSDPA), or the like, may be used. As wired Internet technology, a digital subscriber line (XDSL), fibers to the home (FTTH), power line communication (PLC), or the like may be used.

The network module 150 includes a short-range communication unit to transmit and receive data to and from an electronic apparatus positioned in a comparatively short range from the dart game apparatus 1000 and including the short-range communication unit. As short range communication technology, Bluetooth, radio frequency identification (RFID), infrared data association (IrDA), ultra wideband (UWB), ZigBee, or the like may be used.

The network module 150 may sense a connection state of the network and a transceiving speed of the network.

Data received through the network module 150 may be output, stored through the memory (not illustrated), or transmitted to other electronic apparatuses positioned in a short range through the short-range communication unit.

According to an exemplary embodiment of the present disclosure, the dart game apparatus 1000 may provide a dart game match-up mode including at least one player playing at a remote place via the network module 150.

The cover 130 may be provided adjacent to the display area 315 to protect the display area 315. For example, the cover 130 may be positioned between a virtual surface extending upward from the throw line and the display unit 120. In this case, since the cover 130 is positioned adjacent to the display unit 120, the risk of damage to the display unit 120 may be reduced.

According to an exemplary embodiment of the present disclosure, the dart target 200 may be seated on the cover 130. For example, an opening may be present in the cover 130 and the dart target 200 may be seated in the opening. In another example, the cover 130 has a receiving groove, and the dart target may be seated in the receiving groove. The cover 130 may be configured to include two or more cover panels. In this case, the opening or receiving groove may be formed on a boundary surface of two or more cover panels.

At least a part of the cover 130 may have optical transmittance. For example, a part of the cover 130 may be transparent, the other part may be translucent, and another part may be opaque. As another example, the entirety of the cover 130 may be transparent and the entirety of the cover 130 may be opaque. A degree of transparency of the cover 130 is not limited to the above example, but may be diversified.

According to another exemplary embodiment of the present disclosure, the image may be output to at least a part of the cover 130. For example, an advertisement image may be output to at least a part of the cover 130, but the present disclosure is not limited thereto and various images may be output. Specifically, for example, at least a part of the cover 130 may autonomously output the image. As another example, the image may be output to at least a part of the cover 130 by the variable screen projected by the image projector 124 or the image projection unit 3700. In another example, the cover 130 may be coupled with a part of the illumination unit 500 to output the image or a signal. For example, at least two LED light sources (not illustrated) may be embedded in the cover 130. Specifically, the cover 130 may include multiple LED light sources (not illustrated) embedded in a grid shape at predetermined intervals from each other. A flicking mode of the multiple LED light sources (not illustrated) may be controlled by the controller 110. A specific pattern or letter, signal, or the like may be expressed according to the flickering mode of the multiple LEI) light sources (not illustrated). Since the multiple LED light sources (not illustrated) are arranged at the predetermined intervals, the user may detect the display unit 120 through the intervals.

A motion measurement module 400 may obtain the speed at which the dart pin moves. For example, since the motion measurement module 400 may include a microwave module (e.g., a continuous wave (CW) radar sensor), the motion measurement module 400 may obtain the speed at which the dart pin moves by using a Doppler effect in which a frequency of a wave varies. The speed measurement module is not limited to the above-described exemplary embodiment and may obtain the movement speed of the thrown dart pin in various methods.

In another exemplary embodiment, the motion measurement module may be configured to include optical sensors (e.g., infrared sensors) disposed at two or more predetermined locations. The time that the dart pin passes through the area sensed by each optical sensor may be obtained by the motion measurement module 400. Therefore, the controller 110 may measure the throwing speed of the dart pin.

The target illumination unit 500 may irradiate light toward at least one part of the dart target 200 and the periphery of the dart target 200. In this case, the periphery of the dart target 200 may mean a portion adjacent to the outline of the dart target 200 on the same plane as the dart target 200.

The target illumination unit 500 may output the signal for notifying the occurrence of the event of the dart game apparatus 1000. Examples of the event which occurs from the dart game apparatus 1000 include identification of the dart game player, direct hit of the dart, a change of the dart game player, game over, and the like. Since the target illumination unit 500 may include a light emission diode (LED), the target illumination unit 500 may irradiate light toward the dart target 200 or the periphery of the dart target 200 by flickering the LED. Additionally, the target illumination unit 500 may vary and output the type of light emission, the intensity of light emission, and/or the flicker cycle depending on the location at which the dart pin reaches the dart target.

The target illumination unit 500 may be disposed at least partially in contact with the cover 130. For example, the target illumination unit 500 may be disposed on one side of the cover 130 facing the dart game apparatus. Further, the target illumination unit 500 may be disposed on one side of the cover 130 facing the throw line. Further, the target illumination unit 500 may be disposed on an inner surface of the hole included in the cover 130. In this case, the target illumination unit 500 may be attached to the cover 130.

As another example, the target illumination unit 500 may be disposed between the cover 130 and the display area 315.

The target illumination unit 500 may determine an area to which the light is irradiated under the control of the controller 110.

The controller 110 may determine the area where the target illumination unit 500 irradiates the light at least partially based on the location which the dart pin hits.

For example, when the dart pin reaches the dart target 200, the sensing unit 160 may obtain information on the location where the dart pin reaches the dart target 200 and the controller 110 may determine the area to which the target illumination unit 500 irradiates the light at least partially based on the obtained location information.

Specifically, the controller 110 may determine the area which the dart pin hits as the area where the target illumination unit 500 irradiates the light.

A portion adjacent to a point where a line extending from the center of the dart target to the location which the dart pin hits meets the outline of the dart target may be determined as the area to which the target illumination unit 500 irradiates the light.

The controller 110 may determine a portion matching the location which the dart pin hits as the area to which the target illumination unit 500 irradiates the light. For example, when the dart pin hits a specific location, the controller 110 may determine an area matching the hit location as the area to which the target illumination unit 500 irradiates the light.

The controller 110 may determine a portion matching an area including the location which the dart pin hits as a location at which an event effect is to be displayed. For example, the dart target 200 may be divided into a plurality of fan-shaped areas and the controller 110 may divide a portion adjacent to an arc of the fan-shaped area including the portion which the dart pin hits as the area to which the target illumination unit 500 irradiates the light.

The controller 110 may determine an area which belongs to a predetermined distance range from the location within the dart target to which the dart pin is thrown as the area to which the target illumination unit 500 irradiates the light.

The controller 110 may determine at least one of a pattern in which the target illumination unit 500 irradiates the light and duration of the irradiated light, at least partially based on the location which the dart pin hits.

For example, when the dart pin hits a predetermined location, the controller 110 may determine a pattern based on the location where the dart pin is determined as the pattern in which the target illumination unit 500 irradiates the light. For example, in the case where the dart pin hits a double score area, the controller 110 may control the target illumination unit 500 to flicker twice and/or control the target illumination unit 500 to irradiate the light during a duration which is relatively twice longer than the case where the dart pin hits a single score area. As another example, in the case where the dart pin hits a triple score area, the controller 110 may control the target illumination unit 500 to flicker three times and/or control the target illumination unit 500 to irradiate the light during a duration which is relatively three times longer than the case where the dart pin hits the single score area.

The controller 110 may determine whether a predetermined event occurs based on dart game progress information. For example, the control unit 110 can determine whether the predetermined event occurs by determining whether a current dart pin throwing opportunity of the dart game player is included in the predetermined event. Specifically, for example, the controller 110 may determine that the predetermined event occurs when the current dart pin throwing opportunity of the dart game player is included in the predetermined event.

In this case, the predetermined event may include at least one of a dart pin throwing opportunity to determine a win or loss of the dart game player and a dart pin throwing opportunity when a reversal is possible at the time of throwing the dart pin, but is not limited thereto.

The controller 110 may determine a recommendation score area of the dart target 200 based on information on the event which occurs and determine the area to which the target illumination unit 500 irradiates the light based on the determined recommendation score area.

For example, when the occurring event is the dart pin throwing opportunity that determines the win or loss of the dart game player, the controller 110 may determine a score area of determining the win or loss as the recommendation score area when the dart pin reaches and determine the area to which the target illumination unit 500 irradiates the light based on the determined recommended score area.

Specifically, for example, the controller 110 may determine the recommendation score area as the area to which the target illumination unit 500 irradiates the light, determine a portion matching the recommendation score area as the area to which the target illumination unit 500 irradiates the light, and determine a portion adjacent to a point where a virtual line which simultaneously passes through the recommendation score area and an original point of the dart target meets the outline of the dart target as the area to which the target illumination unit 500 irradiates the light and the present disclosure is not limited thereto.

According to an exemplary embodiment of the present disclosure, the controller 110 may control the pattern of the light irradiated by the target illumination unit 500 based on the identification information of the user who throws the dart pin.

For example, the controller 110 may control the target illumination unit 500 so that a color of the light irradiated by the target illumination unit 500 in a situation in which the first user throws the dart and a color of the light irradiated by the target illumination unit 500 in a situation in which the second user throws the dart are different from each other.

According to an exemplary embodiment of the present disclosure, the controller 110 may determine whether the user is scheduled to throw the dart pin and control the pattern of the light irradiated by the target illumination unit 500 based on the determination.

For example, the controller 110 may receive a signal indicating whether the user is to throw the dart through the touch unit 2130 and change the intensity of the light irradiated by the target illumination unit 500 based on the received signal. Specifically, the controller 110 may allow the intensity of the light irradiated by the target illumination unit 500 to be strong while the user touches the touch unit 2130 disposed on at least a part of the dart plate 2100. As another example, the controller 110 may allow the intensity of the light irradiated by the target illumination unit 500 to be weak or allow the target illumination unit 500 not to irradiate the light while the user touches the touch unit 2130 disposed on at least a part of the dart plate 2100.

As yet another example, the controller 110 may control the target illumination unit 500 so that the color of the light irradiated by the target illumination unit 500 while the user touches the touch unit 2130 disposed on at least a part of the dart plate 2100 is different from the color of the light irradiated by the target illumination unit 500 while the user does not touch the touch unit 2130.

According to an exemplary embodiment of the present disclosure, the dart booth 2000 may include a side cover 2200, an upper cover 2300, and a dart plate 2100 and the dart plate 2100 may include a throw-line illumination unit 180, a dart plate side illumination unit 2120, the touch unit 2130, and a dart plate input unit 2140, but the present disclosure is not limited thereto.

The throw-line illumination unit 2110 refers to an illumination unit for displaying a throw line which is a reference line for throwing the dart pin by the user. For example, illuminations e.g., LED, OILED, etc.) for displaying the throw line may be successively provided in a specific portion of the dart plate 2100. The dart game user may easily recognize the throw line which is the reference line for throwing the dart pin by the throw-line illumination unit 2110.

The dart plate side illumination unit 2120 refers to an illumination unit formed along at least one side of the dart plate 2100 to display a boundary line of the dart plate 2100. The dart plate side illumination unit 2120 enables the dart plate 2100 to be distinguished from the ground even in a dark place, which may prevent the dart user from failing down by the dart plate 2100.

The touch unit 2130 refers to a module that is disposed on at least a part of the dart plate 2100 and recognizes the touch input of the user. For example, the touch unit 2130 may extend in a direction away from the dart target 200 from the throw-line illumination unit 2110. In this case, the touch unit 2130 may be positioned adjacent to at least a part of the throw-line illumination unit 2110.

In this case, the touch unit 2130 may be configured to include a conductive pressure sensing member. For example, the touch unit 2130 may be implemented by at least one of a pressure sensing conductive film and a pressure sensing conductive cloth, but is not limited thereto. When the dart game user applies force to at least a part of the conductive pressure sensing member, resistance of the conductive pressure sensing member is changed, and as a result, the touch unit 2130 may recognize that the touch is made.

The controller 110 may determine whether the user intends to throw the dart pin based on the signal from the touch unit 2130. For example, when the dart game user touches the touch unit 2130, the controller 110 may determine that the user intends to throw the dart pin.

According to an exemplary embodiment of the present disclosure, the controller 110 may operate the camera unit 140 when the dart game user intends to throw the dart pin. For example, the controller 110 may operate the camera unit 140 when the dart game user touches the touch unit 2130. According to another exemplary embodiment of the present disclosure, the controller 110 may edit a dart game image photographed based on a tune when the dart game user intends to throw the dart pin. For example, the controller 110 edits the image photographed by the camera unit 140 to acquire an image for a predetermined time based on the time when the dart game user touches the touch unit 2130 among the images continuously photographed by the camera unit 140 and store the acquired image.

According to another exemplary embodiment of the present disclosure, the controller 110 may determine an edition point of the image photographed by the camera unit 140 based on at least one of the time when the dart game user touches the touch unit 2130 and the time when the dart pin hits the dart target 200. For example, the controller 110 may control only a moving picture up to a time when a predetermined time (e.g., 0.2 seconds) elapses from the time when the dart pin hits the dart target 200 to be stored from a time before a predetermined time (e.g., 0.1 second) from the time when the dart game user touches the touch unit 2130. As another example, the controller 110 may control only the moving picture for a predetermined time (for example, 0.1 second) before and after the time when the dart pin hits the dart target 200 to be stored. However, this is exemplary and the controller 110 may determine the edition point including another time other than the above time. Further, the controller 110 may vary and set a predetermined time for determining the edition point from the above time as necessary.

The dart plate input unit 2140 is disposed in at least a part of the dart plate to receive an input associated with execution of the dart game from the user. Further, the controller 110 may control the operations of the dart game based on the input from the dart plate input unit 2140. For example, the dart plate input unit 2140 may be provided at a location closer to the dart target 200 than the throw-line illumination unit 2110 in the dart plate. In this case, the dart plate input unit 2140 may include a leftward input area, a rightward input area, an upward input area, a downward input area, a selection input area, and a cancellation input area, but is not limited thereto.

In another exemplary embodiment, the dart plate input unit 2140 may be provided at a location farther from the dart target 200 than the throw-line illumination unit 2110. In another exemplary embodiment of the present disclosure, the dart plate input unit 2140 may be incorporated with the touch unit 2130. In this case, the dart plate input unit 2140 and the touch unit 2130 may be configured to include the conductive pressure sensing member. Depending on a mode of the dart game apparatus 1000, the signal input through the conductive pressure sensing member may be recognized as a signal corresponding to the input area constituting the dart plate input unit 2140. Depending on another mode of the dart game apparatus 1000, the signal input through the conductive pressure sensing member may be recognized as the signal input into the touch unit 2130.

In this case, the dart plate input unit 2140 may include the conductive pressure sensing member. For example, the dart plate input unit 2140 may be implemented by including at least one of the pressure sensing conductive film and the pressure sensing conductive cloth, but is not limited thereto.

The controller 110 may adjust input information that may be input by the dart plate input unit 2140, partially based on at least one of the identification information of the user and pre-stored user designation information. For example, each of the dart game users may store information that may be input through the dart plate input unit 2140 in advance and when the user is identified based on the identification information acquired by the dart game apparatus 1000, the controller 110 may adjust the information which may be input through the dart plate input unit 2140 based on the pre-stored information. In this case, the adjusted information may include information on selection and cancellation of the game mode and information on selection and cancellation of the player, but is not limited thereto.

Specifically, for example, the user may select the number of dart game players, a dart game play mode (a zero one game, a cricket game, and the like), and the dart game mode (a single play, a network play, and the like) through the dart plate input unit 2140. Further, according to an exemplary embodiment of the present disclosure, the user may select a virtual player through the dart plate input unit 2140.

The user may select a dart game match-up mode that may be played together with the virtual player through the dart plate input unit 2140. For example, the user may select "With mode" to play as one team with the virtual player via the dart plate input unit 2140 or "Vs mode" to play as a different team from the virtual player.

The controller 110 may determine whether to activate the dart plate input unit 2140 partially based on at least one of the identification information of the user and the pre-stored user designation information. For example, each of the dart game users may pre-store information indicating whether to use the dart plate input unit 2140 and when the dart game user is identified based on the identification information acquired by the dart game apparatus 1000, the controller 110 may determine whether to activate the dart plate input unit 2140 based on the pre-stored information.

According to an exemplary embodiment of the present disclosure, the dart game assistant apparatus 3000 may include a user interface unit 3100, an audio output unit 3200, a user recognition unit 3300, a storage unit 3400, a mounting unit 3500, and a support member 3600. In addition, the dart game assistant apparatus 3000 may optionally further include an image projection unit 3700, and may optionally further include an external camera unit 3800.

The dart game assistant apparatus 3000 may be fixedly disposed on the around while being spaced apart from the dart game apparatus 1000 by a predetermined distance in an opposite direction to the dart target 200. For example, the dart game assistant apparatus 3000 may be fixedly disposed on the ground while being spaced apart from the dart plate 2100 which is connected the dart game apparatus 1000 and extended along the ground in the opposite direction to the dart target 200 by a predetermined distance in the opposite direction to the dart target 200.

The user interface unit 3100 according to the exemplary embodiment of the present disclosure may be a device that is provided in the dart game assistant apparatus 3000 and receives a user's input for controlling the dart, game apparatus 1000. As one example, the user interface unit 3100 may include a keypad, a dome switch, a touch pad (resistive/capacitive), a jog wheel, a jog switch, a touch screen having a display function, and like, but is not limited thereto.

In an aspect, the dart game user may operate the dart game apparatus 1000 through the user interface unit 3100 provided in the dart game assistant apparatus 3000. Specifically, the user may select the number of dart game players, the dart game play mode (the zero one game, the cricket game, and the like), and the dart game mode (the single play, the network play, and the like) through the user interface unit 3100. Further, the user may input information for selecting the dart game match-up mode playable together with the virtual player through the user interface unit 3100. For example, the user may select "With mode" to play as one team with the virtual player via the user interface unit 3100 or "Vs mode" to play as a different team from the virtual player.

According to another exemplary embodiment of the present disclosure, the user interface unit 3100 may receive a users input for controlling the display area 315 of the dart game apparatus 1000. For example, the dart game user may adjust the size of the variable screen displayed on the display area 315 through the user interface unit 3100. Specifically, the display area 315 may be divided into a plurality of areas and at least one of the sizes of the plurality of respective areas may be adjusted by the user interface unit 3100.

The location of at least one of the plurality of areas may also be adjusted by the user interface unit 3100. Specifically, the location of at least one of the plurality of areas may be moved to the upper portion of the display area 315 by the user interface unit 3100. Further, the location of at least one of the plurality of areas may be moved to the lower portion of the display area 315 by a control signal input through the user interface unit 3100.

The variable screen displayed in at least one of the plurality of areas included in the display area 315 may be adjusted by the user interface unit 3100. For example, when the variable screen for the dart game user is preset to be displayed in a first area, the preset display of the variable screen may be changed to displaying the variable screen for the dart target by the control signal input through the user interface unit 3100. As another example, the variable screen for game progress information may be set to be displayed in the first area by the control signal input through the user interface unit 3100.

In this case, the variable screen adjusted by the user interface unit 3100 may include at least one of the image photographed by the camera unit 140, an image received from another dart game apparatus, an image received from the external device, information on the dart game which is currently progressed, acquired information depending on a current dart hitting location, the event effect of the dart game, a lesson image for the dart game, an expected acquired score, and an advertisement image, but the present disclosure is not limited thereto.

According to another exemplary embodiment of the present disclosure, the user interface unit 3100 may display the variable screen. The variable screen displayed in the user interface unit 3100 may be diversified. For example, the variable screen displayed by the user interface unit 3100 may include at least one of the image photographed by the camera unit 140, the image received from another dart game apparatus, the image received from the external device, information on the dart game which is currently progressed, the acquired information depending on the current dart hitting location, the event effect of the dart game, the lesson image for the dart game, the expected acquired score, and the advertisement image, but the present disclosure is not limited thereto.

In this case, the variable screen displayed in the display area 315 and the variable screen displayed in the user interface unit 3100 may be interlocked. For example, the variable screen displayed in the user interface unit 3100 may be the same as at least one of the variable screens displayed in the display area. Further, the variable screen displayed in the user interface unit 3100 may be a reduced screen of at least one of the variable screens displayed in the display area.

In this case, the variable screen displayed on the user interface unit 3100 may be at least one of the images displayed in the display area 315, which may be adjusted by the control signal received by the user interface unit 3100. For example, a plurality of variable screens may be displayed in the display area 315, and a variable screen selected by the user through the user interface unit 3100 among the plurality of variable screens may be displayed in the user interface unit 3100.

The user interface unit 3100 may communicate with the dart game apparatus 1000 via a wired communication network or a wireless communication network. For example, the user interface unit 3100 may communicate with the dart game apparatus 1000 through Bluetooth, radio frequency identification (RFID), infrared data association (IrDA), ultra wideband (UWB), ZigBee, or the like.

The controller 110 may adjust the input information that may be input by the user interface unit 3100, partially based on at least one of the identification information of the user and pre-stored user designation information. For example, each of the dart game users may pre-store the information that may be input through the user interface unit 3100 and when the user is identified based on the identification information acquired by the dart game apparatus 1000, the controller 110 may adjust the information which may be input through the user interface unit 3100 based on the pre-stored information. In this case, the adjusted information may include at least one of the information on selection and cancellation of the game mode, the information on selection and cancellation of the player, information on a dart game execution history, information on user authentication, and information related with payment of a dart game expense, but is not limited thereto.

According to another exemplary embodiment of the present disclosure, the controller 110 may determine whether to activate the user interface unit 3100 partially based on at least one of the identification information of the user and the pre-stored user designation information. For example, each of the dart game users may pre-store information indicating whether to use the user interface unit 3100 and when the dart game user is identified based on the identification information acquired by the dart game apparatus 1000, the controller 110 may determine whether to activate the user interface unit 3100 based on the pre-stored information.

According to an exemplary embodiment of the present disclosure, the mounting unit 3500 may be formed on a portion of an upper surface of the dart game assistant apparatus 3000 so as to receive an object of the user. For example, the mounting unit 3500 may extend from the support member 3600 in the direction parallel to the ground. In this case, the upper surface of the mounting unit 3500 may maintain a predetermined height from the ground so that the dart game user may place at least one of food, beverage, and an object. The upper surface of the mounting unit 3500 may be provided with at least one receiving groove for mounting various articles, but the present disclosure is not limited thereto.

The support member 3600 may support at least one of the user interface unit 3100 and the mounting unit 3500 so that at least one of the user interface unit 3100 and the mounting unit 3500 on the upper surface of the dart game assistant apparatus 3000 is isolated from the ground. For example, the support member 3600 supports the user interface unit 3100 such that the user interface unit 3100 may be isolated from the ground while maintaining a predetermined distance from the ground. As a result, the user may conveniently utilize the user interface unit 3100.

The audio output unit 3200 interlocks with the dart game apparatus 1000 to output a sound based on an event generated in the dart game apparatus 1000. For example, the audio output unit 3200 may output audio data received from the network module 150 or stored in the memory (not illustrated) in a sound effect of the game, a game motion guide, game method description, and the like. The audio output unit 3200 may output a sound signal related with the function (e.g., the game sound effect) performed by the dart game apparatus 1000. The audio output unit 3200 may also output a speech of the game player or a third person using another dart game apparatus, which is received through the network module 150. The audio output unit 3200 may include a receiver, a speaker, a buzzer, and the like, but the present disclosure is not limited thereto. Additionally, the audio output unit 3200 may vary and output a volume/a type of music according to the location where the dart pin reaches the dart target. Additionally, the audio output unit 3200 may vary and output the volume/the type of music so as to correspond to the speed of the dart pin.

In this case, the audio output unit 3200 is positioned relatively closer to the dart game user than the sound output unit 190 provided in the dart game apparatus 1000 and generates the sound to enhance an interest of the dart game.

The external camera unit 3800 may photograph whether the user throws the dart pin beyond the throw line. For example, the external camera unit 3800 photographs a location adjacent to the throw line to photograph an image in which the user throws the dart pin. In addition, the external camera unit 3800 may photograph audiences watching the dart game, but is not limited thereto and may photograph various images.

According to another exemplary embodiment of the present disclosure, the image projection unit 3700 may project the image to the display area 315 of the dart game apparatus 1000. For example, the image projection unit 3700 projects the image to the display area 315 of the dart game apparatus 1000 to replace the function of the image projector 124 according to an exemplary embodiment of the present disclosure.

The image projection unit 3700 may allow the image to be output to the dart plate 2100 by projecting the variable screen to the dart plate 2100.

The user recognition unit 3300 recognizes unique information of a long-range user by using a radio wave through the radio frequency identification (RFID) technology which is a kind of the short range communication technology. For example, the user may possess a card, a mobile terminal, or unique dart game equipment (for example, his/her own personal dart equipment) which includes an RFID module. Information (e.g., a personal ID, an identification code, and the like of the user registered in the database server) for identifying the user may be recorded in the RFID module possessed by the user. The user recognition unit 3300 may identify the RFID module possessed by the user to identify a dart game player which plays the game by using the dart game apparatus 1000 and update a database for the identified dart game player or accumulate new data.

The user recognition unit 3300 may use various technologies (e.g., the short-range communication technology such as the Bluetooth, and the like) that may transmit and receive unique information of the user by a contact/non-contact method in addition to the RFID technology. Further, the user recognition unit 3300 may include a biodata identification module that identifies biodata (speech, a fingerprint, and a face) of the user by interworking with the microphone of the user interface unit 3100, the touch pad, the camera unit 140, and the like.

The storage unit 3400 may store a bill or a coin for performing the dart game. For example, the storage unit 3400 may store bills such as 1,000 won or 5,000 won directly from the dart game user.

The storage unit 3400 can acquire game credits from the dart game user. For example, the storage unit 3400 may acquire the game credits through the RFID card of the dart game user and acquire the game credits through the network module 150.

In this case, the game credit may be money required for performing the dart game and the storage unit 3400 is not limited to the method and may acquire the game credit from the user in various methods.

FIG. 2 is a diagram for describing a dart game system according to an exemplary embodiment of the present disclosure.

According to the exemplary embodiment of the present disclosure, the dart game system 10000 may include a dart game apparatus 1000, a dart booth 2000, and a dart game assistant apparatus 3000 and the dart booth 2000 may include a dart plate 2100.

The dart game user may enjoy the dart game through the dart game system 10000. In this case, the dart game apparatus 1000 may include a display area 315 formed in a shape surrounding the outline of the dart target 200, so that the dart game apparatus 1000 may generate various effects.

For example, based on the location of the dart pin which reaches the dart target 200, the interest of the user in the dart game may be enhanced by outputting the event effect.

By outputting the score area of the dart target 200 to the display area 315 in various methods, the user may easily identify the score of the dart target 200 and the user may more easily perform the dart game by the scores of the dart target 200, which are output differently according to a situation.

According to another exemplary embodiment of the present disclosure, the input in the dart game apparatus 1000 is performed through the dart plate input unit 2140 provided in the dart plate 2100 and/or the user interface unit 3100 provided in the dart game assistant apparatus 3000, and as a result, the various situations uncomfortable for the dart game user may not occur.

For example, the dart game user may perform the input in the dart game apparatus 1000 through the dart plate input unit 2140 and/or the user interface unit 3100 provided in the dart game assistant apparatus 3000, and as a result, there is no need to move to the dart game apparatus 1000 in order to perform the input in the dart game apparatus 1000. In particular, this allows the dart game user to directly perform the input for the dart game without the need to move to the dart game apparatus 1000 when the dart game user is a disabled person (e.g., a person with a leg injury, etc.).

According to an exemplary embodiment of the present disclosure, the dart game assistant apparatus 3000 may include the user interface unit 3100, the audio output unit 3200, the user recognition unit 3300, the storage unit 3400, the mounting unit 3500, and the support member 3600. A detailed description thereof has been given above in FIG. 1.

FIG. 3 is a diagram for describing the dart game apparatus equipped with a display unit according to the exemplary embodiment of the present disclosure.

According to the exemplary embodiment of the present disclosure, the dart game apparatus 1000 may include the display unit 120, the cover 130, the dart target 200, and the body structure 300. In this case, the display unit 120 may be displayed to output the variable screen to a location adjacent to at least a part of the outline of the dart target 200.

For example, the dart target 200 may be disposed in contact with the display unit 120. Specifically, for example, the display unit 120 may have the receiving groove and the dart target 200 may be seated in the receiving groove. In another exemplary embodiment, the display unit 120 may be constituted by a plurality of display units and the display units may have a shape capable of forming the receiving grooves to expose the dart target 200. For example, one display unit may have a hemispherical receiving groove. In this case, the other one display unit may have the hemispherical receiving groove which is coupled with the receiving groove formed in the one display device to form a circular receiving groove. However, this is exemplary and the receiving groove may be formed in one display unit constituting the display unit 120 or in three or more display units. In this case, the dart pin thrown by the dart game player may reach the dart target 200 through a hole formed in the cover 130.

The dart target 200 may be seated in the hole formed in the cover 130 or the receiving groove formed in the cover 130. Alternatively, the dart target 200 may be exposed through the opening formed in the cover 130. In this case, the cover 130 may be disposed between the display unit 120 and the throw line so as to expose the dart target 200 and protect the display unit 120. In this case, the dart target 200 may be disposed between the display unit 120 and the throw line. A portion where the dart target 200 is disposed in the order of the display unit 120 and the dart target 200 based on a remote distance from the throw line. In this case, as described above, the dart target 200 may be exposed through the receiving groove or the opening formed in the cover 130. A portion where the dart target 200 is not disposed in the order of the display unit 120 and the cover 130 based on the remote distance from the throw line.

When the display unit 120 is positioned on the back of the dart target 120 based on the throw line 120, the display unit 120 may be disposed at a portion adjacent to the outline of the dart target 120 when being viewed by the user who is positioned on the throw line. The display unit 120 may output the variable screen to the location adjacent to at least a part of the outline of the dart target 200 under the control of the controller 110. The variable screen may include play information determined based on the location where the dart hits the dart target 200, an event effect that may be displayed according to satisfaction of a specific event condition, an advertisement promotional image intended to be exposed to the user, the image received through the network module 150, the image photographed by the camera unit 140 of the dart game apparatus 1000, or information accompanying other visual effects, but the present disclosure is not limited thereto. The variable screen may have the form of a still image or a motion picture.

In an exemplary embodiment of the present disclosure, the dart target 200 may be defined to include only segments to which different scores are assigned according to the game rule of the dart game and boundary lines that divide the segments. In this case, the score assigned to each segment may be displayed as one of the variable screens by the display unit 120. Specifically, in the portion adjacent to the outline of the dart target 200 according to an exemplary embodiment of the present disclosure, the score corresponding to the single play of the nearest segment may be displayed through the display unit 120. However, this is exemplary and the variable screen displayed at the portion adjacent to at least a part of the outline of the dart target 200 is not limited to the single-play score. For example, event effects, user-related information (a user's character, a real image, etc.), and the like may be displayed at the portion adjacent to at least a part of the outline of the dart target 200, but the present disclosure is not limited thereto.

When the user hits the dart in an area corresponding to a double segment or a triple segment of the dart target 200, the display unit 120 may display a process of calculating the score obtained in the corresponding play in the adjacent area of the dart target 200. The process of calculating the score obtained in the corresponding play will be described in detail with reference to FIG. 9.

Depending on a progress situation of the play, a variety of information may be displayed in the portion positioned in the adjacent area of the dart target 200. As an example, play information may be displayed. The play information may include an acquired score depending on a current dart hitting location, an expected acquired score, and expected result information. For example, in the 01 game, location information of the segment that should be hit to finally win may be displayed. Alternatively, the location information of the segment in which the score is enabled to be obtained may be displayed in the cricket game. A method for displaying the location information may be achieved by the display unit 120 displaying a highlight effect in the area closest to the location of the segment.

According to an exemplary embodiment of the present disclosure, the display unit 120 may be implemented by at least one display unit. Further, one or more respective display units may be independently controlled by the controller 110. In another exemplary embodiment, one or more respective display units may be interlockingly controlled to implement a single image over the plurality of display units by the controller 110.

For example, the display unit 120 may be implemented by three display units 121, 122, and 123 and three respective display units 121, 122, and 123 may be independently controlled by the controller 110. For example, different images may be output to three respective display units. Alternatively, three display units interlock with each other to display respective portions implementing the single image.

In this case, boundary lines among the display units may be arranged in a direction parallel to the ground and the boundary lines of the display units and a circumference formed by the dart target 200 may meet. For example, the boundary line between a first display unit 121 and a second display unit 122 is positioned on the rear surface of the dart target 200, and as a result, the boundary line and the circumference formed by the dart target 200 may meet.

The boundary lines among the display units may be distinguished by a bezel implementing the outline of each display unit. The dart target 200 may be positioned on the boundary line configured by the bezel. In this case, the dart target 200 may be disposed such that the boundary line configured by the bezel does not pass through the center line of the dart target 200.

According to another exemplary embodiment of the present disclosure, the boundaries among the display units may be arranged in a direction perpendicular to the ground.

Each of the display units may be implemented as a flat display panel. Further, each of the display units may be implemented as a curved display panel, but is not limited thereto.

The cover 130 may be positioned between the display unit 120 and the throw line to prevent the display unit 120 from being damaged by the dart pin thrown by the dart user. For example, since the cover 130 is positioned adjacent to the display unit 120, between the display unit 120 and the throw line.

In this case, the hole may be formed in the cover 130, and the dart target 200 may be seated in the hole formed in the cover 130.

At least a part of the cover 130 may be made of a material having optical transmittance. For example, the entirety of the cover 130 may be transparent. Further, a part of the cover 130 may be transparent, a part of the cover 130 may be translucent, and a part of the cover part 130 may be opaque, but the present disclosure is not limited thereto.

According to another exemplary embodiment of the present disclosure, a degree of transparency of the cover 130 may be varied according to an electrical signal applied to the cover 130, so that the degree of transparency of the cover 130 may be varied under the control of the controller.

The image may be output to at least a pail of the cover 130. For example, the advertisement image may be output to at least a part of the cover 130, but the present disclosure is not limited thereto and various images (e.g., a dart game image, a dart ability analysis image, and the like) may be output.

According to another exemplary embodiment of the present disclosure, the display unit 120 may be provided with the receiving groove, and the dart target 200 may be provided in the receiving groove of the display unit 120. In this case, the cover 130 may be provided with the hole and the dart pin thrown by the dart player may reach the dart target 200 through the hole included in the cover 130.

According to yet another exemplary embodiment of the present disclosure, the receiving groove may be formed in the cover 130 and the dart target 200 may be seated in the receiving groove formed in the cover 130.

According to an exemplary embodiment of the present disclosure, the dart game apparatus 1000 may include the body structure 300.

The body structure 300 may include a body 310 provided in a vertical direction to a ground and supporting the display unit 120 of the dart game apparatus 1000, a cover 320 which extends in an opposite direction to a dart target from an upper end of the display unit 120, and a lower support 330 which extends in a throw line direction along the ground from an end of the display unit 120 contacting the ground.

Referring to FIG. 3, the body 310 may be implemented in a quadrangular plate shape, but is not limited thereto and the body 310 may be implemented in various shapes. For example, the body 310 may be implemented in a quadrangular pillar shape. In this case, the controller 110 of the dart game apparatus 1000 may be provided in a space (for example, a space included in the quadrangular pillar) provided in the body 310.

According to an exemplary embodiment of the present disclosure, in the cover 320, at least a part of the illumination unit 180 may be provided and at least a part of the sound output unit 190 may be provided. Further, at least a part of the camera unit 140 may be provided.

Even in the lower support 330, at least a part of the illumination unit 180 may be provided, at least a part of the sound output unit 190 may be provided, and at least a part of the camera unit 140 may be provided.

Figure 4:
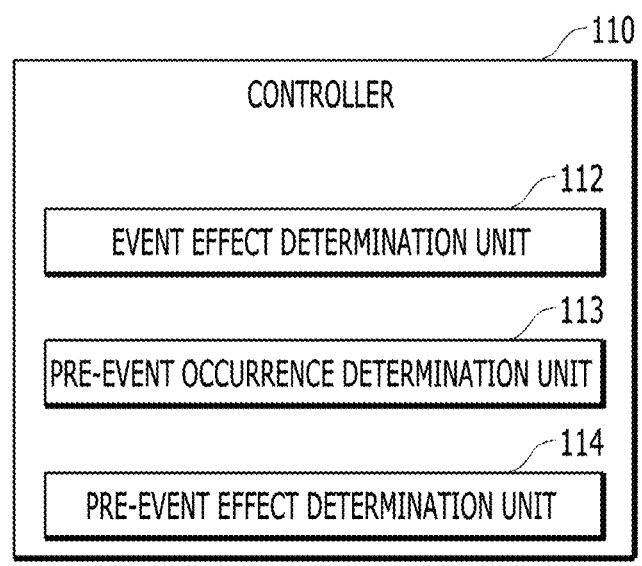
FIG. 4 is a diagram for describing a controller according to the exemplary embodiment of the present disclosure.

FIG. 4 is a diagram for describing a controller according to the exemplary embodiment of the present disclosure.

The controller 110 may control the variable screen displayed in the display area 315. For example, the controller 110 may control the variable screen displayed in the display area 315 by controlling the display unit 120, control the variable screen displayed in the display area 315 by controlling the image projector 124, and control the variable screen displayed in the display area 315 by controlling the image projection unit 3700 of the dart game assistant apparatus 3000. The following description will be focused on the display unit 120, but the following detailed descriptions may be implemented even by the image projector 124 and/or the image projection unit 3700 of the dart game assistant apparatus 3000.

According to an exemplary embodiment of the present disclosure, the controller 110 may include at least one of an event effect determination unit 112, a pre-event generation determination unit 113, and a pre-event effect determination unit 114. In this case, the controller 110 may be implemented by one processor and implemented by a plurality of processors, but is not limited thereto.

The event effect determination unit 112 may determine a location where the event effect is displayed in the display area 315 at least partially based on the location which the dart pin hits.

For example, when the dart pin reaches the dart target 200, the sensing unit 160 may obtain information on the location where the dart pin reaches the dart target 200 and the event effect determination unit 112 may determine the location where the event effect is displayed in the display area 315 at least partially based on the obtained location information.

Specifically, the event effect determination unit 112 may determine a portion adjacent to a point where a line extending from the center of the dart target to the location which the dart pin hits meets the outline of the dart target as the location at which the event effect is to be displayed.

The event effect determination unit 112 may determine a portion matching the location which the dart pin hits as the location at which the event effect is to be displayed. For example, when the dart pin hits a specific location, the event effect determination unit 112 may determine a location on the display area 315, which matches the hit location as the location at which the event effect is to be displayed.

The event effect determination unit 112 may determine a portion matching an area including the location which the dart pin hits as the location at which the event effect is to be displayed. For example, the dart target 200 may be divided into a plurality of fan-shaped areas and the event effect determination unit 112 may determine a portion adjacent to an arc of a fan-shaped area including the portion which the dart pin hits as the location at which the event effect is displayed.

The event effect determination unit 112 may determine a location in the screen area, which belongs to a predetermined distance range from the location in the dart target where the dart pin is thrown as a location where the event effect is displayed in the screen area.

However, an event effect output location is not unconditionally dependent on the hit portion of the dart pin and the display unit 120 may output the event effect regardless of the location of the segment which the dart pin hits. For example, the event effect may be displayed in the display unit 120 regardless of the location of the segment which the dart pin hits.

The event effect determination unit 112 may determine at least one of the type of the event effect, the duration of the event effect, and the area of the event effect.

For example, the event effect determination unit 112 may determine the event effect at least partially based on the location which the dart pin hits. For example, when the dart pin hits a predetermined location, the event effect determination unit 112 may determine an animation effect based on the location where the dart pin is determined as the event effect. For example, when dart pin hits the double score area, the event effect determination unit 112 may control the display area 315 so that a base score (X) and a final score (X*3) are displayed according to a temporal order. As another example, when the dart pin hits the triple score area, the event effect determination unit 112 may control the display area 315 so that the base score (X) and the final score (X*3) are displayed according to the temporal order.

As another example, the event effect determination unit 112 may determine the duration of the event effect at least partially based on the location which the dart pin hits. For example, the duration of the event effect when the dart pin hits the double score area may be longer than the duration of the event effect when the dart pin hits the single score area (e.g., may be twice longer than the duration when the dart pin hits the single score area). Further, the duration of the event effect when the dart pin hits the triple score area may be longer than the duration of the event effect when the dart pin hits the double area.

The pre-event generation determination unit 113 may determine whether a predetermined event is generated based on dart game progress information. For example, the pre-event generation determination unit 113 may determine whether the predetermined event occurs by determining whether a current dart throwing opportunity of the dart game player is included in the predetermined event. Specifically, for example, the pre-event generation determination unit 113 may determine that the predetermined event occurs when the current dart pin throwing opportunity of the dart game player is included in the predetermined event.

In this case, the predetermined event may include at least one of a dart pin throwing opportunity to determine a win or loss of the dart game player and a dart pin throwing opportunity when a reversal is possible at the time of throwing the dart pin, but is not limited thereto.

The pre-event effect determination unit 114 may determine a recommendation score area of the dart target 200 based on information on the event which occurs and determine a pre-event effect based on the determined recommendation score area. For example, when the occurring event is the dart pin throwing opportunity that determines the win or loss of the dart game player, the pre-event effect generation determination unit 114 may determine a score area of determining the win or loss as the recommendation score area when the dart pin reaches and output the pre-event effect based on the determined recommended score area.

Specifically, for example, the pre-event generation effect determination unit 114 may determine a portion matching the recommendation score area as a location where the pre-event effect is to be displayed and determine a portion adjacent to a point where a virtual line that simultaneously passes through the recommendation score area and the dead center of the dart target meets the outline of the dart target meet as the location where the pre-event effect is to be displayed, but the present disclosure is not limited thereto.

In this case, the pre-event effect may be determined based on at least one of the pre-event and the determined recommendation score area. For example, the pre-event effect may be an effect including a phrase "win" when the pre-event is the dart pin throwing opportunity that determines the win or loss of the dart game player and an effect including a phrase "reversal" when the pre-event is the dart pin throwing opportunity when reversal is available at the time of throwing the dart pin, but is not limited thereto. In addition, when the recommendation score area is 20 points, the pre-event effect may an effect that includes "20", but the present disclosure is not limited thereto.

According to an exemplary embodiment of the present disclosure, the controller 110 may determine at least one of the type of the image displayed in the display area 315 and the location of the area in which the image is to displayed in the display area 315 based on the identification information of the user who throws the dart pin.

For example, the controller 110 pray control the dart game apparatus 1000 so that the location where the image is displayed in the display area 315 in the situation in which the first user throws the dart and the location where the image is displayed in the display area 315 in the situation in which the second user throws the dart are different from each other.

Specifically, the screen area may be divided into a first user area in which an image related to the first user is outputted and a second user area in which an image related to the second user is to be output and the first user area and the second user area may be formed as separate areas from each other in the screen area.

The controller 110 may control the display area 315 such that different images are displayed in the display area 315 according to the obtained user identification information when the same situation occurs in the dart game.

According to an exemplary embodiment of the present disclosure, the controller 110 may determine whether the user is scheduled to throw the dart pin and control the image not to be displayed in the display area 315 based on the determination. For example, the controller 110 may receive the signal indicating whether the user projects the dart through the touch unit 2130 and control the image not to be displayed in the display area 315 based on the received signal. Specifically, the controller 110 may control the display area 315 so as to prevent the image from being displayed in the display area 315 while the user touches the touch unit 2130 disposed on at least a part of the dart plate 2100.

Figure 5:
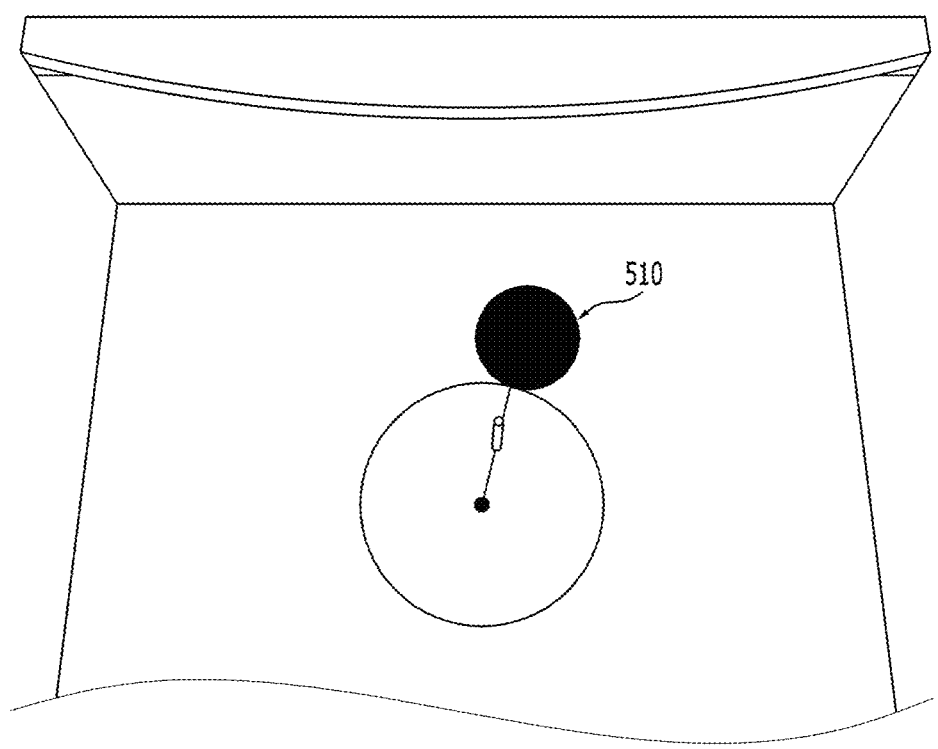
FIG. 5 is a diagram for describing a method for determining an event effect according to an exemplary embodiment of the present disclosure.

FIG. 5 is a diagram for describing a method for determining an event effect according to an exemplary embodiment of the present disclosure.

According to an exemplary embodiment of the present disclosure, when the dart pin reaches the dart target 200, the sensing unit 160 may obtain the information on the location where the dart pin reaches the dart target 200 and the event effect determination unit 112 may determine the location where the event effect is displayed in the display unit 120 at least partially based on the obtained location information.

Referring to FIG. 5, the event effect determination unit 112 may determine a portion 510 adjacent to a point where a line extending from the center of the dart target to the location which the dart pin hits meets the outline of the dart target as the location at which the event effect is to be displayed when the dart pin reaches the dart target.

It is only an exemplary embodiment of the present disclosure that the adjacent portion 510 illustrated in FIG. 5 contacts the dart target and the adjacent portion 510 may not contact the dart target.

The adjacent portion 510 illustrated in FIG. 5 is exemplary and the adjacent portion 510 according to the exemplary embodiment of the present disclosure may be refer to a predetermined area positioned near the dart target. As an example, the adjacent portion 510 may refer to an area surrounding the dart target. Specifically, the adjacent portion 510 may, be output on the display unit 120 to form a score display area (not illustrated) indicating a base score assigned to each segment of the dart target. In this case, the display unit 120 may be controlled to implement the visual effect that changes according to a game play result or reward in the score display area (not illustrated).

For example, a display unit 120 constituted by the plurality of display units may display a single event effect displayed over the plurality of display units. In this case, when at least a portion of the single event effect is displayed in the portion 510 adjacent to the outline of the dart target 200, it may be expressed that the single event effect is displayed in the adjacent portion 510 of the display unit 120.

Figure 6:
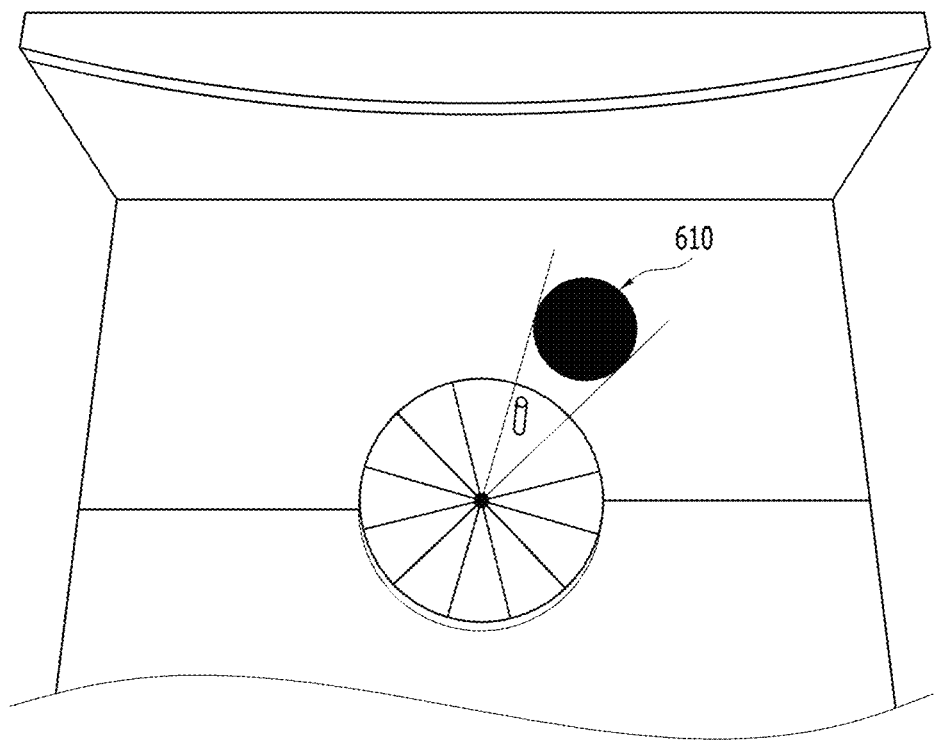
FIG. 6 is a diagram for describing a method for determining an event effect according to another exemplary embodiment of the present disclosure.

FIG. 6 is a diagram for describing a method for determining an event effect according to another exemplary embodiment of the present disclosure.

According to an exemplary embodiment of the present disclosure, when the dart pin reaches the dart target 200, the sensing unit 160 may obtain the information on the location where the dart pin reaches the dart target 200 and the event effect determination unit 112 may determine the location where the event effect is displayed in the display unit 120 at least partially based on the obtained location information.

Referring to FIG. 6, the dart target 200 may be divided into a plurality of fan-shaped areas and the event effect determination unit 112 may determine a portion 610 adjacent to an arc of a fan-shaped area including the portion which the dart pin hits as the location at which the event effect is to be displayed.

Figure 7:
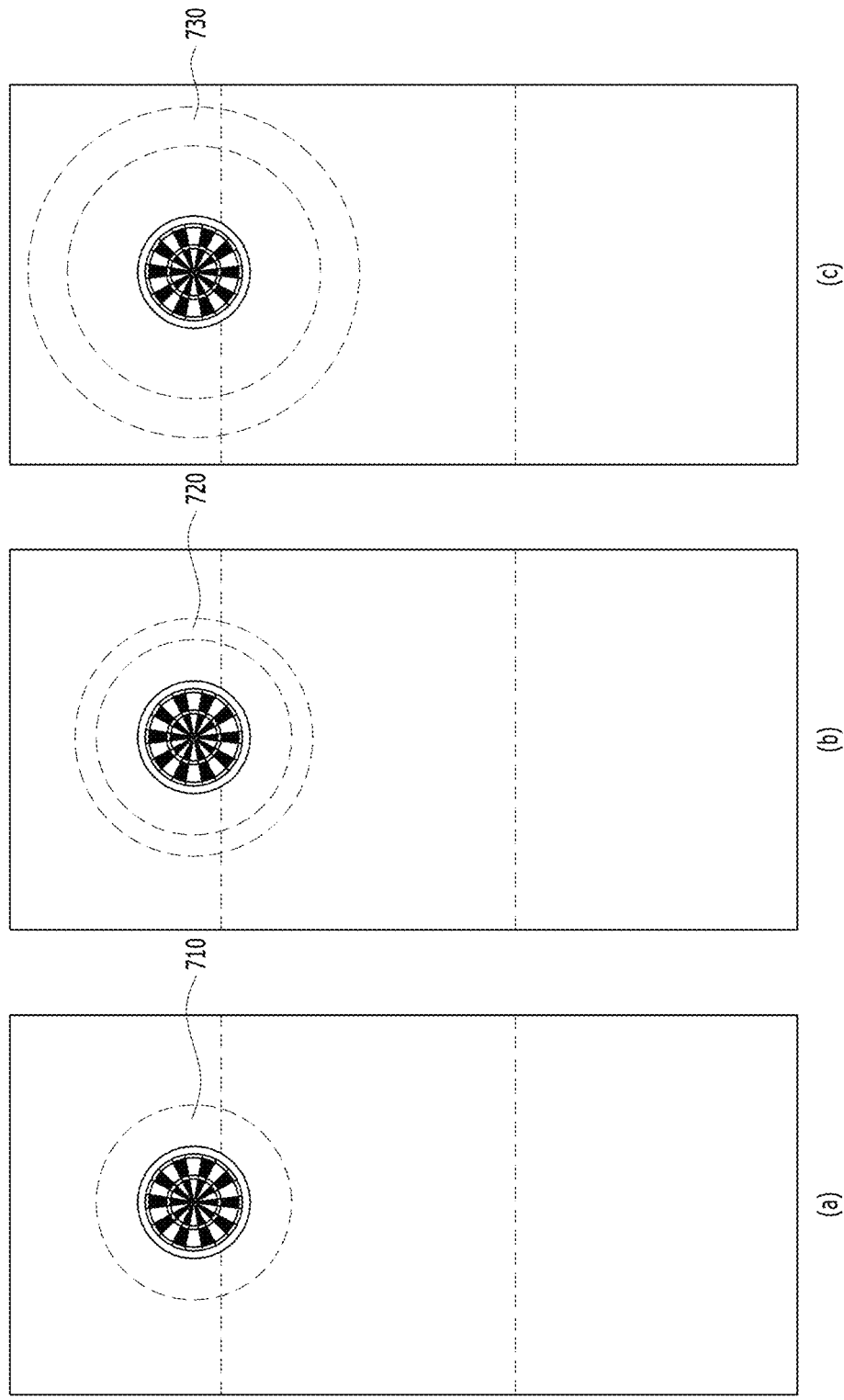
FIG. 7 is a diagram for describing a method for displaying a variable screen surrounding a dart target in a display area according to the exemplary embodiment of the present disclosure.

FIG. 7 is a diagram for describing a method for displaying a variable screen surrounding a dart target in a display area according to an exemplary embodiment of the present disclosure.

According to an exemplary embodiment of the present disclosure, the variable screen may be output to a location adjacent to the dart target 200 in the display area 315.

For example, the variable screen may be displayed in the form of surrounding the dart target. Specifically, referring to FIG. 7A, the variable screen may be displayed so as to form a score display area (not illustrated) indicating a base score assigned to each segment of the dart target in the form 710 of surrounding the dart target. In this case, the variable screen may be output by the display unit 120 and projected by the image projector 124.

According to another exemplary embodiment of the present disclosure, the area in which the variable screen is displayed may be changed based on the control signal input by at least one of the user interface unit 3100 and a game setting input unit 3200.

For example, when referring to FIGS. 7A, 7B, and 7C, in the case where the user intends to widen the area in which the variable screen is displayed, the area where the variable screen is displayed may be gradually widened from an area 710 of FIG. 7A to an area 730 of FIG. 7C via an area 720 of FIG. 7B.

As another example, when the user intends to narrow the area in which the variable screen is displayed, the area where the variable screen is displayed may be gradually narrowed from the area 730 of FIG. 7C to the area 710 of FIG. 7A via the area 720 of FIG. 7B.

The example is merely an exemplary embodiment in which the area where the variable screen is displayed is adjusted and the area where the variable screen is displayed may be adjusted by the controller 110 in various methods.

In another example of the present disclosure, the display unit 120 may output a plurality of variable screens and each of the plurality of variable screens is controlled by the controller 110 to be output over at least one display unit. In this case, the number of display units in which at least one of the plurality of variable screens is displayed may vary.

For example, when the display unit 120 outputs two variable screens, a first variable screen may be displayed in one display unit among a plurality of display units (e.g., a first display unit, a second display unit, a third display unit, and the like) included in the display unit 120. Further, the second variable screen may be displayed over at least two of the plurality of display units, but the present disclosure is not limited thereto.

In this case, the number of display units to which the variable screen is output may vary depending on the type of the variable screen. For example, when the variable screen is a background image, the variable screen may be output over at least two display units included in the display unit 120. Further, the variable screen may be displayed on the first display unit among the plurality of display units when the variable screen is the score obtained by the user in the dart game. In addition, the variable screen may be displayed on the second display unit among the plurality of display units when the variable screen is an image acquired by photographing the dart game player. The examples are just an exemplary embodiment and the number of display units to which the variable screen is output may vary depending on the type of the variable screen.

In this case, at least some of the plurality of variable screens output to the display unit 120 may be different. For example, the first variable screen may include the background image and the second variable screen may include information on a game which is currently in progress. As another example, the first variable screen may include the image of the dart game player photographed by the camera unit and the second variable screen may include the image for the dart target photographed by the camera unit.

At least some of the plurality of variable screens output to the display unit 120 may be the same as each other. For example, the image displayed on the first variable screen and the image displayed on the second variable screen may be the same as each other.

At least some of the plurality of variable screens output to the display unit 120 may be the same and at least some of the plurality of variable screens output to the display unit 120 may be different. For example, the first variable screen may include the background image, the second variable screen may include information on the game which is currently in progress, the third variable screen may include the image for the dart game player photographed by the camera unit, and a fourth variable screen may include the variable screen which is the same as the image included in the third variable screen.

Figure 8:
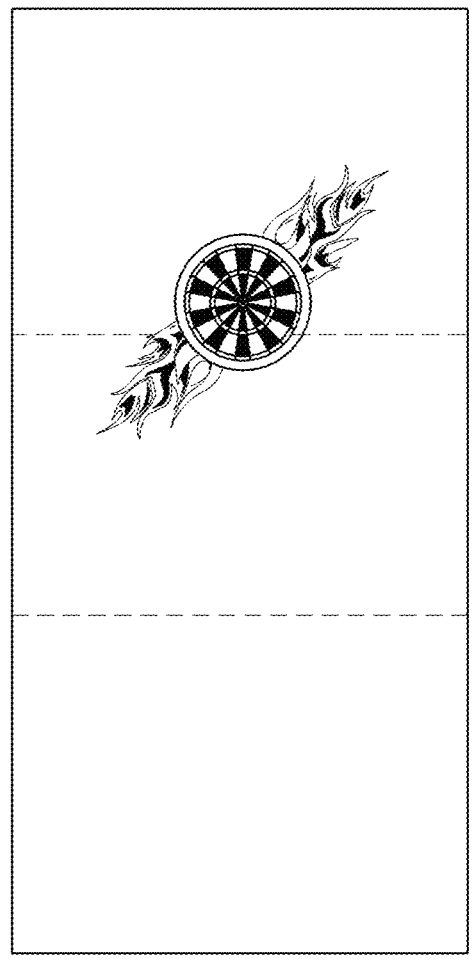
FIG. 8 is a diagram for describing a method for displaying a variable screen to be adjacent to the dart target according to the exemplary embodiment of the present disclosure.

FIG. 8 is a diagram for describing a method for displaying a variable screen adjacent to the dart target according to the exemplary embodiment of the present disclosure.

According to an exemplary embodiment of the present disclosure, the variable screen may be displayed adjacent to the dart target 200.

In the exemplary embodiment in which the variable screen is displayed adjacent to the dart target 200, the variable screen is displayed in a form crossing at least two points opposite to each other based on the dart target 200, and as a result, at least a part of the variable screen may be displayed adjacent to the dart target 200.

Specifically, referring to FIG. 8, the variable screen is displayed in a form crossing a first point at an upper right side of the dart target 200 in the display area 315 and a second point positioned at a lower left side of the dart target 200 in the display area 315, and as a result, at least a part of the variable screen may be in contact with the dart target 200.

As another example, the variable screen is displayed in a form crossing a first point at a lower right side of the dart target 200 in the display area 315 and a first point positioned at an upper left side of the dart target 200 in the display area 315, and as a result, at least a part of the variable screen may be in contact with the dart, target 200.

The present disclosure is not limited to the example and the variable screen may be displayed in a form crossing various points opposite to each other based on the dart target 200.

In another exemplary embodiment in which the variable screen is displayed adjacent to the dart target 200, at least a part of the variable screen may be covered by the dart target 200.

For example, when the event effect is displayed in the display area 315, at least some of the event effects are covered by the dart target 200, and as a result, the variable screen may be displayed adjacent to the dart target 200.

Figure 9A:
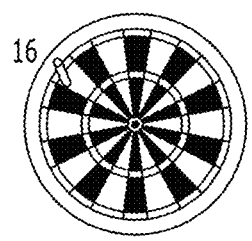
FIG. 9 is a diagram for describing a method for determining an event effect according to an exemplary embodiment of the present disclosure.
Figure 9B:
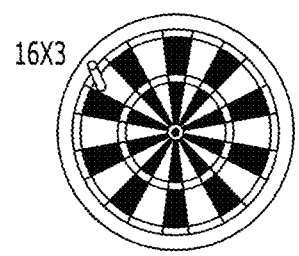
Figure 9C:
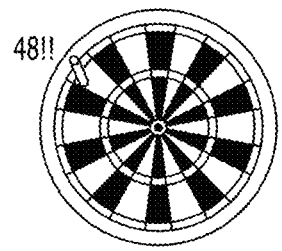

FIG. 9 is a diagram for describing a method for determining an event effect according to an exemplary embodiment of the present disclosure.

According to an exemplary embodiment of the present disclosure, the event effect determination unit 112 may determine the event effect at least partially based on the location which the dart pin hits.

For example, when the dart pin hits the double score area, the event effect determination unit 112 may control the display unit 120 so that a process of calculating a final score (X*2) is displayed according to the temporal order.

For example, when the dart pin hits the triple score area, the event effect determination unit 112 may control the display unit 120 so that the process of calculating the final score (X*2) is displayed according to the temporal order.

Referring to FIG. 9, when the dart pin hits a triple area of 16, the event effect determination unit 112 may control the display unit 120 so that a base score (16), a process (16*3) of calculating the score, and a final score (48) are displayed according to the temporal order.

The exemplary embodiment is just an exemplary embodiment of the present disclosure and the event effect determination unit 112 is not limited thereto and may determine the event effect by various methods at least partially based on the location which the dart pin hits.

Figure 10:
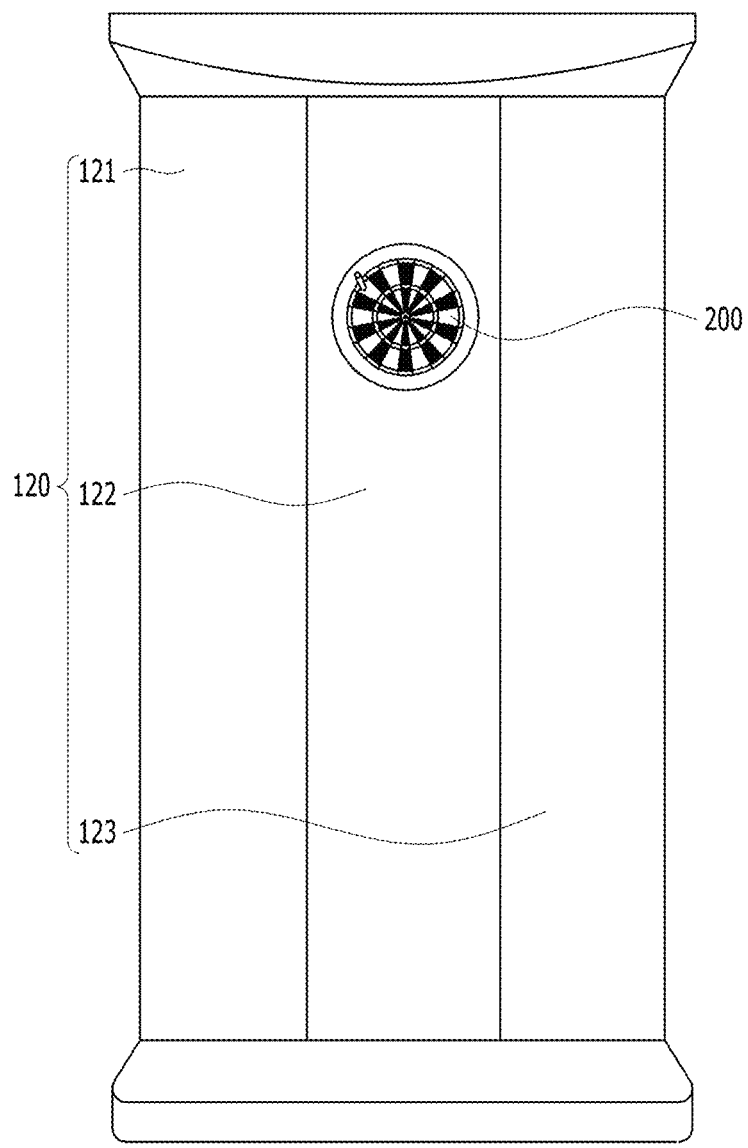
FIG. 10 is a diagram for describing display units according to the exemplary embodiment of the present disclosure.

FIG. 10 is a diagram for describing display units according to the exemplary embodiment of the present disclosure.

According to an exemplary embodiment of the present disclosure, the display unit 120 may be implemented by at least one display unit. Further, one or more respective display units may be independently controlled by the controller 110.

For example, the display unit 120 may be implemented by three display units 121, 122, and 123 and three respective display units 121, 122, and 123 may be independently controlled by the controller 110. For example, different images may be output to three respective display units. Referring to FIG. 10, the boundary lines among the display units may be arranged in a direction perpendicular to the ground.

At least one of transverse lengths and vertical lengths of the display units may be equal to each other. For example, referring to FIG. 10, the transverse lengths and the vertical lengths of the display units may be equal to each other.

Figure 11:
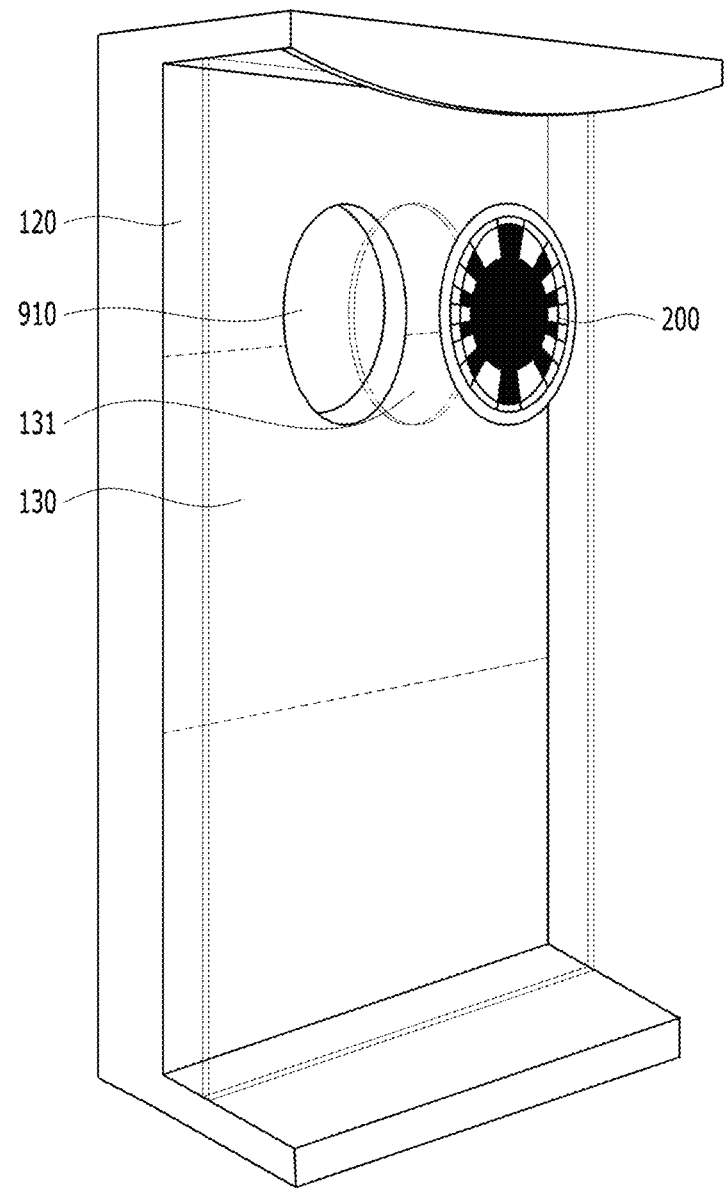
FIG. 11 is a diagram for describing a positional relationship between the display unit and the dart target according to an exemplary embodiment of the present disclosure.

FIG. 11 is a diagram for describing a positional relationship between the display unit and the dart target according to the exemplary embodiment of the present disclosure.

According to an exemplary embodiment of the present disclosure, the display unit 120 may include a receiving groove 910 capable of receiving the dart target 200. In this case, the dart target 200 may be seated in the receiving groove 910 of the display unit 120.

The cover 130 may include a hole 131. When the dart game player throws the dart pin, the thrown dart pin may pass through the hole 131 of the cover 130 and the dart pin passing through the hole 131 may reach the dart target 200 seated on the display unit 120.

Figure 12:
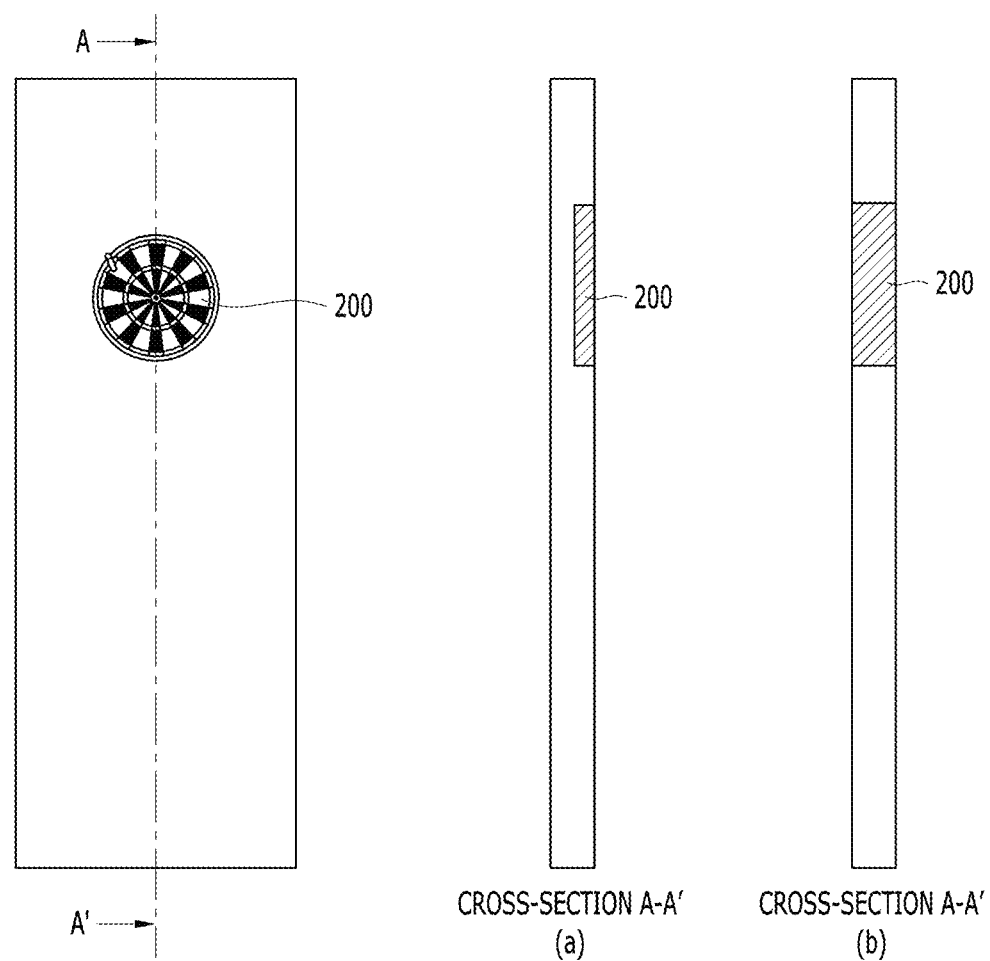
FIG. 12 is a diagram for describing a positional relationship between a cover unit and the dart target according to another exemplary embodiment of the present disclosure.

FIG. 12 is a diagram for describing a positional relationship between a cover unit and the dart target according to another exemplary embodiment of the present disclosure.

According to an exemplary embodiment of the present disclosure, the dart target 200 may be seated on the cover 130. For example, the hole 131 may be formed in the cover 130 and the dart target 200 may be seated in the hole 131 formed in the cover 130.

According to another exemplary embodiment of the present disclosure, the receiving groove may be formed in the cover 130 and the dart target 200 may be seated in the receiving groove formed in the cover 130.

FIG. 12A illustrates an exemplary embodiment in which the dart target 200 is seated in the receiving groove of the cover 130 and FIG. 12B illustrates an exemplary embodiment in which the dart target 200 is seated in the hole of the cover 130.

Figure 13:
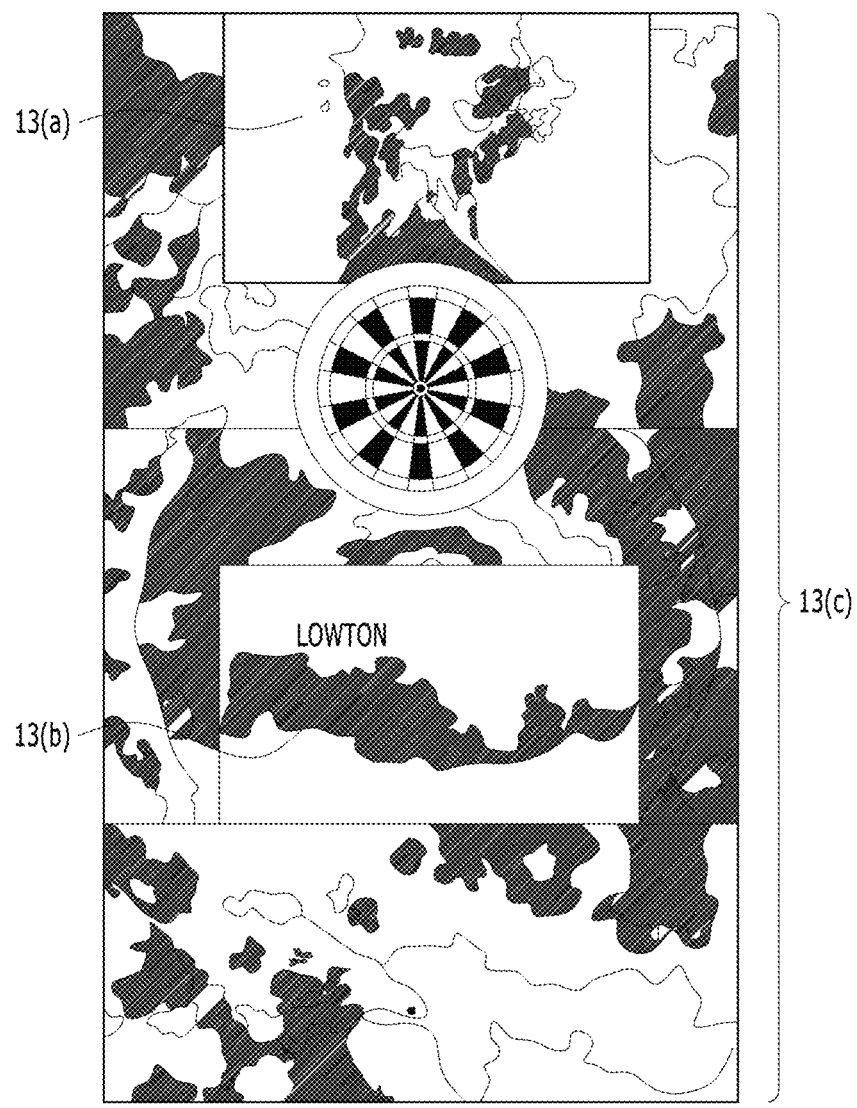
FIG. 13 is a diagram for describing a method in which the display unit operates according to an exemplary embodiment of the present disclosure.

FIG. 13 is a diagram for describing a method in which the display unit operates according to an exemplary embodiment of the present disclosure.

According to an exemplary embodiment of the present disclosure, the display unit 120 is divided into a plurality of areas to display various images under the control of the controller 110. For example, the display unit 120 may be divided into three areas 13(*a*), 13(*b*), and 13(*c*) and the respective areas may be independently controlled by the controller 110. In this case, a first area 13(*a*) may be in the form of a polygon (e.g., triangle, rectangle, pentagon, etc.)

having a predetermined area positioned above the dart target 200 in the display unit 120, a second area 13(*b*) may be in the form of the polygon (e.g., triangle, square, pentagon, etc.) having a predetermined area positioned below the dart target 200 in the display unit 120, and a third area 13(*c*) may be an area excluding the first area and the second area.

Referring to FIG. 13, when the dart pin reaches the dart target, the event effect based on the area in which the dart pin hits may be displayed to be relatively small in the first area 13(*a*) and/or the second area 13(*b*) and the event effect based on the area which the dart pin hits may be displayed to be relatively large in the third area 13(*c*). In this case, the event effects displayed in the first area 13(*a*) and/or the second area 13(*b*) and the third area 13(*c*) may be the same form or not the same form. In this case, a phrase (e.g., Low Ton, etc.) based on the area which the dart pin hits may be further displayed, in the first area. 13(*a*) and/or the second area 13(*b*).

Specifically, for example, a low ton may be displayed when the dart player acquires 100 to 150 points by throwing at least one dart pin in a count-up 01 game, or the like, a high ton may be displayed when the dart player acquires 151 to 177 points by throwing at least one dart pin in the count-up 01 game, hat trick may be displayed when the dart game player puts all three darts in a bull at one turn, phoenix eye may be displayed when the dart game player puts all three darts in a double bull at one turn, ton 80 may be displayed when the dart game player puts all three darts in 20 triple at one turn, three in a bed may be displayed when the dart game player puts three darts in the same triple area or double area at one turn, and white horse may be displayed when the dart game player throws three darts in different triple areas, respectively at one turn of the cricket game.

However, this is exemplary and the display unit 120 of the dart game apparatus 1000 according to an exemplary embodiment of the present disclosure is not limited thereto. Specifically, the display unit 120 may be configured to display a single event effect over all of the plurality of display units without separately providing the first area 13(*a*) and the second area 13(*b*).

Figure 14:
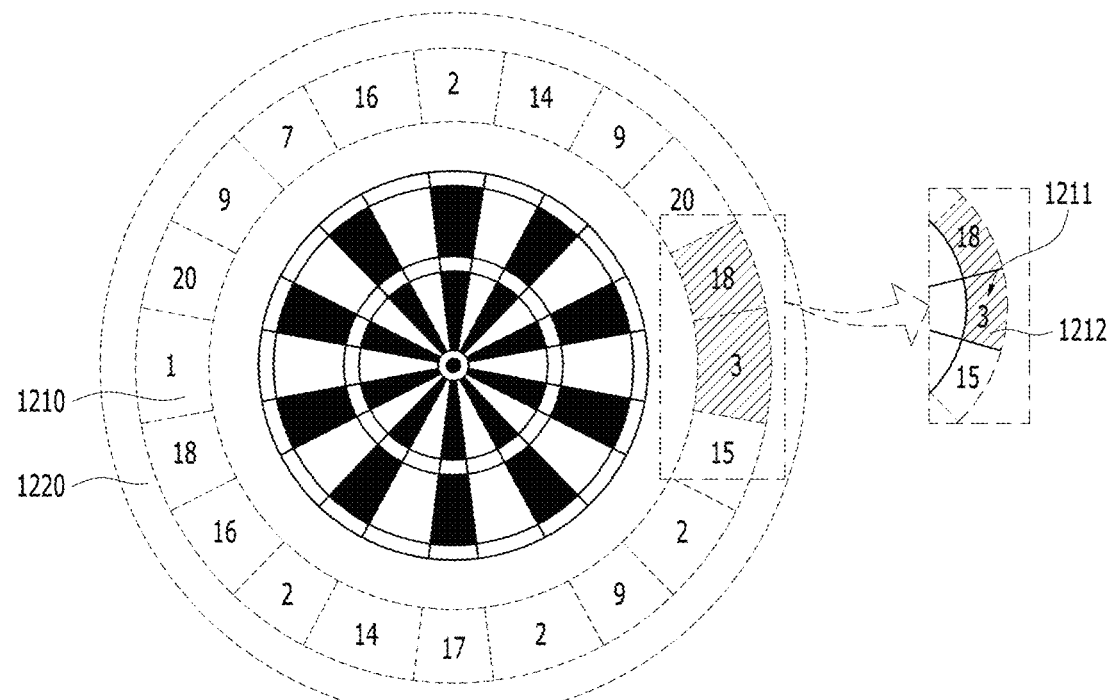
FIG. 14 is a diagram for describing a method in which the display unit operates according to another exemplary embodiment of the present disclosure.

FIG. 14 is a diagram for describing a method in which the display unit operates according to another exemplary embodiment of the present disclosure.

According to an exemplary embodiment of the present disclosure, the display unit 120 may output a score layer 1210 of the dart target 200 in a part positioned on the periphery of the dart target 200. The score layer 1210 of the dart target 200 may include a score area 1211 and a portion 1212 other than the score area. In this case, the score area 1211 and the portion 1212 other than the score area are output in different colors, and as a result, the dart game player may easily verify the score of the dart target 200.

A layer 1220 emphasizing the score layer may be output outside the score layer 1210. A different color from the portion 1212 other than the score area included in the score layer 1210 of the dart target 200 is output to the layer 1220 emphasizing the score layer, and as a result, the score area included in the score layer 1210 of the dart target 200 may be emphasized.

According to an exemplary embodiment of the present disclosure, the score area 1211 included in the score layer 1210 of the dart target 200 may vary depending on the number represented by the score area 1211. For example, referring to FIGS. 12, 3 and 18 may be different from each other. Further, the portion 1212 that is not the score area may also vary depending on the number represented by the score area 1211. For example, the color of the portion 1212 that is not a score area of 3 and the color of a portion that is not a score area of 18 may be different from each other.

Since the score layer of the dart target 200 in the related art is provided together with the dart target 200, there is a disadvantage that the color may not be expressed. An idea of adding the illumination to the dart target 200 to emphasize the dart target 200 is present in the related art, but there is a disadvantage that the idea makes a structure of the dart target 200 be complicated.

According to an exemplary embodiment of the present disclosure, the display unit 120 is disposed on the periphery of the dart target 200, and as a result, the score of the dart target 200 may be easily emphasized.

Figure 15:
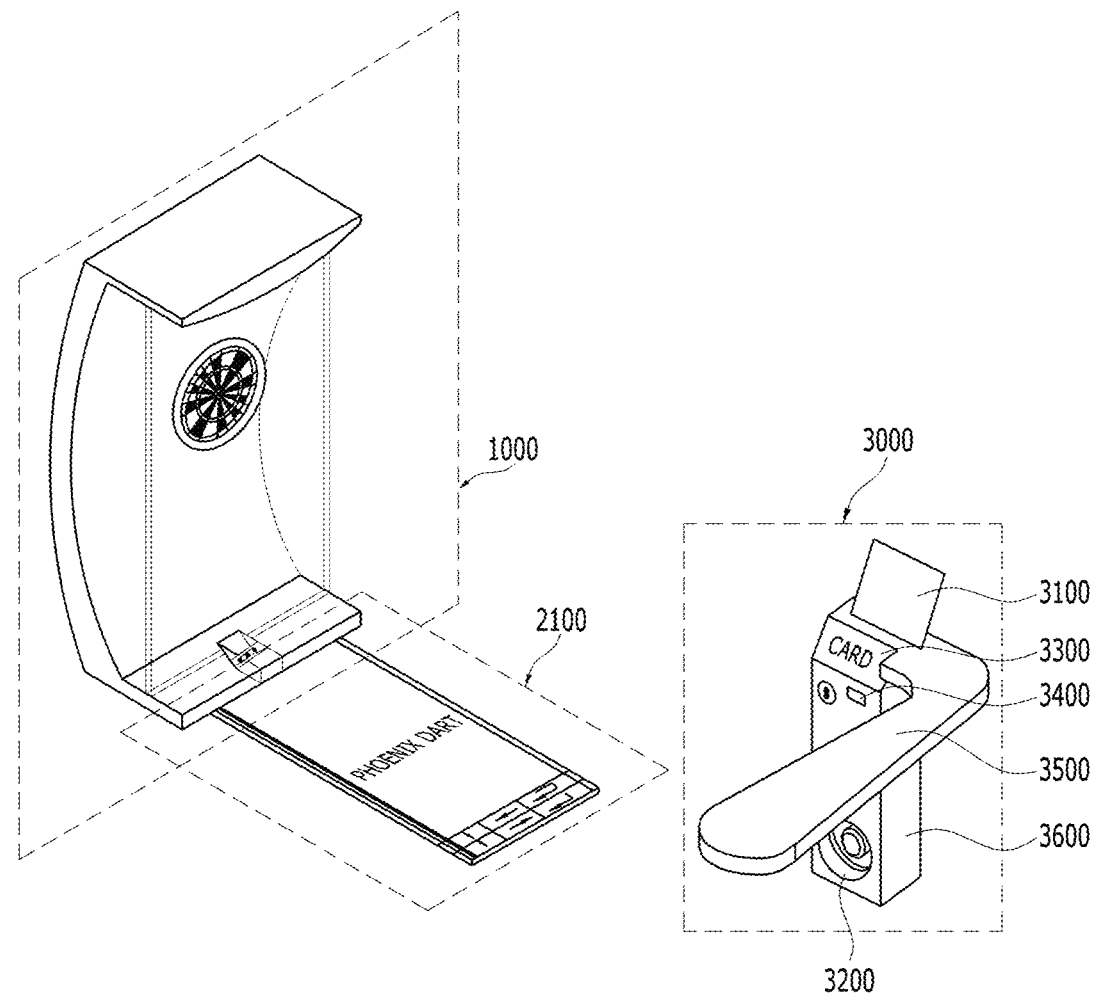
FIG. 15 is a diagram for describing a dart game system including an image projector according to an exemplary embodiment of the present disclosure.

FIG. 15 is a diagram for describing a dart game system including an image projection unit according to an exemplary embodiment of the present disclosure.

According to an exemplary embodiment of the present disclosure, the dart game system 10000 may include a dart game apparatus 1000, a dart booth 2000, and a dart game assistant apparatus 3000 and the dart booth 2000 may include a dart plate 2100.

In this case, the dart game apparatus 1000 may include the image projector 124 and the screen area provided in the dart game apparatus 1000 receives the variable screen projected by the image projector 124 to output the image related with the dart game to the display area 315.

According to another exemplary embodiment, the dart game assistant apparatus 3000 may include the image projection unit 3700 and the screen area provided in the dart game apparatus 1000 receives the variable screen projected by the image projection unit 3700 to output the image related with the dart game to the display area 315.

The dart, game user may enjoy the dart, game through the dart game system 10000. In this case, the dart game apparatus 1000 may include a display area 315 formed in a shape surrounding the outline of the dart target 200, so that the dart game apparatus 1000 may generate various effects.

For example, based on the location of the dart pin which reaches the dart target 200, the interest of the user in the dart game may be enhanced by outputting the event effect.

By outputting the score area of the dart target 200 to the display area 315 in various methods, the user may easily identify the score of the dart target 200 and the user may more easily perform the dart game by the scores of the dart target 200, which are output differently according to a situation.

According to another exemplary embodiment of the present disclosure, the input in the dart game apparatus 1000 through the dart plate input unit 2140 provided in the dart plate 2100 and/or the user interface unit 3100 provided in the dart game assistant apparatus 3000 is performed, and as a result, the various situations uncomfortable for the dart game user may not occur.

For example, the dart game user may perform the input in the dart game apparatus 1000 through the dart plate input unit 2140 and/or the user interface unit 3100 provided in the dart game assistant apparatus 3000, and as a result, there is no need to move to the dart game apparatus 1000 in order to perform the input in the dart game apparatus 1000. In particular, this allows the dart game user to directly perform the input for the dart game without the need to move to the dart game apparatus 1000 when the dart game user is a disabled person (e.g., a person with a leg injury, etc.).

According to an exemplary embodiment of the present disclosure, functions implemented by the dart game apparatus 1000 having the display unit 120 may be implemented even by the dart game apparatus 1000 having the image projector 124. For example, the dart game apparatus 1000 may output the variable screen to the periphery of the dart target 200 by utilizing the image projector 124.

According to another exemplary embodiment of the present disclosure, the variable screen may be projected to the dart plate 2100 by the image projector 124. For example, the variable screen projected by the image projector 124 may be output to the area between the lower support 330 of the dart game apparatus 1000 and the dart plate input unit 2140 of the dart plate 2100. Specifically, for example, the image projector 124 provided in the cover 320 of the dart game apparatus 1000 may project the variable screen toward the dart plate 2100. Further, the image projector 124 provided in the lower support 330 of the dart game apparatus 1000 may project the variable screen toward the dart plate 2100.

According to another exemplary embodiment of the present disclosure, when the dart game user intends to throw the dart pin, the image projector 124 may not project the variable screen to the display area 315 during a predetermined time period and/or until it is sensed that the dart pin is thrown to the dart target by the control of the controller 110. In this case, whether the dart game user intends to throw the dart pin may be determined based on the signal obtained from the touch unit 2130.

Figure 16:
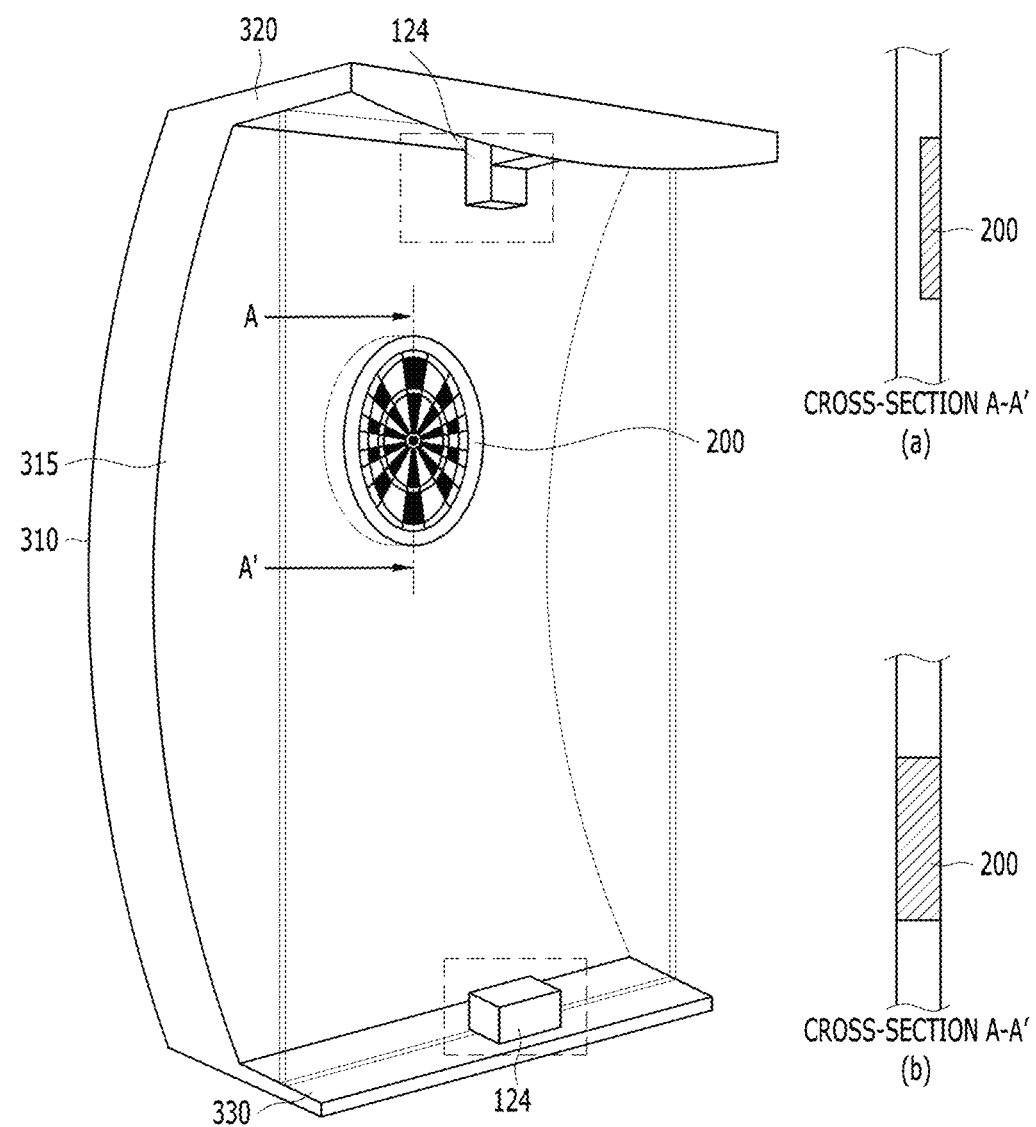
FIG. 16 is a diagram for describing a dart game apparatus including an image projector according to an exemplary embodiment of the present disclosure.

FIG. 16 is a diagram for describing a dart game apparatus including an image projector according to an exemplary embodiment of the present disclosure.

According to an exemplary embodiment of the present disclosure, the dart game apparatus 1000 may include the image projector 124 and the display area 315.

The display area 315 may receive the variable screen projected by the image projector 124 and the variable screen projected by the image projector 124 may be output to the display area 315. The display area 315 may be implemented in a form in which the distance from a virtual plane extending upward from the throw line becomes shorter toward a distal portion from the center. Further, the display area 315 may be implemented in a hemispherical shape or a parabolic shape so that the image projected from the image projector 124 may be reflected to the user.

The image projector 124 is provided in the dart game apparatus 1000 to project the variable screen toward the display area 315. For example, the image projector 124 is provided in the cover 320 of the dart game apparatus 1000 to project the variable screen toward the display area 315. Further, the image projector 124 is provided in the lower support 330 of the dart game apparatus 1000 to project the variable screen toward the display area 315.

The image projector 124 may include a plurality of image projection units, at least some of the plurality of image projection units may be disposed in the cover 320, and at least some of the plurality of image projection units may be disposed in the lower support 330.

In this case, variable screens projected by the plurality of image projection units are combined and associated with each other to output various images to the display area 315 of the dart game apparatus 1000.

For example, the display area 315 may be divided into a plurality of areas, the variable screen projected by the image projector 124 disposed in the cover 320 may be output to at least some areas among the plurality of areas, and the variable screen projected by the image projector 124 disposed in the lower support 330 may be output to at least some other areas.

As another example, at least a part of the variable screen projected by the image projection unit 3700 disposed in the cover 320 and at least a part of the variable screen projected by the image projection unit 3700 disposed in the lower support 330 are combined, and as a result, the image may be generated and the generated image may be output to the display area 315.

Specifically, for example, at least a part of the variable screen projected by the image projection unit 124 disposed in the cover 320 and at least a part of the variable screen projected by the image projection unit 124 disposed in the lower support 330 may overlap with each other and overlapped portions may be connected by edge blending technology. As a result, an image such as one large screen that is naturally extended and is vertically long may be output to the display area 315.

According to an exemplary embodiment of the present disclosure, the dart game apparatus 1000 may include the cover 130 for protecting the display area 315 and the cover 130 may receive the dart target 200. For example, referring to FIG. 14A, the cover 130 may include the receiving groove for seating the dart target 200 and the dart target 200 may be seated in the receiving groove of the cover 130. As another example, referring to FIG. 14B, the cover 130 may include the hole for seating the dart target 200 and the dart target 200 may be seated in the hole of the cover 130.

Figure 17:
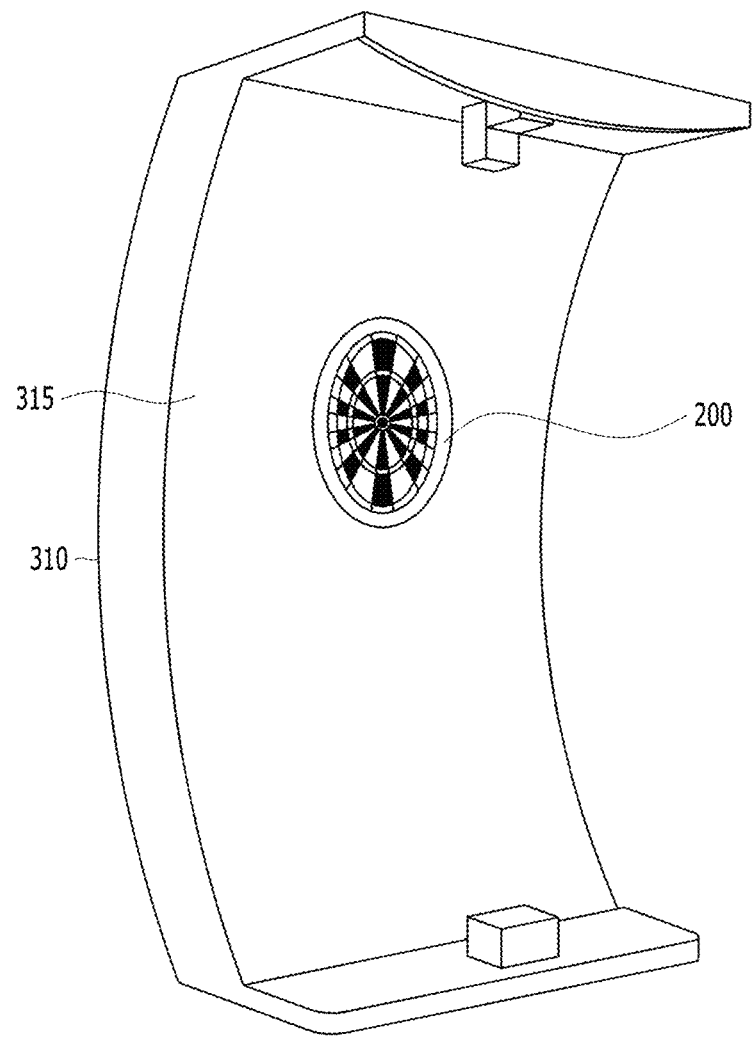
FIG. 17 is a diagram for describing a dart game apparatus including an image projector according to another exemplary embodiment of the present disclosure.

FIG. 17 is a diagram for describing a dart game apparatus including an image projection unit according to another exemplary embodiment of the present disclosure.

According to an exemplary embodiment of the present disclosure, the dart target 200 may be provided in the display area 315. For example, the display area 315 may include the receiving groove for receiving the dart target 200 and the dart target 200 may be seated in the receiving groove provided in the display area 315. Further, according to another exemplary embodiment, the dart target 200 may be attached to the display area 315, but is not limited thereto.

Figure 18:
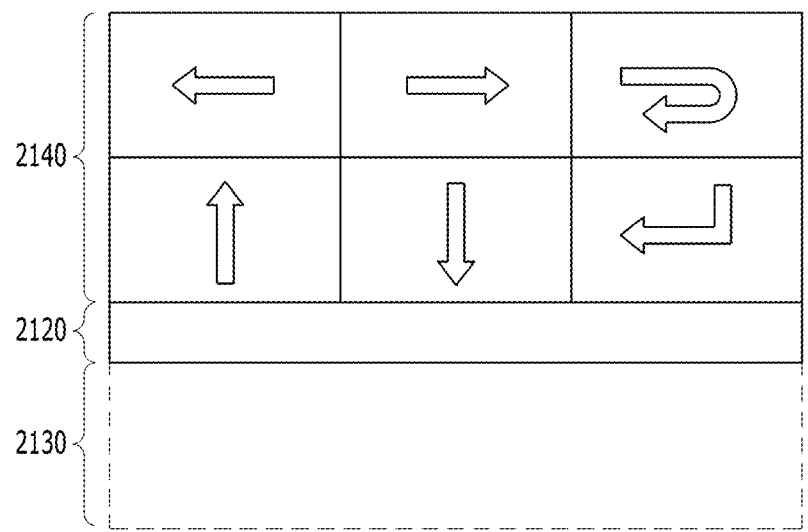
FIG. 18 is a diagram for describing a dart plate input unit according to an exemplary embodiment of the present disclosure.

FIG. 18 is a diagram for describing a dart plate input unit according to an exemplary embodiment of the present disclosure.

According to an exemplary embodiment of the present disclosure, at least a part of the dart plate 2100 may include a dart plate input unit 2140, a throw-line illumination unit 2110, and a touch unit 2130.

The dart plate input unit 2140 is disposed on at least a portion of the dart plate to receive an input relating to execution of the dart game from the user. Further, the controller 110 may control the operations of the dart game based on the input from the dart plate input unit 2140. For example, the dart plate input unit 2140 may be provided at a location closer to the dart target 200 than the throw-line illumination unit 2110 in the dart plate. In this case, the dart plate input unit 2140 may include a leftward input area, a rightward input area, an upward input area, a downward input area, a selection input area, and a cancellation input area, hut is not limited thereto.

In this case, the dart plate input unit 2140 may include the conductive pressure sensing member. For example, the dart plate input unit 2140 may be implemented by at least one of the pressure sensing conductive film and the pressure sensing conductive cloth (e.g., velostat, etc.), but is not limited thereto.

The controller 110 may adjust input information that may be input by the dart plate input unit 2140, partially based on at least one of the identification information of the user and pre-stored user designation information. For example, each of the dart game users may store information that may be input through the dart plate input unit 2140 in advance and when the user is identified based on the identification information acquired by the dart game apparatus 1000, the controller 110 may adjust the information which may be input through the dart plate input unit 2140 based on the pre-stored information. In this case, the adjusted information may include information on selection and cancellation of the game mode and information on selection and cancellation of the player, but is not limited thereto.

Specifically, for example, the user may select the number of dart game players, a dart game play mode (a zero one game, a cricket game, and the like), and the dart game mode (a single play, a network play, and the like) through the dart plate input unit 2140. Further, according to an exemplary embodiment of the present disclosure, the user may select a virtual player through the dart plate input unit 2140.

The user may select a dart game match-up mode that may be played together with the virtual player through the dart plate input unit 2140. For example, the user may select "With mode" to play as one team with the virtual player via the dart plate input unit 2140 or "Vs mode" to play as a different team from the virtual player.

The controller 110 may determine whether to activate the dart plate input unit 2140 partially based on at least one of the identification information of the user and the pre-stored user designation information. For example, each of the dart game users may pre-store information indicating whether to use the dart plate input unit 2140 and when the dart game user is identified based on the identification information acquired by the dart game apparatus 1000, the controller 110 may determine whether to activate the dart plate input unit 2140 based on the pre-stored information.

The throw-line illumination unit 2110 refers to an illumination unit for displaying a throw line which is a reference line for throwing the dart pin by the user. For example, illuminations e.g., LED, OLED, etc.) for displaying the throw line may be successively provided in a specific portion of the dart plate 2100. For example, according to a standard of the dart game, the illuminations constituting the throw-line illumination unit 2110 may be arranged on at least a part of a line on which the throw line is positioned. A flickering state of the throw-line illumination unit 2110 may be controlled by the controller 110 according to the game mode of the dart game apparatus 1000. For example, the throw-line illumination unit 2110 may be lit only when the dart game apparatus 1000 is in an in-game state. The "in-game state" may mean a state in which the user inputs a credit for playing the game legitimately through the storage unit 3400 and performs the dart game. The credit may be input via the storage unit 3400 or received via the network module 150. The dart game user may easily recognize the throw line which is the reference line for throwing the dark pin by the throw-line illumination unit 2110. In another exemplary embodiment, the throw-line illumination unit 2110 may be controlled to be lit off by the controller 110 so that identification of the throw line is relatively difficult when the dart game apparatus 1000 is not in an "in-game state".

The touch unit 2130 refers to a module that is disposed on at least a part of the dart plate 2100 and recognizes the touch input of the user. For example, the touch unit 2130 may extend in a direction away from the dart target 200 from the throw-line illumination unit 2110. In this case, the touch unit 2130 may be positioned adjacent to at least a part of the throw-line illumination unit 2110.

In this case, the touch unit 2130 may be configured by the conductive pressure sensing member. For example, the touch unit 2130 may be implemented by at least one of a pressure sensing conductive film and a pressure sensing conductive cloth, but is not limited thereto. When the dart game user applies force to at least a part of the conductive pressure sensing member, resistance of the conductive pressure sensing member is changed, and as a result, the touch unit 2130 may recognize that the touch is made.

The controller 110 may determine whether the user intends to throw the dart pin based on the signal from the touch unit 2130. For example, the controller 110 may determine that the user intends to throw the dart pin when the dart game user touches the touch unit 2130.

According to an exemplary embodiment of the present disclosure, the controller 110 may operate the camera unit 140 when the dart game user intends to throw the dart pin. For example, the controller 110 may operate the camera unit 140 when the dart game user touches the touch unit 2130. According to another exemplary embodiment of the present disclosure, the controller 110 may edit a dart game image stored based on a time when the dart game user intends to throw the dart pin. For example, the controller 110 edits the image photographed by the camera unit 140 to acquire an image for a predetermined time based on the time when the dart game user touches the touch unit 2130 among the images continuously photographed by the camera unit 140 and store the acquired image.

Referring to FIG. 18, the dart plate input unit 2140 may be in contact with at least a part of the throw-line illumination unit 2110 and the touch unit 2130 may also be in contact with at least a part of the throw-line illumination unit 2110. In addition, the dart plate input unit 2140, the throw-line illumination unit 2110, and the touch unit 2130 may be arranged in succession. In another exemplary embodiment of the present disclosure, the dart plate input unit 2140 and the touch unit 2130 are incorporated to constitute one module.

Figure 19:
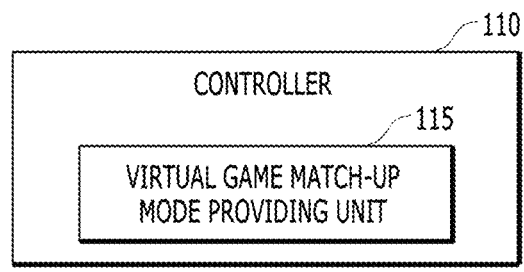
FIG. 19 is a diagram for describing that a controller 110 provides a dart game match-up mode which a plurality of players including a virtual player and at least one real player perform according to another exemplary embodiment of the present disclosure.

FIG. 19 is a diagram for describing that a controller 110 provides a dart game match-up mode which a plurality of players including a virtual player and at least one real player performs according to another exemplary embodiment of the present disclosure.

According to an exemplary embodiment of the present disclosure, the dart game apparatus 1000 may include a virtual game match-up mode providing unit 115. The virtual game match-up mode providing unit 115 may provide a dart game match-up mode which a plurality of players including at least one virtual player and at least one real player may perform.

The virtual game match-up mode providing unit 115 may provide a dart game match-up mode in which a team including the virtual player and the real player together may play the game with at least one other team. In this case, there may be more than ogre virtual player and more than one real player.

For example, the virtual game match-up mode providing unit 115 may provide a dart game match-up mode in which a first real player and a first virtual player become the same team to play the game and provide a dart game match-up mode in which the first real player, the first virtual player, and a second virtual player become the same team to play the game.

The virtual game match-up mode providing unit 115 may provide a dart game match-up mode in which the first real player and the first virtual player become the same team and a second real player and the second virtual player become the same team to play the game. In this case, the virtual game match-up mode providing unit 115 may adjust a balance of a dart game ability among the respective teams by adjusting the dart game abilities of the virtual players.

The virtual game match-up mode providing unit 115 may provide a dart game match-up mode in which a team including only the virtual players and a team including only the real players, or a combination thereof may play the game with at least one other team. In this case, there may be more than one virtual player and more than one real player.

For example, the virtual game match-up mode providing unit 115 may provide a dart game match-up mode in which the first real player and the second real player become a first team and the virtual player and the second virtual player become a second team to play the game.

According to an exemplary embodiment of the present disclosure, the virtual game match-up mode providing unit 115 may allow a predetermined first image to be displayed to the display area 315 according to the hit location of the dart pin thrown by at least one real player, which is sensed by the sensing unit 160.

The virtual game match-up mode providing unit 115 may set a condition for displaying the first image in advance. For example, the virtual game match-up mode providing unit 115 may set the first image to be displayed when the hit location is a double bull 410, a single bull 420, a triple ring 440, and a double ring 460. The virtual game match-up mode providing unit 115 may receive and set the input of the user and set data from the external device according to received data, but is not limited thereto.

The virtual game match-up mode providing unit 115 may acquire information on the hit location of the dart pin thrown by the real player. Herein, there may be more than one real player.

For example, the sensing unit 160 may sense whether the hit location of the dart pin thrown by the real player is the double bull 410, the single bull 420, a small single 430, the triple ring 440, a large single 450, or the double ring 460 among the areas of the dart target 200 and the virtual game match-up mode providing unit 115 may acquire the information on the hit location from the sensing unit 160.

The virtual game match-up mode providing unit 115 may allow the first image to be displayed in the display area 315 according to the hit location of the dart pin thrown by the real player.

For example, when the hit location is the triple ring 440 and when the hit location is the double bull 410, the first image is set to be displayed in advance and when the hit location of the dart pin thrown by the real player is the triple ring 440 or the double bull 410, the virtual game match-up mode providing unit 115 may allow the first image to be displayed in the display area 315.

The first image may be an image associated with the virtual player. For example, the first image may be associated with the virtual player that forms the same team as the real player among the virtual players participating in the dart game. Further, the first image may be associated with the virtual player that forms a different team from the real player among the virtual players participating in the dart game. In addition, the first image may be associated with at least one of one or more virtual players which do not participate in the dart game, but are stored in the dart game apparatus 1000.

The first image may include an effect image for the hit location of the throw dart pin. For example, the first image may include an image in which the virtual player appears and shouts triple, an image in which the virtual player appears and shouts double, and an image in which the virtual player appears and shouts double bull, but is not limited thereto.

A time at which the first image is displayed may be set in advance. For example, the first image may be displayed in the display area 315 at the same time as the dart pin thrown by the real player arrives at the dart target 200 and the first image may be displayed within a predetermined time after the dart pin arrives at the dart target 200, hut is not limited thereto.

A display period of the first image may be set in advance. For example, the display period of the first image may be set between 0.8 seconds and 1.2 seconds in advance so as to prevent a large influence from being exerted on a progress time of the dart game, but is not limited thereto.

The first image may be displayed in a part or the entirety of the display area 315. For example, the first image may be displayed in a portion of a lower left area in the display area 315. Further, the first image may be displayed in a part of a lower right area in the display area 315 and may be displayed in the entirety of the display area 315, but is not limited thereto.

According to an exemplary embodiment of the present disclosure, the virtual game match-up mode providing unit 115 may allow the display area 315 to display the second image depending on the hit locations of a plurality of dart pins thrown in one round from one of one or more real players.

The virtual game match-up mode providing unit 115 may set a case where the second image is displayed in advance. For example, the virtual game match-up mode providing unit 115 may calculate the sum of the scores of the plurality of dart pins thrown in one round and set the second image to be displayed when the calculated value is larger than a predetermined value. Further, the virtual game match-up mode providing unit 115 may set the second image to be displayed when the hit locations of one or more dart pins among the plurality of dart pins thrown in one round correspond to specific areas. The virtual game match-up mode providing unit 115 is not limited thereto and may set the second image to be displayed in the display area 315 according to the hit locations of the plurality of dart pins thrown in one round in various cases.

The virtual game match-up mode providing unit 115 may acquire from the sensing unit 160 information on the hit locations of the plurality of dart pins thrown by the real player in one round. For example, when the real player throws the dart pin three times in one round, information on the hit locations of respective dart pins three times may be obtained from the sensing unit 160.

The virtual game match-up mode providing unit 115 may allow the second image to be displayed according to the hit locations of the plurality of dart pins. For example, the virtual game match-up mode providing unit 115 may calculate the sum of the scores which match the hit locations of the plurality of dart, pins, respectively and allow the display area 315 to display the second image when the calculated value is equal to or larger than a predetermined value. As another example, the virtual game match-up mode providing unit 115 may allow the display area 315 to display the second image when areas including the hit locations of two dart pins among the hit locations of three dart pins thrown in one round are the same as each other.

The second image may be the image associated with the virtual player. For example, the second image may be associated with the virtual player that forms the same team as the real player among the virtual players participating in the dart game. Further, the second image may be associated with the virtual player that forms a different team from the real player among the virtual players participating in the dart game. In addition, the second image may be associated with at least one of one or more virtual players which do not participate in the dart game, but are stored in the dart game apparatus 1000.

The second image may include an AWARD image for the hit locations of the dart pins thrown in one round. For example, the second image may be a phenomenon in which the virtual player appears and shouts nice, which indicates a meaning of praising the real player, a phenomenon in which the virtual player appears and shouts good, which indicates a meaning of praising the real player, an image in which the virtual player appears and shouts cheer, which indicates a meaning of praising the real player, an image in which the virtual player appears and shouts perfect, which indicates that the real player is perfect, and the like, but is not limited thereto.

A time at which the second image is displayed may be set in advance. For example, the second image may be displayed at a time when one round ends, a time when a predetermined time elapses after the end of one round, or a time at which a user's input is received after the end of one round, but is not limited thereto.

The display period of the second image may be set in advance. For example, the display period of the second image may be set between 0.8 seconds and 1.2 seconds in advance so as to prevent the large influence from being exerted on the progress time of the dart game, but is not limited thereto.

The second image may be displayed in a part or the entirety of the display area 315. For example, the second image may be displayed in a part of the lower left area in the display area 315. Further, the second image may be displayed in a part of the lower right area in the display area 315 and may be displayed in the entirety of the display area 315, but is not limited thereto.

According to an exemplary embodiment of the present disclosure, the virtual game match-up mode providing unit 115 may predict the round of the real player and allow a third image to be displayed in the display area 315 before the round of the real player starts according to the identification information.

The virtual game match-up mode providing unit 115 may predict the round of the real player. For example, when a first player and a second player perform a dart match-up game and the round of the second player ends, the virtual game match-up mode providing unit 115 may predict that the round of the first player will start.

The virtual game match-up mode providing unit 115 may allow the third image to be displayed in the display area 315 according to the identification information of the real player before the round of the real player starts. For example, when the first player and the second player perform the dart match-up game and the round of the second player ends, the virtual game match-up mode providing unit 115 may allow the third image to be displayed in the display area 315 before the round of the first player starts according to the identification information of the first player.

The identification information means various information related to the real player. For example, the identification information may include a score obtained by the real player before the start of a current round, points per dart (PPD) of the real player, marks per round (MPR) of the real player, a member grade of the real player, a record of the real player, and the like, but is not limited thereto and may include various information related to the real player.

The third image may be the image associated with the virtual player. For example, the third image may be associated with the virtual player that forms the same team as the real player among the virtual players participating in the dart game. Further, the third image may be associated with the virtual player that forms a different team from the real player among the virtual players participating in the dart game. In addition, the third image may be associated with at least one of one or more virtual players which do not participate in the dart game, but are stored in the dart game apparatus 1000.

The third image may include a cheer image for the real player. For example, the third image may include an image in which the virtual player appears and shouts fighting, an image in which the virtual player appears and shouts encouragement, an image in which the virtual player appears and sings a fight song, and the like, but is not limited thereto.

A time at which the third image is displayed may be set in advance. For example, the third image may be displayed when a predetermined time has elapsed after the end of one round or when the user's input is received after the end of one round, and the like, but is not limited thereto.

The display period of the third image may be set in advance. For example, the display period of the third image may be set between 0.8 seconds and 1.2 seconds in advance so as to prevent the large influence from being exerted on the progress time of the dart game, but is not limited thereto.

The third image may be displayed in a part or the entirety of the display area 315. For example, the third image may be displayed in a part of a lower left side in the display area 315. Further, the third image may be displayed in a part of a lower right side in the display area 315 and may be displayed in the entirety of the display area 315, but is not limited thereto.

According to an exemplary embodiment of the present disclosure, the virtual game match-up mode providing unit 115 may sense the round of the virtual player and allow an image related to dart pin throwing of the virtual player to be displayed in the display area 315 while the sensed round of the virtual player is played.

The virtual game match-up mode providing unit 115 may sense the round of the virtual player. For example, when the first real player and the first virtual player plays the dart match-up mode and when the round of the first real player ends, the virtual game match-up mode providing unit 115 may sense that the current round is the round of the first virtual player.

The virtual game match-up mode providing unit 115 may allow a fourth image related to the dart pin throwing of the virtual player to be displayed in the display area. 315 while the round of the virtual player is played.

The fourth image may include an operation image in which the virtual player throws the dart pin, an image in which the dart pin moves toward the dart target, an image in which the thrown dart pin arrives at the dart target, or a combination thereof. For example, when the fourth image is divided into two areas, a first area may include the operation image in which the virtual player throws the dart pin and a second area may include the image where the thrown dart pin arrives at the dart target. In addition, the fourth image is divided into three areas, the first area on a right side may include the operation image in which the virtual player throws the dart pin, the second area at the center may include the image in which the dart pin moves toward the dart target, and a third area on a left side may include the image where the thrown dart pin arrives at the dart target.

When the fourth image is divided into a plurality of areas, the respective areas may be displayed simultaneously or sequentially.

For example, when the fourth image is divided into three areas, the operation image in which the virtual player throws the dart pin in the first area, the image in which the thrown dart pin moves toward the dart target in the second area, and the image where the thrown dart pin arrives at the dart target in the third area may be simultaneously displayed. Further, the operation image in which the virtual player throws the dart pin in the first area may be displayed and thereafter, the image in which the thrown dart pin moves toward the dart target in the second area may be displayed. Then, the image where the thrown dart, pin arrives at e dart target in the third area may be displayed.

The fourth image may include various effects. For example, the dart pin throwing image included in the fourth image may include a slow effect that the dart pin moves slowly toward the dart target, a twinkling effect of the moving dart pin, an effect that the dart pin moves while being closed up, and the like, but is not limited thereto and the dart pin throwing image may include various effects.

According to an exemplary embodiment of the present disclosure, the virtual game match-up mode providing unit 115 may allow a predetermined fifth image to be displayed to the display area 315 according to the hit location of the dart pin thrown by at least one virtual player.

The virtual game match-up mode providing unit 115 may acquire information on the hit location of the dart pin thrown by the virtual player. Herein, there may be more than one virtual player.

For example, the virtual game match-up mode providing unit 115 may sense whether the hit location of the dart pin thrown by the virtual player is the double bull 410, the single bull 420, the small single 430, the triple ring 440, the large single 450, or the double ring 460 among the areas of the dart target 200.

The virtual game match-up mode providing unit 115 may allow the fifth image to be displayed in the display area 315 according to the hit location of the dart pin thrown by the virtual player.

For example, when the hit location is the triple ring 440 and when the hit location is the double bull 410, the fifth image is set to be displayed in advance and when the hit location of the dart pin thrown by the virtual player is the triple ring 440 or the double bull 410, the virtual game match-up mode providing unit 115 may allow the fifth image to be displayed in the display area 315.

The fifth image may be the image associated with the virtual player. For example, the fifth image may be associated with the virtual player that forms the same team as the virtual player who throws the dart pin among the virtual players participating in the dart game. Further, the fifth image may be associated with the virtual player that forms a different team from the player who throws the dart pin among the virtual players participating in the dart game. In addition, the fifth image may be associated with at least one of one or more virtual players which do not participate in the dart game, but are stored in the dart game apparatus 1000.

The fifth image may include the effect image for the hit location of the thrown dart pin. For example, the fifth image may include the image in which the virtual player appears and shouts triple, the image in which the virtual player appears and shouts double, and the image in which the virtual player appears and shouts double bull, but is not limited thereto.

A time at which the fifth image is displayed may be set in advance. For example, the fifth image may be displayed in the display area 315 at the same time as the dart pin thrown by the virtual player arrives at the dart target 200 and the first image may be displayed within a predetermined time after the dart pin arrives at the dart target 200, but is not limited thereto.

The display period of the fifth image may be set in advance. For example, the display period of the fifth image may be set between 0.8 seconds and 1.2 seconds in advance so as to prevent the large influence from being exerted on the progress time of the dart game, but is not limited thereto.

The fifth image may be displayed in a part or the entirety of the display area 315. For example, the fifth image may be displayed in a part of the lower left side in the display area 315. Further, the fifth image may be displayed in a part of the lower right side in the display area 315 and may be displayed in the entirety of the display area 315, but is not limited thereto.

According to an exemplary embodiment of the present disclosure, the virtual game match-up mode providing unit 115 may allow the display area 315 to display a fifth image depending on the hit locations of a plurality of dart pins thrown in one round from one of one or more virtual players.

The virtual game match-up mode providing unit 115 may acquire information on the hit locations of the plurality of dart pins thrown by the virtual player in one round. For example, when the virtual player throws the dart pin three times in one round, the virtual game match-up mode providing unit 115 may acquire information on the hit locations of respective dart pins three times.

The virtual game match-up mode providing unit 115 may allow the display area 315 to display the sixth image according to the hit locations of the plurality of dart pins. For example, the virtual game match-up mode providing unit 115 may calculate the sum of the scores which match the hit locations of the plurality of dart pins, respectively and allow the display area 315 to display the sixth image when the calculated value is equal to or larger than a predetermined value. As another example the virtual game match-up mode providing unit 115 may allow the display area 315 to display the sixth image when areas including the hit locations of two dart pins among the hit locations of three dart pins thrown in one round are the same as each other.

The sixth image may be the image associated with the virtual player. For example, the sixth image may be associated with the virtual player that forms the same team as the virtual player who throws the dart among the virtual players participating in the dart game. For example, the sixth image may be associated with the virtual player that forms a different team from the virtual player who throws the dart among the virtual players participating in the dart game. In addition, the sixth image may be associated with at least one of one or more virtual players which do not participate in the dart game, but are stored in the dart game apparatus 1000 or associated with the virtual player who throws the dart.

The sixth image may include the AWARD image for the hit locations of the dart pins thrown in one round. For example, the sixth image may include an image in which the virtual player appears and shouts nice, an image in which the virtual player appears and shouts good, and an image in which the virtual player appears and shouts cheer, an image in which the virtual player appears and shouts perfect, and the like, but is not limited thereto.

A time at which the sixth image is displayed may be set in advance. For example, the sixth image may be displayed at the time when one round ends or the time when a predetermined time elapses after the end of one round, but is not limited thereto.

The display period of the sixth image may be set in advance. For example, the display period of the sixth image may be set between 0.8 seconds and 1.2 seconds in advance so as to prevent the large influence from being exerted on the progress time of the dart game, but is not limited thereto.

The sixth image may be displayed in a part or the entirety of the display area 315. For example, the sixth image may be displayed in a part of the lower left side in the display area 315. Further, the sixth image may be displayed in a part of the lower right side in the display area 315 and may be displayed in the entirety of the display area 315, but is not limited thereto.

Figure 20:
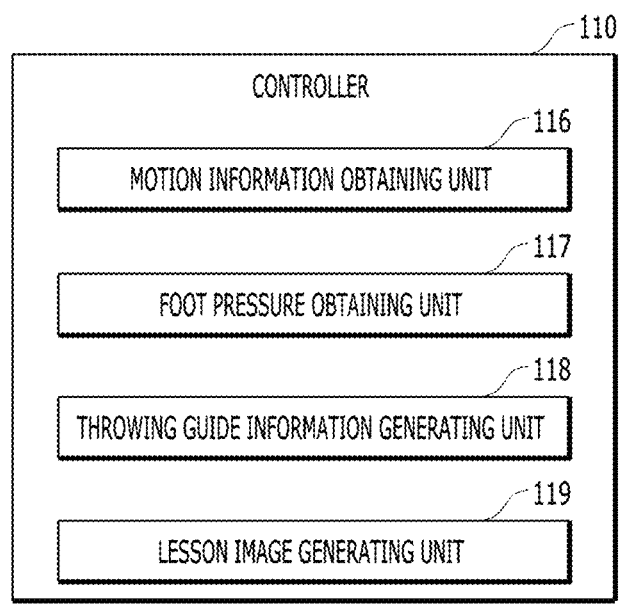
FIG. 20 is a diagram for describing a method in which a controller creates a lesson image according to another exemplary embodiment of the present disclosure.

FIG. 20 is a diagram for describing a method in which a controller creates a lesson image according to another exemplary embodiment of the present disclosure.

According to an exemplary embodiment of the present disclosure, the controller 110 of the dart game apparatus 1000 may include a motion information obtaining unit 116, a foot pressure information obtaining unit 117, a throwing guide information generating unit 118, and a lesson image generating unit 119.

The motion information obtaining unit 116 may obtain motion information of the dart pin thrown by the dart game user. The motion information means information on movement of the dart pin during the time from the time when the dart pin is thrown by the user to the time before the dart pin reaches the dart target 200. For example, the motion information may include speed information of the dart pin and trajectory information of the thrown dart pin, but is not limited thereto and may include various information related to the movement of the dart pin.

According to an exemplary embodiment of the present disclosure, the motion information obtaining unit 116 may obtain the motion information of the dart pin from the motion measurement module 400 provided in the dart game apparatus 1000. For example, the motion measurement module 400 may measure the motion of the dart pin using a Doppler effect and the motion information obtaining unit 116 may receive information on the measured motion from the motion measurement module 400.

The motion information obtaining unit 116 may obtain the motion information of the dart pin by analyzing the image photographed by the camera unit 140. For example, the camera unit 140 may photograph the movement of the dart pin thrown by the dart game user and the motion information obtaining unit 116 may acquire the information on the movement of the dart pin by analyzing the photographed image.

When the dart game user throws the dart, the foot pressure information obtaining unit 117 may obtain foot pressure information which is information on the pressure applied by the foot of the dart game user. In this case, the foot pressure information may include at least one of foot shape information, foot location information, and detailed foot pressure information, but is not limited thereto.

The foot shape information means information related to a shape formed by the foot of the dart game user when the dart game user throws the dart.

The detailed foot pressure information means detailed information regarding the pressure applied by the foot of the dart game user when the dart game user throws the dart. For example, the foot of the dart game user may be divided into a plurality of areas and when a dart game user throws the dart pin, the pressure applied by each of the plurality of areas may be different. In this case, information on the pressure applied by each of the plurality of regions may be the detailed foot pressure information.

The foot location information means information related to an area where the foot of the dart game user is positioned when the dart game user throws the dart.

The throwing guide information generating unit 118 may generate throwing guide information for the dart game user based on at least one of the foot pressure information and the motion information of the dart pin.

According to another exemplary embodiment of the present disclosure, the throwing guide information generating unit 118 may analyze the motion information of the dart pin and generate the throwing guide information for the dart game user based on the analysis result.

The throwing guide information generating unit 118 may obtain speed information on a trajectory of the dart. For example, the throwing guide information generating unit 118 may obtain a speed allowing the dart pin to move in a parabolic orbit by analyzing movement information of the plurality of dart pins. Further, the throwing guide information generating unit 118 may obtain a speed allowing the dart pin to move in a straight line by analyzing the movement information of the plurality of dart pins. As another example, the throwing guide information generating unit 118 may obtain the speed information on the trajectory of the dart from the external device.

The throwing guide information generating unit 118 may generate the throwing guide information based on the speed information on the trajectory of the dart and the motion information of the dart pin thrown by the user. For example, the throwing guide information generating unit 118 may generate dart throwing guide information indicating a speed at which the dart pin may move in the straight line when the dart pin of the dart game user moves in the parabolic orbit.

The throwing guide information generating unit 118 may obtain standard dart speed information. For example, the throwing guide information generating unit 118 calculates an average speed of the dart pins thrown by dart game users having a specific ability or more (in this case, the dart ability may be identified by the PPD, the MPR, etc., but is not limited thereto) to obtain the standard dart speed information. As another example, the throwing guide information generating unit 118 may obtain the standard dart speed information from the external device.

The throwing guide information generating unit 118 may generate the throwing guide information for the dart game user based on the standard dart speed information. For example, the throwing guide information generating unit 118 compares the standard dart speed information with the motion information of the dart pins thrown by the dart game user and when the motion of the dart pin thrown by the dart game user is faster than the standard dart speed, the throwing guide information generating unit 118 may generate the throwing guide information suggesting the dart game user to lower the speed of the dart pin. In addition, when the motion of the dart pin thrown by the dart game user is slower than the standard dart speed, the throwing guide information generating unit 118 may generate the throwing guide information suggesting the dart game user to raise the speed of the dart pin.

According to an exemplary embodiment of the present disclosure, the throwing guide information generating unit 118 may analyze the foot pressure information which is the information on the pressure applied by the foot of the dart game user and generate the throwing guide information for the dart game user based on the analysis result.

The throwing guide information generating unit may analyze a dart throwing habit of the dart game user based on at least one of the foot shape information, the foot location information, and the detailed foot pressure information of the dart game user.

Specifically, for example, the throwing guide information generating unit may obtain foot pressure information generally possessed by a specific dart game user when the dart pin reaches a specific score of the dart target 200. For example, the throwing guide information generating unit may obtain the foot shape information, the foot location information_ and the detailed foot pressure information generally possessed by the dart game user when a 20-point area out of the areas of the dart target 200 is hit.

As a result, when the dart game user throws the dart pin through a specific foot shape, a specific foot location, and a specific detailed foot pressure, the throwing guide information generating unit 118 may obtain the area of the dart target 200, which has a high probability that the dart pin will reach the corresponding area. For example, the throwing guide information generating unit may calculate the area of the dart target 200, which has a high probability that the dart pin will reach the corresponding area when the dart game user throws the dart pin in the specific foot shape. Further, the throwing guide information generating unit may calculate the area of the dart target 200 having a high probability that the dart pin will reach the corresponding area when the dart game user throws the dart pin through the specific foot location and derive the area of the dart target 200, which has a high probability that the dart pin will reach the corresponding area when the dart game user throws the dart pin through the specific detailed foot pressure. Further, when the dart game user throws the dart pin through a combination of at least two or more of the specific foot shape, the specific foot location, and the specific detailed foot pressure, the dart throwing guide information generating unit may calculate the area of the dart target 200, which has a high probability that the dart pin will reach the corresponding area. In this case, since the dart throwing habit may vary depending on the dart game user, the area of the dart target 200, which has a high probability that the dart pin will reach the corresponding area may vary depending on the dart game user when the dart game user throws the dart pin through the specific foot shape, the specific foot location, and the specific detailed foot pressure.

The throwing guide information generating unit 118 may generate the throwing guide information including foot pressure recommendation information according to the dart throwing opportunity. For example, in a situation where the dart game user needs to hit a specific area of the dart target 200 with the dart pin, the throwing guide information generating unit 118 may generate throwing guide information providing the foot pressure recommendation information which facilitates hitting the specific area with the dart pin. Specifically, for example, the throwing guide information generating unit 118 may generate the throwing guide information including at least one of foot shape recommendation information, foot location recommendation information, and detailed foot pressure recommendation information.

In another exemplary embodiment, the foot pressure recommendation information may include posture information for a preferable weight distribution based on the posture of the user or weight distribution information of both feet recognized through the touch unit 2130. For example, the controller 110 may control the lesson image generating unit 119 to generate a lesson image for inducing the posture for the preferable weight distribution based on the weight distribution of both feet recognized.

According to another exemplary embodiment of the present disclosure, the throwing guide information generating unit 118 may obtain standard foot pressure information based on foot pressure information of a plurality of users. For example, the throwing guide information generating unit 118 may obtain the standard foot pressure information based on the foot pressure information of a dart user having a specific ability or more (in this case, the dart ability may be identified by the PPD, the MPR, etc., but is not limited thereto).

In this case, the standard foot pressure information may include at least one of standard foot shape information, standard foot location information, and standard detailed foot pressure information.

The standard foot shape information means information related to shapes generally formed by feet of the dart game users when a plurality of dart users throws the dart pins. For example, the standard foot shape information may include information on the foot shape generally formed by the dart game user when the dart game user having the specific ability or more throws the dart pin.

The standard foot location information means information related to areas where the feet of the dart game users are generally positioned when the plurality of dart users throws the dart pins. For example, the standard foot location information may include information on an area where the foot of the dart game user is generally positioned when the dart game user having the specific skill or more throws the dart pin.

The standard detailed foot pressure information means detailed information regarding the pressure generally applied by the feet of the dart game users when the plurality of dart users throws the dart pins. For example, the standard detailed foot pressure information may include detailed information on the pressure generally applied by the feet of the dart game users when a plurality of dart game users having the specific skill or more throws the dart pins.

The throwing guide information generating unit 118 may generate the throwing guide information including the foot pressure recommendation information. For example, the throwing guide information generating unit 118 may generate the throwing guide information suggesting at least one of the standard foot shape information, the standard foot location information, and the standard detailed foot pressure information.

According to an exemplary embodiment of the present disclosure, the lesson image generating unit 119 may generate the lesson image based on the generated throwing guide information.

The lesson image generating unit 119 may generate various lesson images based on the generated throwing guide information. For example, the lesson image generating unit 119 may generate a first lesson image including the throwing guide information generated by the throwing guide information generating unit 118.

For example, the lesson image generating unit 119 may generate the first lesson image based on the throwing guide information. The first lesson image may be associated with the virtual player participating in the dart game. Further, the first lesson image may be associated with at least one of one or more virtual players which do not participate in the dart game, but are stored in the dart game apparatus 1000.

The first lesson image may include a description image of a dart pin throwing posture based on the throwing guide information. For example, the first lesson image may include a description image of a dart speed, a description image of the foot shape when throwing the dart pin, a description image of the foot location when throwing the dart pin, a description image of the detailed foot pressure when throwing the dart pin, a description of a stance on the throw line of the dart game performed by the virtual player, a description image of how to hold the dart pin, a description image related to the posture of each part of a human body, such as a head, an arm, a hand, an elbow, or the like at the time of aiming the dart pin by gripping the dart pin, a description image related to muscles to be used in an operation of throwing the dart pin, and a description image related to at least one of an operation of moving the dart pin forward and a release operation of releasing the dart pin so that the dart pin may fly forward, and the like.

As another example, the first lesson image may include at least one of an image suggesting a recommended speed of the dart pin, an image guiding that a faster movement speed than the movement speed of the existing dart pin is required, an image guiding that a slower movement than the movement speed of the existing dart pin is required, a dart pin recommendation trajectory guidance image, a user customized foot shape recommendation guidance image, a user customized foot location recommendation guidance image, a user customized detailed foot pressure recommendation guidance image, a standard foot shape guidance image, a standard foot location guidance image, and a standard detailed foot pressure guidance image.

A time at which the first lesson image is displayed may be set in advance. For example, the first lesson image may be displayed at a time when the game mode is selected, a time within a predetermined time after the game mode is selected, a time before the game mode is selected and the dart pin is thrown, a time of receiving a user's input of requesting the lesson image, a time when the player stands by before the game, and the like, but the present disclosure is not limited thereto.

The first lesson image may be displayed in a part or the entirety of the display area 315. For example, the first lesson image may be displayed in a part of the lower left area in the display area 315. Further, the first lesson image may be displayed in a part of the lower right area in the display area 315 and may be displayed in the entirety of the display area 315, but is not limited thereto.

According to an exemplary embodiment of the present disclosure, the lesson image generating unit may generate a second lesson image which is a compensation image for the hit locations of the dart pins.

The second lesson image may include an image that may be output when the real player produces a result according to the lesson. For example, when inaccuracy of the dart pin due to the throwing posture of the real player is corrected by the lesson, the second lesson image may be output. For example, the second lesson image may include a replay of the dart pin throwing of the real player, a comparison image of the throwing operation with higher accuracy after the correction and the image of the previous throwing, an image in which the virtual player appears and shouts nice or good meaning praising the real player or shouts cheer meaning congratulation while showing the replay and the comparison image, an image in which the virtual player shouts perfect indicating that the real player is perfect, or the like, but is not limited thereto.

A time at which the second lesson image is displayed may be set in advance. For example, the second lesson image may be displayed at the time when one round ends, a time within a predetermined time after the end of one round, a time which a user's input is received after one round ends, or when the throwing operation of the player is performed without deviating from one or more lines, but the present disclosure is not limited thereto.

The display period of the second lesson image may be set in advance. For example, the display period of the second lesson image may be set between 0.8 seconds and 1.2 seconds in advance so as to prevent the large influence from being exerted on the progress time of the dart game, but is not limited thereto.

The second lesson image may be displayed in a part or the entirety of the display area 315. For example, the second lesson image may be displayed in a part of the lower left area in the display area 315. Further, the second lesson image may be displayed in a part of the lower right area in the display area 315 and may be displayed in the entirety of the display area 315, but is not limited thereto.

According to an exemplary embodiment of the present disclosure, the lesson image generating unit 119 may generate a third lesson image which is a consolation or reprimand image for the hit locations of the dart pins.

The third lesson image may be the image associated with the virtual player. For example, the third lesson image may be associated with the virtual player participating in the dart game. Further, the third lesson image may be associated with at least one of one or more virtual players which do not participate in the dart game, but are stored in the dart game apparatus 1000.

The third lesson image may include an image that may be output when the player fails to produce the result according to the lesson. For example, even if the lesson for the real player is performed by the dart game apparatus 1000, the third lesson image may be output when the ability of the real player is not corrected.

For example, the third lesson image may include the replay of the dart pin throwing of the real player, a comparison image of the replay of the dart pin throwing and a correct throwing operation, a comparison image of replay of the dart pin throwing and a correct dart pin movement speed, a comparison image of a replay of the foot shape at the time of throwing the dart pin and a correct foot shape, a comparison image of a replay of the foot location at the time of throwing the dart pin and a correct foot location, or a comparison image of a replay of the detailed foot pressure at the time of throwing the dart pin and correct detailed foot pressure, but is not limited thereto.

A time at which the third lesson image is displayed may be set in advance. For example, the third lesson image may be displayed at the time when one round ends, a time within a predetermined time after the end of one round, a time which a user's input is received after one round ends, or when the throwing operation of the player is performed without deviating from one or more lines, but the present disclosure is not limited thereto.

The display period of the third lesson image may be set in advance. For example, the display period of the third lesson image may be set between 0.8 seconds and 1.2 seconds in advance so as to prevent the large influence from being exerted on the progress time of the dart game, but is not limited thereto.

The third lesson image may be displayed in a part or the entirety of the display area 315. For example, the third lesson image may be displayed in a part of the lower left area in the display area 315. Further, the third lesson image may be displayed in a part of the lower right area in the display area 315 and may be displayed in the entirety of the display area 315, but is not limited thereto.

Figure 21:
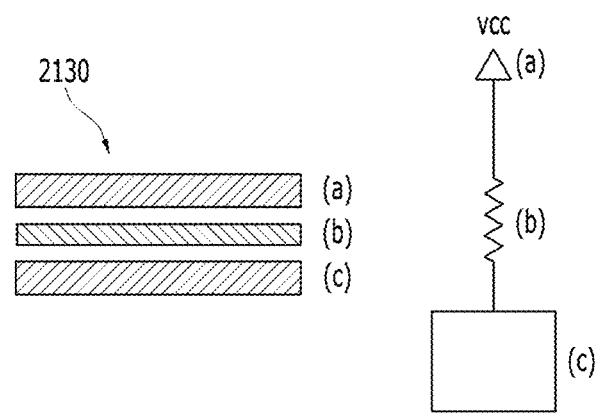
FIG. 21 is a diagram for describing a method for measuring foot pressure according to an exemplary embodiment of the present disclosure.

FIG. 21 is a diagram illustrating a method for measuring foot pressure according to an exemplary embodiment of the present disclosure.

Referring to FIG. 21, the touch unit 2130 may include a plurality of layers, and materials of the plurality of layers may be different. For example, a first layer a and a second layer c included in the touch unit 2130 may be constructed by a film printed circuit board (PCB). Further, a conductive layer b may be included between the first layer a and the second layer c and the conductive layer may include a conductive film.

Referring to FIG. 21, the conductive layer is illustrated as one layer for convenience of the disclosure, but the conductive layer may include the plurality of layers and each of the plurality of layers may include the conductive film.

When pressure is applied to the touch unit 2130, a resistance value of a portion to which the pressure is applied may be reduced and the pressure applied by the reduced resistance value may be measured. For example, a voltage value applied to a resistance component according to a changed resistance value and the Ohm's law may be digitized by an analog to digital converter, and as a result, the applied pressure may be measured.

Figure 22:
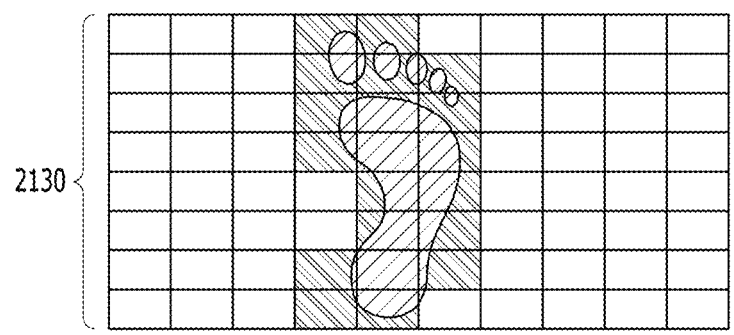
FIG. 22 is a diagram for describing a method for measuring detailed foot pressure according to an exemplary embodiment of the present disclosure.

FIG. 22 is a diagram illustrating a method for measuring detailed foot pressure according to an exemplary embodiment of the present disclosure.

According to an exemplary embodiment of the present disclosure, the touch unit 2130 may be divided into a plurality of areas. Referring to FIG. 22, the touch unit 2130 may be divided into a plurality of rectangular areas, but is not limited thereto and the touch unit 2130 may be divided into a plurality of areas having various polygonal shapes.

In another exemplary embodiment, the touch unit 2130 may include a plurality of lines disposed in a direction parallel to the throw line. The plurality of lines may be configured to include the conductive pressure sensing member. Accordingly, the touch unit 2130 may measure a distribution value of the center of weight of the user when the user throws the dart. For example, it is assumed that the user throws the dart while stepping on the touch unit 2130 including the plurality of lines with both feet. In this case, depending on the posture of the game user, different degrees of pressure loads are applied to both feet and respective areas of both feet vertically downward. The plurality of lines of the touch unit 2130 may convert the corresponding pressure load into an electrical signal so as to allow the controller 110 to recognize the posture and the weight distribution of the user in a dart throwing direction.

When the dart game user throws the dart pin, the foot of the dart game user may apply the pressure to the touch unit 2130. In this case, the touch unit 2130 may measure the pressures applied to the plurality of respective areas. For example, the touch unit 2130 may identify at least one of the plurality of areas, to which the pressure is applied.

The touch unit 2130 may measure the degree of the pressure applied to each of the areas to which the pressure is applied.

The touch unit 2130 may transmit measured information to the controller 110 and the controller 110 may acquire the foot pressure information based on the received information. For example, the controller 110 may acquire at least one of the foot shape information, the foot location information, and the detailed foot pressure information. In this case, the controller 110 may acquire information on one foot and information on both feet.

Figure 23:
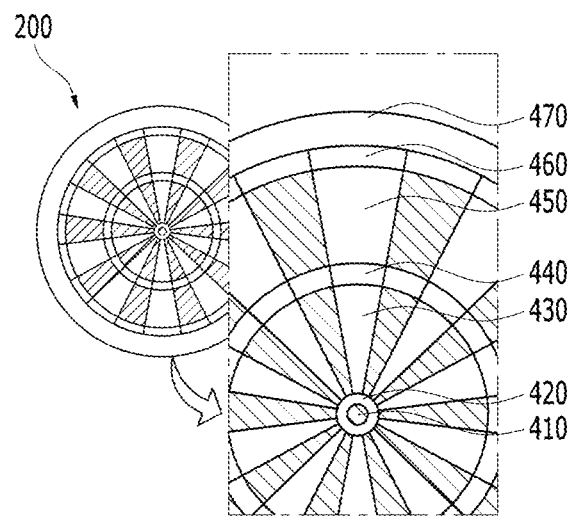
FIG. 23 is a diagram for describing a dart target according to an exemplary embodiment of the present disclosure.

FIG. 23 is a diagram for describing a dart target according to an exemplary embodiment of the present disclosure.

The dart target 200 may include a plurality of score areas. Referring to FIG. 21, in an aspect of the present disclosure, as the plurality of score areas, the double bull 410 and the single bull 420 having a concentric shape, the small single unit 430 having the fan shape, which are adjacent thereto, the triple ring 440 adjacent thereto, the large single 450 adjacent thereto, the doubling ring 460 adjacent thereto, and an outside area 470 at an outermost edge are positioned in accordance with the distance from the center of the dart target.

Figure 24:
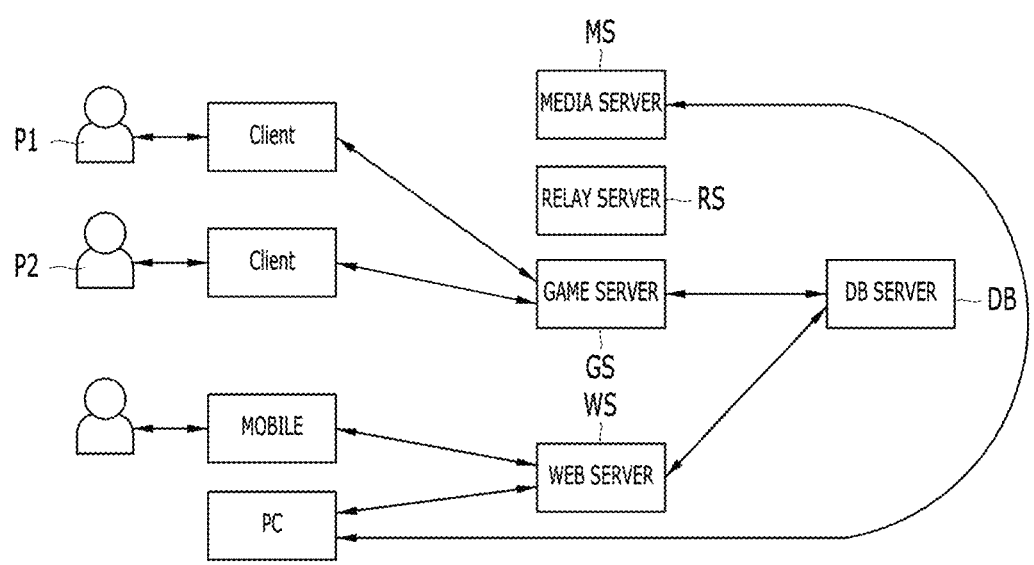
FIG. 24 is a conceptual view of a game network including the dart game apparatus according to the exemplary embodiment of the present disclosure.

FIG. 24 is a conceptual view of a game network including the dart game apparatus according to the exemplary embodiment of the present disclosure.

As illustrated in FIG. 24, the dart game apparatus 1000 used by a first game player P1 may be connected with one or more servers (a media server MS, a relay server RS, and a dart game server GS) through a network.

A plurality of dart game players may enjoy the dart game in the same space at the same time using the same first dart game apparatus 1000. However, when a second dart game player P2 positioned at a remote distant from the first dart game player P1 intends to participate in the dart game, the second dart game player P2 may perform the dart game by transmitting/receiving information to/from the first dart game apparatus 1000 in connection with one or more servers (the media server MS, the relay server RS, and the dart game server GS) through the network by a second dart game apparatus 1000. The first dart game apparatus 1000 and the second dart game apparatus may transmit and receive information via one or more servers (the media server MS, the relay server RS, and the dart game server GS) or directly transmit/receive the information between the dart game apparatuses.

According to an exemplary embodiment of the present disclosure, the dart game apparatus may provide the dart game match-up mode including at least one player playing at a remote place via a communication unit.

The dart game may be performed in such a manner that both dart game players P1 and P2 play the dart game at different places at the same time or the dart game may be performed in such a manner that both dart game players P1 and P2 play the dart game at different places at different time and win or lose or a ranking is determined by storing play contents in a DB server DB.

According to an exemplary embodiment of the present disclosure, information related to the virtual player may be stored in the DB server. Such information may include rating information (ranking and level) of the virtual player, dart game play image information, propensity information of the virtual player, profile information of the virtual player, accuracy rate information of the virtual player, and the like. The above description is only an example and information required for implementing the virtual player may be stored in the DB server. The propensity information of the virtual player may mean a play mode of the player which plays a dart game such as "lack of persistence" and "weakness to tension". The "lack of persistence" may mean a case where the accuracy rate of the virtual player is increased in the early part of the game and then decreased in the later part of the game. The "weakness to tension" may mean a case where the accuracy rate of the virtual player is decreased at the moment of tension such as a reversal chance. The propensity information of the aforementioned virtual player is just an example and may include a game play mode which may be shown by a dart game player.

The media server MS may store dart game play moving pictures of the dart game players P1 and P2, which are stored by using the camera or the microphone stored in the dart game apparatuses. The media server MS may be included in the DB server DB.

The relay server RS connects communication between the plurality of dart game apparatuses. The relay server RS forms a communication network among the plurality of dart game apparatuses positioned at the remote range to form a peer-to-peer (P2P) network.

The game server GS may exchange information (a score acquired by each game player and information for mutual communication among the respective game players) between the dart game apparatuses, transmit an advantage or a warning based on a game rule through the respective dart game apparatuses, or in addition, perform transmission and reception of information required to perform the dart game and controlling the dart game apparatuses. The dart game server GS aggregates winning/losing of the dart game and scores of the respective dart game players to transmit the aggregated winning/losing and scores to the DB server. Further, according to an exemplary embodiment of the present disclosure, the dart game server GS may select the virtual player which will constitute a team with the player.

The DB server may store personal information of the respective dart game players, winning/losing and ranking information of the game, score information for each game, or a replay moving picture for each game. The DB server may store the information segmented for each user. The DB server may grant a unique code to each user and manage information for each user by using the unique code. The unique code may be stored in the RFID module (an RFID card or an RFID module stored in the mobile terminal) possessed by each user. As a result, the game apparatuses may identify each game player. The DB server may also grant the unique code for identification even to the respective dart game apparatuses and manage the dart game data for each identification code granted to the dart game apparatuses.

The game player may access a web server WS by using a mobile device (including electronic apparatuses such as a mobile terminal, a cellular phone, a PDA, a PDP, and the like, which have a mobile communication function) or a PC. The web server WS may be connected with the mobile device by the Internet or Intranet. Further, the web server WS may be connected even with the dart game apparatuses. The web server WS is connected with the DB server DB to provide the dart game data stored in the DB server to the dart game player.

Hereinafter, a representative rule of the dart game and stats of the player associated therewith will be described.

The dart game which may be executed by the dart game apparatus 1000 according to the exemplary embodiment of the present disclosure may include a 01 game (zero-one game), a cricket game, a count-up game, a match-up mode, and the like.

The 01 game is performed by two teams (alternatively, two players) throwing the dart to the dart target alternately one by one round. One round includes three dart throwing motions. An object of the game is that sum-up of scores in each round reaches a target score (a score of the unit of 100 or 1000 that generally ends with 01 point, such as 301, 501, 701, 901, 1101, 1501 points, and the like). The target score and a play round may be arbitrarily adjusted according to the number of players that participate in the round.

In the cricket game, the round is performed by throwing three darts in a first round similarly to the 01 game. The standard cricket game may be performed by using only a bull area at the center of the dart target, and 20, 19, 18, 17, 16, and 15 point areas. When the corresponding cricket figures are hit with 3 marks, this is marked as a location of the player and when the corresponding cricket figures are hit with 4 marks or more, scores corresponding to the figures are added up to compete the scores. Herein, the double area and the triple area of the dart target may be calculated with 2 marks and 3 marks, respectively. While the corresponding cricket figure is marked as the location of the player, when a counterpart of the player also marks 3 as cricket figure, the corresponding cricket figure is regarded to be closed and no score may be added any longer. The object of the game may be set to acquire a high score until a regulation round ends or close all cricket figures and obtain a higher score than the counterpart.

The count-up game is a game at which the player wins when acquiring a high score within a predetermined round.

In addition to the aforementioned games, various types of games may be played by the dart game apparatus 1000 and the play mode of the dart game apparatus 1000 is not limited by the aforementioned game schemes.

The stats of the player may be defined according to the corresponding game rule independently from the winning or losing of the count-up game, the cricket game, and the 01 game.

For example, points per dart (PPD) may be calculated by dividing a total score which the player earns by the number of dart throwing times in the 01 game.

Alternatively, marks per round (MPR) may be calculated by calculating the number of marking times of the player in one round. For example, in the cricket game, when the player performs three dart throwing motions in one round and the darts hit 15 triple, 19 single, and 20 double bull in the three dart throwing motions, respectively, the MPR becomes (3+1+2)/1=6.00 (MPR).

In a subsequent round, when the player performs three dart throwing motions and the darts hit mark fail, 18 double, and 20 bull in the three dart throwing motions, the MPR becomes (3+1+2+0+2+1)/2=4.5 (MPR).

The PPD and the MPR as the stats of the player may also be stored as personal data of the player. Alternatively, in the count-up game, an average score of the player per game, a highest score record of the player per game, and the like may be stored as the stats of the player.

The dart game apparatus 1000 may play the dart game according to the corresponding mode and transmit a game record per player to the game server GS or the DB server DB. The game server GS or the DB server DB may calculate the PPD and/or MPR for each player according to the corresponding game record and store the calculated PPD and/or MPR as accumulated PPD and/or MPR stats of the player. Further, the game server GS or the DB server DB may individually store the game record of the player. For example, in the 01 game, the count-up game, or the cricket game which the player played in the past, the player may record information on a segment part of a dart which the player hits by each dart throw. The game server GS or DB server DB may store accumulated (average) PPD and/or MPR data and highest PPD and/or MPR data of the player.

The game server GS or the DB server DB may be two physically separated servers. Alternatively, the game server GS or the DB server DB may be one physically integrated server and be distinguished according to roles performed in the server. Further, as described above, one server may serve as both the game server GS and the DB server DB.

The game server GS or the DB server DB may store personal stats of the player and rating (alternatively, grade) may be granted to the player according to the corresponding stats.

Figure 25:
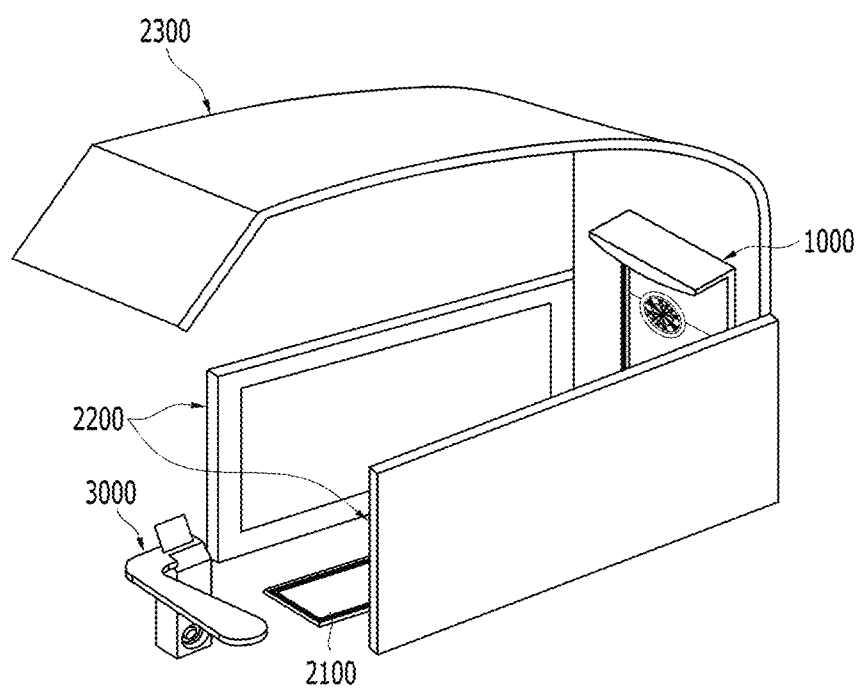
FIG. 25 is a diagram for describing a dart booth according to the exemplary embodiment of the present disclosure.

FIG. 25 is a diagram for describing a dart booth according to the exemplary embodiment of the present disclosure.

According to the exemplary embodiment of the present disclosure, the dart game system 10000 may include a body 1000 of the dart game apparatus, a dart booth 2000, and a dart game assistant apparatus 3000. The dart booth 2000 may include all of the dart plate 2100, the upper cover 2300, and a side cover 2200, in this case, the side cover 2200 may extend from at least one side of the dart game apparatus in the opposite direction to the dart target.

According to an exemplary embodiment of the present disclosure, an illumination unit and a sound unit may be installed in the body of the dart game apparatus and in a part or the entirety of the dart plate 2100, the upper cover 2300, and the side cover 200.

According to an exemplary embodiment of the present disclosure, at least one of the illumination unit and the sound unit installed in the dart game apparatus 1000 and at least one of the illumination unit and the sound unit installed in the dart booth 2000 may interlock with each other in real time or in non-real time.

For example, with occurrence of a specific event, the illumination unit installed in the dart game apparatus 1000, the illumination unit installed in the dart plate 2100, the illumination unit installed in the side cover unit 2200, and the like may flicker with the same color e.g., blue, etc.) and the sound units installed in the dart game apparatus 1000, the dart plate 2100, and the side cover 2200 may generate the same sound (e.g., a buzzer sound, etc.).

According to another example, with the occurrence of the specific event, the illumination unit installed in the dart game apparatus 1000, the illumination unit installed in the dart plate 2100, the illumination unit installed in the side cover unit 2200, and the like may flicker with different colors and the sound units installed in the dart game apparatus 1000, the dart plate 2100, and the side cover 2200 may generate different sounds.

Figure 26A:
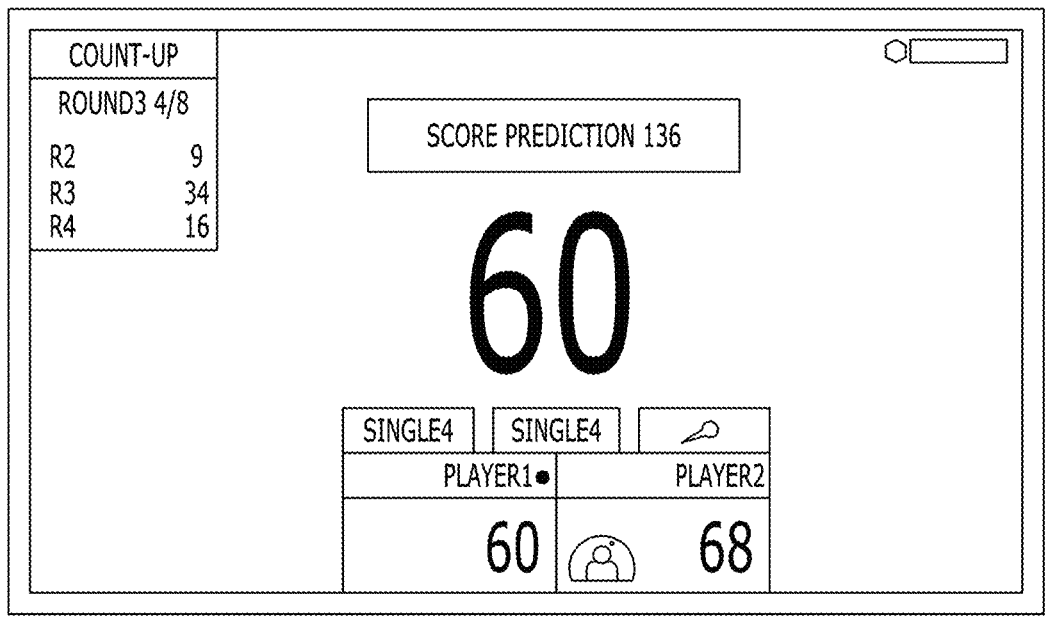
FIG. 26 is a diagram for describing another event effect which may be output from the dart game apparatus according to the exemplary embodiment of the present disclosure.
Figure 26B:
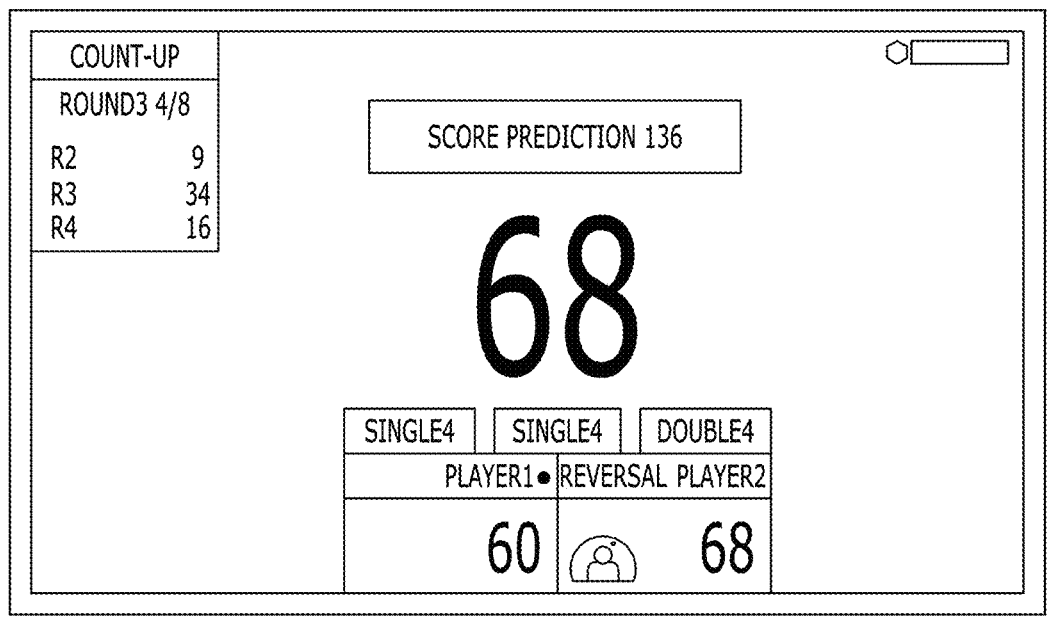

FIG. 26 is a diagram for describing another event effect which may be output from the dart game apparatus according to the exemplary embodiment of the present disclosure.

According to the exemplary embodiments of the present disclosure, it is assumed that a first player (e.g., 'CAT) and a second player 'TIGER') which play the dart game exist. The display area 315 may include a first area displaying score information of the first player and a second area displaying the score information of the second player. For example, the first area displaying the score information of the first player may display '55 which is the score information of 'CAT' which is the first player and the second area displaying the score information of the second player may display '53' which is the score information of 'TIGER' which is the second player.

More specifically, it is assumed that the dart pin thrown by 'TIGER' which is the second player is accommodated in an area of 4 points of the dart target. The sensing unit 160 may sense the hit location of the dart pin thrown to the area of 4 points of the dart target and the controller 110 may determine the score information of two or more players based on the hit location of the dart pin thrown to the area of 4 points by the sensing unit. For example, the controller 110 may determine '53' which is the score information of the second player as '57' based on the hit location of the dart pin of the area of 4 points, which is thrown by 'TIGER' which is the second player. Further, the controller 110 may compare the score information of two or more players with each other. For example, the controller 110 compares the score information '55' of 'CAT' which is the first player with the score information '57' of 'TIGER' which is the second player with each other to determine that the score information of the second player is dominant.

The display area 315 may output the event effect determined based on a result of comparing the score information with each other. For example, the result of comparing the score information with each other may include the tie, the dominance, the reversal, a chase, and the like but the comparison result is not limited thereto. Further, the event effect may include various visual effects, auditory effects, tactile effects, and olfactory effects and is not limited thereto.

The display area 315 may display the event effect in one of the first area and the second area. For example, when the score of the first player and the score of the second player are tied with each other by the dart thrown by the first player, the display area 315 may output the event effect 'tie!!!' to the first area. However, the event effect is not limited thereto and the display area 315 may output various event effects to the second area or output the various event effects to both the first area and the second area.

In the exemplary embodiments of the present disclosure, the controller 110 compares the score information of two or more players with each other to select a reversal event effect when the dominance of the score information of the first player and the score information of the second player is changed. When the reversal event effect is selected by the controller, the display area 315 may output the selected reversal event effect. For example, when 'TIGER' which is the second player acquires 4 points and the score information of the second player becomes thus '57', the controller 110 may compare the score information '55' of 'CAT' which is the first player and the score information '57' of 'TIGER' which is the second player. Therefore, the controller 110 may select the reversal event effect because the score information of 'TIGER' which is the second player is changed to be dominant. Therefore, the display area 315 may output the selected reversal event effect to the second area. However, the event effect is not limited thereto and various reversal event effects may be output to the first area or both the first area and the second area.

According to the exemplary embodiments of the present disclosure, which include the steps, it is assumed that 'PLAYER2' which is the second player throws the dart to the hit location of DOUBLE 4 to acquire 8 points.

Since the score information of 'PLAYER1' which is the first player is '60' and the score information of 'PLAYER2' which is the second player is '60', the score information of 'PLAYER2' which is the second player becomes '68' by the acquired 8 points to be changed to be dominant. In this case, the reversal event effect may be output to the second area. For example, the reversal event effect 'reversal' may be output next to 'PLAYER2'. However, the event effect is not limited thereto and the reversal event effect may be output to the first area. Further, the same or different reversal event effects may be output to both the first area and the second area.

Although not illustrated, on the contrary, when the score information of 'PLAYER1' which is the first player is changed to be dominant, the reversal event effect may be output to the first area. For example, the reversal event effect 'reversal' may be output next to 'PLAYER2'. However, the event effect is not limited thereto and the reversal event effect may be output to the first area. Further, the same or different reversal event effects may be output to both the first area and the second area.

Figure 27:
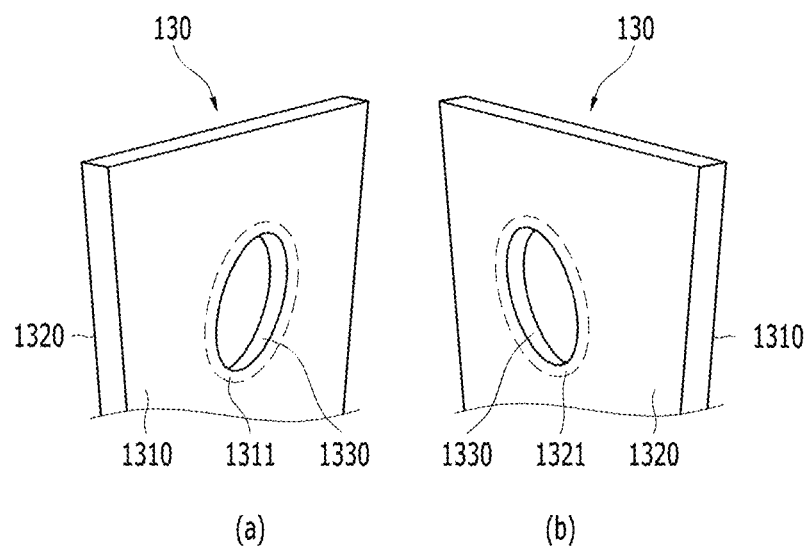
FIG. 27 is a diagram for describing a location of a target illumination unit according to the exemplary embodiment of the present disclosure.

FIG. 27 is a diagram for describing a location of a target illumination unit according to the exemplary embodiment of the present disclosure.

Referring to FIG. 27, the target illumination unit 500 may be at least partially in contact with one surface of the cover 130 to irradiate light toward at least one portion of the dart target 200 and the periphery of the dart target 200.

Referring to FIG. 27, a surface of the cover 130 facing the throw line is referred to as a first surface 1310 and a surface facing the dart game apparatus 1000 is referred to as a second surface 1320.

According to an exemplary embodiment of the present disclosure, the target illumination unit 500 may be at least partially in contact with a periphery 1311 of the hole provided in the cover 130 on the first surface 1310 of the cover 130. Further, the target illumination unit 500 may be at least partially in contact with a periphery 1321 of the hole provided in the cover 130 on the second surface 1320 of the cover 130. According to another exemplary embodiment of the present disclosure, the target illumination unit 500 may be at least partially in contact with an inner surface 1330 of the hole provided in the cover 130. Further, according to another exemplary embodiment of the present disclosure, the target illumination unit 500 may be positioned between the cover 130 and the dart game apparatus 1000.

In this case, the target illumination unit 500 may be in contact with the cover 130 and may be attached to the cover 130.

It will be appreciated by those skilled in the art that the present disclosure may be implemented in combination with other program modules and/or as a combination of hardware and software. For example, the present disclosure may be implemented by a computer readable medium.

Media accessible by the computer may be computer readable media regardless of types thereof and the computer readable media include volatile and non-volatile media, transitory and non-transitory media, and mobile and non-mobile media. As an example rather than a limit, the computer readable media may include both computer readable storage media and computer readable transmission media.

The computer readable storage media include volatile and non-volatile, temporary or non-temporary, and movable and non-movable media implemented by a predetermined method or technology for storing information such as a computer readable command, a data structure, a program module, or other data. The computer readable storage media include a RAM, a ROM, an EEPROM, a flash memory or other memory technologies, a CD-ROM, a digital video disk (DVD) or other optical disk storage devices, a magnetic cassette, a magnetic tape, a magnetic disk storage device or other magnetic storage devices or predetermined other media which may be accessed by the computer or may be used to store desired information, but are not limited thereto.

The computer readable transmission media generally implement the computer readable command, the data structure, the program module, or other data in a carrier wave or a modulated data signal such as other transport mechanism and include all information transfer media. The term "modulated data signal" means a signal acquired by configuring or changing at least one of characteristics of the signal so as to encode information in the signal. As an example rather than a limit, the computer readable transmission media include wired media such as a wired network or a direct-wired connection and wireless media such as acoustic, RF, infrared and other wireless media. A combination of any media among the aforementioned media is also included in a range of the computer readable transmission media.

Those skilled in the art of the present disclosure will appreciate that various exemplary logic blocks, modules, processors, means, circuits, and algorithm steps described in association with the embodiments disclosed herein can be implemented by electronic hardware, various types of programs or design codes (designated as "software" herein for easy description), or a combination of all thereof. In order to clearly describe the intercompatibility of the hardware and the software, various exemplary components, blocks, modules, circuits, and steps have been generally described above in association with functions thereof. Whether the functions are implemented as the hardware or software depends on design restrictions given to a specific application and an entire system. Those skilled in the art of the present disclosure may implement functions described by various methods with respect to each specific application, but it should not be analyzed that the implementation determination departs from the scope of the present disclosure.

Various exemplary embodiments presented herein may be implemented as manufactured articles using a method, an apparatus, or a standard programming and/or engineering technique. The term "manufactured article" includes a computer program, a carrier, or a medium which is accessible by a predetermined computer-readable device. For example, a computer-readable storage medium includes a magnetic storage device (for example, a hard disk, a floppy disk, a magnetic strip, or the like), an optical disk (for example, a CD, a DVD, or the like), a smart card, and a flash memory device (for example, an EEPROM, a card, a stick, a key drive, or the like), but is not limited thereto. The term "machine-readable media" includes a wireless channel and various other media that can store, posses, and/or transfer command(s) and/or data, but are not limited thereto.

It will be appreciated that a specific order or a hierarchical structure of steps in the presented processes is one example of exemplary accesses. It will be appreciated that the specific order or the hierarchical structure of the steps in the processes within the scope of the present disclosure may be rearranged based on design priorities. Appended method claims provide elements of various steps in a sample order, but it does not mean that the method claims are limited to the presented specific order or hierarchical structure.

The description of the presented exemplary embodiments is provided so that those skilled in the art of the present disclosure use or implement the present disclosure. Various modifications of the exemplary embodiments will be apparent to those skilled in the art and general principles defined herein can be applied to other exemplary embodiments without departing from the scope of the present disclosure. Therefore, the present disclosure is not limited to the exemplary embodiments presented herein, but should be analyzed within the widest range which is coherent with the principles and new features presented herein.

Mode for Invention

Related contents in the best mode for carrying out the present disclosure are described as above.

INDUSTRIAL APPLICABILITY

The present disclosure may be used in a digital device, a dart device, a dart game device, an entertainment device, and the like.

What is claimed is:
1. A dart game apparatus comprising:
a dart target having a plurality of score areas;
a sensor configured to sense a hit location of a dart pin in the dart target;
at least one display unit providing a display area surrounding an outline of the dart target, the display area disposed to provide a variable image to a location adjacent to at least a part of the outline of the dart target and outside of the dart target, and outputting an event effect based at least partially on the hit location of the dart pin in the dart target, the at least one display unit comprising at least one display panel, wherein the display area and the dart target occupy an entire front surface of the dart game apparatus;

a cover located in front of the at least one display unit to cover and protect the display area of the at least one display unit from the thrown dart pins, the cover comprising an opening or a receiving groove to where the dart target is seated and unobstructed by the cover, the cover being at least in part transparent to permit the optical transmittance from the display area outside of the opening and surrounding the dart target of at least one of the variable image and event effect; and a processor determining a location of the event effect to be displayed on the display area based on the hit location of the dart pin in the dart target, the event effect comprising a visual effect displayed over the entire front surface of the display area of the dart game apparatus and being determined based on a dart game result occurred at least partially based on the sensed hit location of the dart pin and indicating the occurred dart game result, and controlling the display unit output of the event effect at a time subsequent to the sensing unit sensing the hit location of the dart pin in the dart target, a pre-event generation determination unit determining whether a predetermined event occurs at least partially based on progress information of a dart game which is currently in progress before the dart pin is thrown; and a pre-event effect determination unit determining a location to which a pre-event effect displayed in the display area is output based on an event which occurs when the predetermined event occurs.

2. The dart game apparatus of claim 1, wherein the predetermined event includes a dart pin throwing opportunity to determine a win or loss of a dart game player.

3. The dart game apparatus of claim 1, wherein the predetermined event includes a dart pin throwing opportunity when a reversal is available at the time of throwing the dart pin.

4. The dart game apparatus of claim 1, wherein the display unit has a curved shape in which a distance from a virtual surface extending upward from a throw line decreases from a center of the display unit to a distal portion of the display unit.

5. The dart game apparatus of claim 1, wherein the display unit is comprised in a body structure, and the body structure further includes:
a lower support extending in a front direction of the dart game apparatus from a bottom end of the display along the ground; and
a body structure cover extending from an upper end of the display unit in an opposite direction to the dart target.

6. The dart game apparatus of claim 1, wherein the processor is further configured to determine a portion adjacent to a point where a line extending from a center of the dart target to the hit location of the dart pin meets the outline of the dart target as the location where the event effect is displayed.

7. The dart game apparatus of claim 1, wherein the processor is further configured to determine the location where the event effect is displayed based on the score area hit by the dart pin among the plurality of score areas.

8. The dart game apparatus of claim 7, wherein each of the plurality of score areas has a fan shape, and
the processor is further configured to determine a portion adjacent to an arc of the fan-shaped score area hit by the dart pin among the plurality of fan-shaped score areas as the location where the event effect is displayed.

9. The dart game apparatus of claim 8, wherein the processor is further configured to determine at least a part between extension lines of radii of the fan-shaped score area hit by the dart pin as the location where the event effect is displayed.

10. The dart game apparatus of claim 1, wherein one or more dart target back illuminators are arranged on a back of the dart target in a direction facing an outside of the dart game apparatus to transfer a visual output through a gap between segments constituting the dart target.

11. The dart game apparatus of claim 1, wherein the processor is further configured to:
determine score information of two or more users,
generate a mutual comparison result by comparing the score information of the two or more users with each other based on the hit location of the dart pin, and
output the event effect on the display area based on the mutual comparison result.

12. The dart game apparatus of claim 11, wherein the two or more users include a first user and a second user, and
the processor is further configured to:
determine a first user area in which score information depending on the dart pin throwing of the first user is to be displayed and a second user area in which score information depending on the dart pin throwing of the second user is to be displayed in the display area,
compare the score information of the first user and the score information of the second user with each other, and
when the superiority between the score information of the first user and the score information of the second user is changed, allow a reversal event effect to be output to at least one of the first user area and the second user area.

13. The dart game apparatus of claim 1, wherein the at least one display panel further comprises at least one of a flexible display and a 3D display.

14. The dart game apparatus of claim 1, wherein the at least one display panel includes at least one of a liquid crystal display (LCD), a thin film transistor-liquid crystal display (TFT LCD), and an organic light-emitting diode (OLED).

15. The dart game apparatus of claim 1, wherein the processor determines at least one type of an image to be output to the display area and the location of an area to which the image is to be output in the display area based on identification information of a user who throws the dart pin.

\* \* \* \* \*